(12) United States Patent
Conrad

(10) Patent No.: US 9,523,447 B2
(45) Date of Patent: Dec. 20, 2016

(54) METHOD AND APPARATUS FOR CONNECTING PIPES

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 13 days.

(21) Appl. No.: 14/471,494

(22) Filed: Aug. 28, 2014

(65) Prior Publication Data

US 2015/0091291 A1 Apr. 2, 2015

(30) Foreign Application Priority Data

Sep. 27, 2013 (CA) ...................................... 2828855

(51) Int. Cl.

| | |
|---|---|
| *F16L 13/11* | (2006.01) |
| *B29C 65/42* | (2006.01) |
| *B29C 65/48* | (2006.01) |
| *B29C 65/54* | (2006.01) |
| *B29C 45/03* | (2006.01) |
| *B29C 65/00* | (2006.01) |
| *B29C 65/78* | (2006.01) |

(52) U.S. Cl.
CPC ............ *F16L 13/116* (2013.01); *B29C 45/036* (2013.01); *B29C 65/42* (2013.01); *B29C 65/4815* (2013.01); *B29C 65/542* (2013.01); *B29C 65/7841* (2013.01); *B29C 66/02241* (2013.01); *B29C 66/1122* (2013.01); *B29C 66/1142* (2013.01); *B29C 66/1222* (2013.01); *B29C 66/1224* (2013.01); *B29C 66/5221* (2013.01); *B29C 66/52292* (2013.01); *B29C 66/73921* (2013.01); *B29C 66/861* (2013.01); *F16L 13/11* (2013.01); *B29C 65/425* (2013.01); *B29C 65/7802* (2013.01); *B29C 66/342* (2013.01); *B29C 66/71* (2013.01); *B29C 66/712* (2013.01)

(58) Field of Classification Search
CPC ......... F16L 13/116; F16L 13/11; B29C 66/342
See application file for complete search history.

(56) References Cited

U.S. PATENT DOCUMENTS

| | | | |
|---|---|---|---|
| 1,940,074 A | * | 12/1933 | Burmeister ............. F16L 13/11 285/285.1 |
| 2,961,363 A | | 11/1960 | Lowes |
| 3,307,997 A | | 3/1967 | Detrick |
| 3,475,239 A | | 10/1969 | Fearon et al. |
| 3,563,574 A | | 2/1971 | Jackson et al. |
| 3,663,335 A | | 5/1972 | Sheedy |
| 3,751,308 A | | 8/1973 | Bishop et al. |

(Continued)

FOREIGN PATENT DOCUMENTS

| | | |
|---|---|---|
| DE | 102009061082 | 5/2012 |
| DE | 102009061082 | 6/2013 |

(Continued)

*Primary Examiner* — Ryan J Walters
(74) *Attorney, Agent, or Firm* — Philip C. Mendes da Costa; Bereskin & Parr LLP/S.E.N.C.R.L., s.r.l.

(57) ABSTRACT

Methods and apparatuses of joining a first pipe and a second pipe by injecting a pipe joining material into an interstitial space between abutting surfaces are provided. The methods and apparatuses may use a hollow fitting into which pipe ends may be inserted.

19 Claims, 47 Drawing Sheets

(56) References Cited

U.S. PATENT DOCUMENTS

| | | | |
|---|---|---|---|
| 3,758,001 A * | 9/1973 | Callan | B29B 13/022 222/146.5 |
| 3,847,694 A | 11/1974 | Stewing | |
| 3,854,756 A | 12/1974 | Couch | |
| 3,929,538 A | 12/1975 | Diebel | |
| 3,957,382 A | 5/1976 | Greuel, Jr. et al. | |
| 3,969,170 A | 7/1976 | Landgraf | |
| 4,090,899 A | 5/1978 | Reich | |
| 4,092,193 A | 5/1978 | Brooks | |
| 4,132,578 A | 1/1979 | Gell et al. | |
| 4,191,407 A | 3/1980 | Bretone, Jr. | |
| 4,274,662 A | 6/1981 | de Groot et al. | |
| 4,362,684 A | 12/1982 | Thalman | |
| 4,434,320 A | 2/1984 | Klein | |
| 4,508,368 A | 4/1985 | Blumenkranz | |
| 4,585,607 A | 4/1986 | Krackeler et al. | |
| 4,804,209 A | 2/1989 | Fischer | |
| 4,852,914 A | 8/1989 | Lyall | |
| 4,880,579 A | 11/1989 | Murata et al. | |
| 5,116,082 A | 5/1992 | Handa | |
| 5,125,690 A | 6/1992 | Taylor et al. | |
| 5,141,580 A | 8/1992 | Dufour et al. | |
| 5,158,327 A | 10/1992 | Rowe | |
| 5,182,440 A | 1/1993 | Dufour et al. | |
| 5,252,157 A | 10/1993 | Inhofe, Jr. | |
| 5,313,034 A | 5/1994 | Grimm et al. | |
| 5,443,056 A | 8/1995 | Smith et al. | |
| 5,466,916 A | 11/1995 | Iguchi et al. | |
| 5,478,118 A | 12/1995 | Barq et al. | |
| 5,487,411 A | 1/1996 | Goncalves | |
| 5,529,656 A | 6/1996 | Ewen et al. | |
| 5,532,459 A | 7/1996 | Steinmetz et al. | |
| 5,670,012 A | 9/1997 | Porfido et al. | |
| 5,710,413 A | 1/1998 | King et al. | |
| 5,908,575 A | 6/1999 | Smith et al. | |
| 5,921,587 A | 7/1999 | Lueghamer | |
| 5,951,902 A | 9/1999 | Goodman et al. | |
| 5,988,689 A | 11/1999 | Lever | |
| 6,149,756 A | 11/2000 | Jarvenkyla | |
| 6,193,834 B1 | 2/2001 | Smith | |
| 6,198,081 B1 | 3/2001 | Steinmetz et al. | |
| 6,278,095 B1 | 8/2001 | Bass et al. | |
| 6,375,226 B1 | 4/2002 | Dickinson et al. | |
| 6,431,282 B1 | 8/2002 | Bosma et al. | |
| 6,457,889 B1 * | 10/2002 | Lin | B05C 17/0053 126/401 |
| 6,585,924 B1 | 7/2003 | Harget et al. | |
| 6,652,690 B1 | 11/2003 | Rovira | |
| 6,998,588 B2 | 2/2006 | Harget et al. | |
| 7,015,421 B2 | 3/2006 | Nakagawa | |
| 7,338,085 B2 | 3/2008 | Toriyabe et al. | |
| 7,341,285 B2 * | 3/2008 | McPherson | B29C 66/342 285/23 |
| 2001/0048223 A1 | 12/2001 | Campbell | |
| 2002/0100540 A1 | 8/2002 | Savitski et al. | |
| 2003/0080561 A1 | 5/2003 | Martin | |
| 2004/0251575 A1 | 12/2004 | St. Onge et al. | |
| 2006/0016552 A1 | 1/2006 | Barbone et al. | |
| 2006/0197338 A1 | 9/2006 | Ziu et al. | |
| 2007/0205004 A1 | 9/2007 | Perkovich et al. | |
| 2008/0257604 A1 | 10/2008 | Becker et al. | |
| 2010/0072742 A1 | 3/2010 | LaMarca et al. | |
| 2010/0212766 A1 | 8/2010 | Kiest, Jr. | |
| 2011/0168289 A1 | 7/2011 | Kourogi | |
| 2011/0197987 A1 | 8/2011 | Koravos et al. | |
| 2012/0048417 A1 | 3/2012 | Smith et al. | |

FOREIGN PATENT DOCUMENTS

| | | | |
|---|---|---|---|
| GB | 1293371 A * | 10/1972 | B29C 65/54 |
| WO | 2011/045607 | 4/2011 | |
| WO | 2012/007106 | 1/2012 | |

* cited by examiner

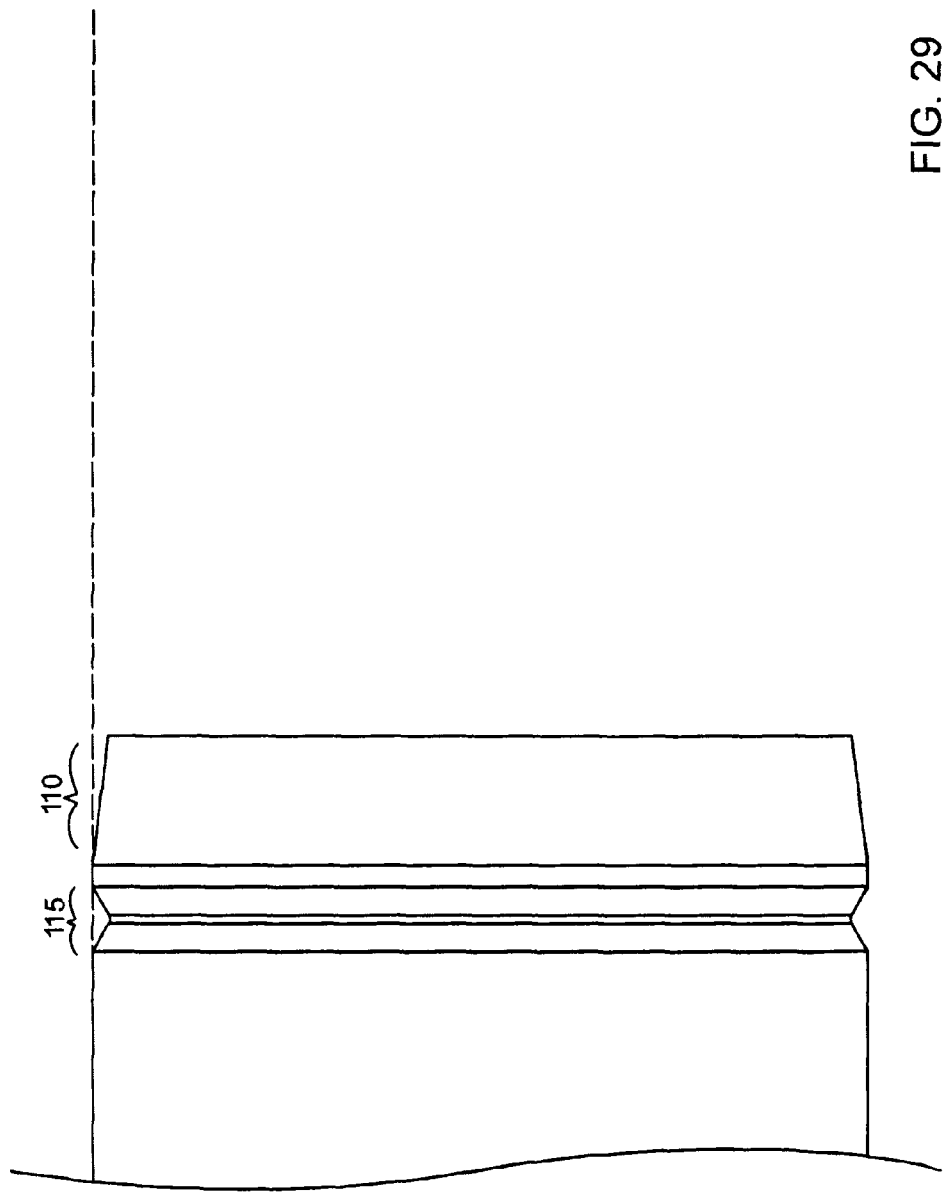

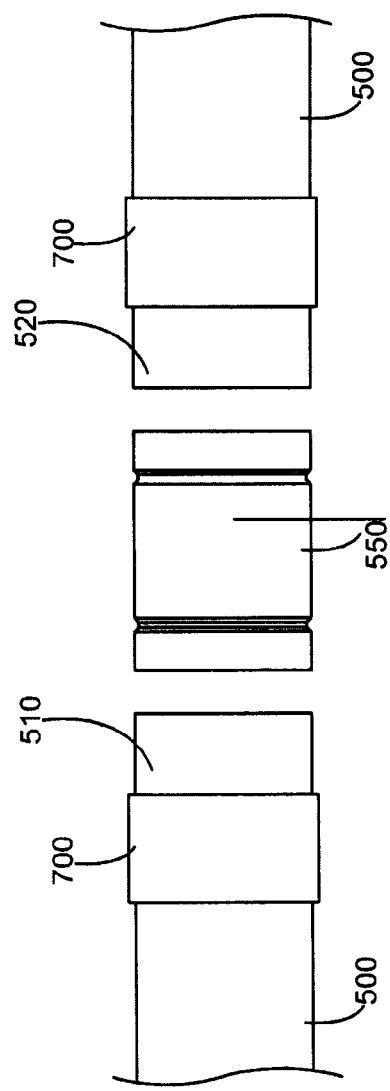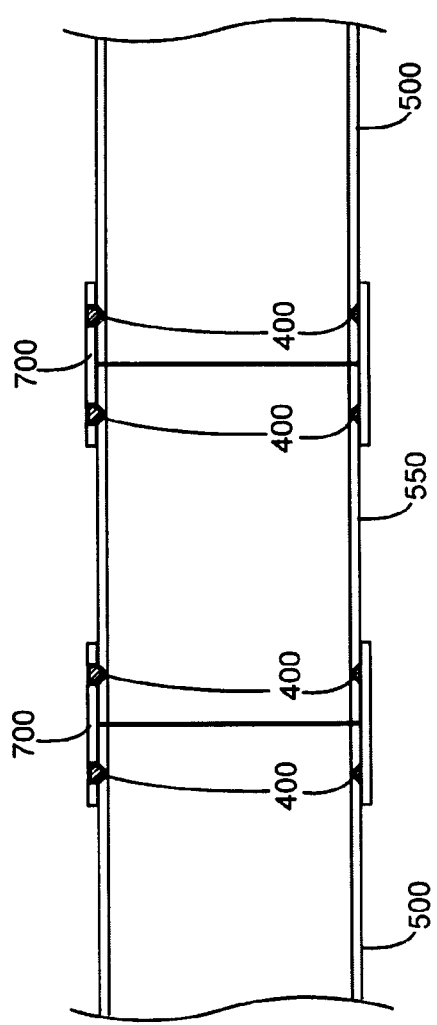

METHOD AND APPARATUS FOR CONNECTING PIPES

CROSS-REFERENCES TO RELATED APPLICATION

This application claims the benefit of priority under 35 USC 119 from Canadian Patent Application No. 2,828,855, filed on Sep. 27, 2013 entitled METHOD AND APPARATUS FOR CONNECTING PIPES, the specifications of which is incorporated herein by reference in its entirety.

FIELD

Embodiments disclosed herein relate generally to a method for connecting pipes and fittings, and more particularly to a method for joining pipes and fittings that involves the injection of pipe joining material into one or more grooves. Preferably, the pipes and fittings comprise a thermoplastic material such as polyvinyl chloride (PVC) and/or chlorinated polyvinyl chloride (CPVC).

INTRODUCTION

Piping systems are used to convey liquids or gasses within, or between, residential, commercial, and/or industrial buildings. For example, most residential buildings have a potable water distribution system for providing cold and/or hot water at one or more locations within the building (e.g. sinks, showers, dish or clothes washing machines).

Typically, piping systems are made up of a number of components including straight or curved pipe sections, fittings (e.g. elbow fittings), valves, etc. to provide an interior flow path for the liquid being conveyed. When assembling a piping system (such as a system comprising thermoplastic pipes), it is generally considered important to ensure that the components are joined in a manner that provides a seal against liquids or gasses flowing out from the interior of the piping system through the joints, and in a manner that provides a durable connection that prevents the components from separating due to mechanical and/or hydraulic stresses applied to the piping system.

Thermoplastic pipes and fittings may be joined by means of cement. It is known that, to joint two surfaces together, such as a pipe and a fitting, the joining surfaces should be softened and made semi-fluid. Sufficient cement should be applied to fill the gap between the surfaces to be joined. The pipe and fitting should be made while the surfaces are still wet and cement is still fluid. In some cases, a primer may be used to soften the surfaces to be joined.

While the basic steps are known, many different technologies have been developed to provide a reliable technique to join pipes and fittings. Once an installation is complete (e.g., the interior walls of a building are finished or a piping system is buried under a road), accessing the piping system to repair a leak is typically time consuming and expensive. Examples of systems that have been developed include U.S. Pat. No. 2,961,363; U.S. Pat. No. 3,307,997; U.S. Pat. No. 5,252,157; U.S. Pat. No. 5,529,656; U.S. Pat. No. 6,149,756; U.S. Pat. No. 6,431,282; U.S. Pat. No. 6,652,690; US 2001/0048223 A1; US 2006/0197338 A1; and DE 10 2009 061 082.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one broad aspect, there is provided a method and apparatus for joining parts of a piping system that uses a fitting wherein, when the part of the piping system is inserted into the fitting, or the fitting is inserted into the part of the piping system, a groove is provided between the abutting surfaces into which a pipe joining material, such as a cement, may be inserted. Accordingly, a space is provided between the parts to be joined into which the joining material may be injected. A passage through the exterior member (e.g. the fitting, if a pipe end is inserted into the fitting) may be pre-formed or drilled when the parts are to be joined. The passage is in communication with the groove and allows the parts that are to be joined to be mechanical fitted together and, once correctly positioned, for the joining material to then be inserted.

An advantage of this method and apparatus is that the parts may be dry-fitted and the cement subsequently injected. In addition, a space is provided for the cement so that all portions of the facing or abutting surfaces may be sealed. For example, if the parts are a tight fit, there may not be sufficient space between facing or abutting surfaces for receipt of the cement and therefore part of the facing or abutting surfaces may not be sealed to each other.

The groove may be formed in the outer wall of the inner member, the inner wall of the outer member, or both. The groove may be a continuous annular band and may be provided with one or more injection passages or it may comprise a plurality of discrete segments some or all of which are provided with one or more injection passages. The groove or the discrete segments may also be provided with vent holes for air to exit the groove.

The method and apparatus may be used to join one pipe with another pipe or a pipe with a fitting, such as a valve, splitter or the like. The pipe may be made of a thermoplastic material. The thermoplastic material may be one or more of acrylonitrile butadiene styrene (ABS), PVC, CPVC, ethylene vinyl acetate (EVA), polyethylene (PE), or the like.

In accordance with this aspect, there is provided a method of joining a first end of a first pipe and a first end of a second pipe using a hollow fitting, the fitting having first and second opposed ends and an interior cavity extending from a first opening provided in the first opposed end to a second opening provided in the second opposed end, the method comprising: (a) positioning each first end inside the fitting wherein a first groove is positioned proximate the first end of the first pipe and a second groove is provided proximate the first end of the second pipe and wherein each groove comprises an open annular region between an outer surface of the respective pipe and the inner surface of the fitting; and, (b) utilizing at least one injection passage that extends from an outer surface of the fitting to an inner surface of the fitting wherein each groove is in flow communication with an outlet end of the at least one injection passage to inject joining material into the grooves.

In some embodiments, step (b) may comprise drilling the at least one injection passage in the fitting.

In some embodiments, step (a) may comprise (i) providing the first groove in the outer surface of the first pipe and providing the second groove in the outer surface of the second pipe; and (ii) positioning the first end of each pipe inside the fitting with each groove in flow communication with the outlet end of the at least one injection passage.

In some embodiments, step (a) may comprise (i) providing the first groove in the interior surface of the fitting proximate the first opposed end of the fitting and providing the second groove in the interior surface of the fitting proximate the second opposed end of the fitting; and, (ii) positioning the first end of each pipe inside the fitting.

In some embodiments, the first groove may comprise a first recess in the outer surface of the first pipe and a first mating recess in the interior surface of the fitting proximate the first opposed end and the second groove may comprise a second recess in the outer surface of the second pipe and a second mating recess in the interior surface of the fitting proximate the second opposed end; and wherein step (a) may comprise positioning the first end of each pipe inside the fitting such that the first recess is generally aligned with the first mating recess and the second recess is generally aligned with the second mating recess.

In some embodiments, the at least one injection passage may comprise a first injection passage having an first injection passage outlet and a second injection passage having a second injection passage outlet and the method may further comprise positioning the first groove proximate the first injection passage outlet and positioning the second groove proximate the second injection passage outlet.

In some embodiments, the fitting may have at least one vent passage extending between the inner surface of the fitting and the outer surface of the fitting and the method may further comprise positioning an inlet of the at least one vent passage in flow communication with the first groove and providing a first sealing ring between the fitting and a portion of the first pipe positioned a further distance from the first end of the first pipe than the first groove.

In some embodiments, the at least one vent passage may also be in flow communication with the second groove and the method may further comprise providing a second sealing ring between the fitting and a portion of the second pipe positioned a further distance from the first end of the second pipe than the second groove.

In some embodiments, the method may further comprise injecting the joining material until a signal is received that the first groove and a space between the first pipe and the fitting is filled with the joining material.

In some embodiments, the signal may comprise joining material exiting the vent passage.

In some embodiments, the signal may comprise joining material exiting a space between the fitting and the outer surface of one of the first and second pipes.

In some embodiments, the joining material may be injected at a temperature from 60-200° C.

In some embodiments, the joining material may be injected at a temperature from 100-150° C.

In some embodiments, the joining material may comprise from 5-100 wt % EVA and from 0-95 wt % PVC or CPVC, based on a total weight of the joining material.

In some embodiments, the joining material may comprise from 45-75 wt % EVA and from 25-55 wt % PVC or CPVC, based on a total weight of the joining material.

In another broad aspect, there is provided a method and apparatus for repairing a pipe which utilizes two fittings and a new section of pipe. In accordance with this aspect, a section of pipe is removed, and each end of the replacement part of the pipe may be joined to an existing part of the piping system using a fitting described with respect to the first aspect. In a preferred embodiment, each fitting is a single unitary body that is slid onto an existing part of the piping system or the replacement section of pipe before the replacement section of pipe is placed in position. It will be appreciated that, in some cases, each fitting may comprise two or more parts (e.g., semi-cylindrical halves) that are joined together.

In accordance with this aspect, there is provided a method of repairing a pipe, the method comprising: (a) removing a section of a pipe to be repaired and leaving a first and second spaced apart ends of the pipe to be repaired; (b) providing a first hollow fitting on the first end of the pipe to be repaired, the first hollow fitting having first and second opposed ends and an interior cavity extending from a first opening provided in the first opposed end to a second opening provided in the second opposed end; (c) providing a second hollow fitting on the second end of the pipe to be repaired, the second hollow fitting having first and second opposed ends and an interior cavity extending from a first opening provided in the first opposed end to a second opening provided in the second opposed end; (d) positioning a replacement section of pipe between the first and second spaced apart ends of the pipe to be repaired, the replacement section of pipe having first and second opposed ends; (e) positioning the first hollow fitting to overlie each of the first opposed end of the replacement section of pipe and the first end of the pipe to be repaired wherein a first groove is positioned proximate the first opposed end of the replacement section of pipe and a second groove is provided proximate the first end of the pipe to be repaired and wherein each groove comprises an open annular region between an outer surface of the respective pipe and the inner surface of the first hollow fitting; (f) utilizing at least one first hollow fitting injection passage that extends from an outer surface of the first hollow fitting to an inner surface of the first hollow fitting wherein the first and second grooves are in flow communication with an outlet end of the at least one first hollow fitting injection passage to inject joining material into the first and second grooves; (g) positioning the second hollow fitting to overlie each of the second opposed end of the replacement section of pipe and the second end of the pipe to be repaired wherein a third groove is positioned proximate the second opposed end of the replacement section of pipe and a fourth groove is provided proximate the second end of the pipe to be repaired and wherein each groove comprises an open annular region between an outer surface of the respective pipe and the inner surface of the second hollow fitting; and (h) utilizing at least one second hollow fitting injection passage that extends from an outer surface of the second hollow fitting to an inner surface of the second hollow fitting wherein the third and fourth grooves are in flow communication with an outlet end of the at least one second hollow fitting injection passage to inject joining material into the third and fourth grooves.

In some embodiments, step (f) may comprise drilling the at least one first hollow fitting injection passage in the first hollow fitting and step (h) may comprise drilling the at least one second hollow fitting injection passage in the second hollow fitting.

In some embodiments, step (f) may comprise drilling first and second first hollow fitting injection passages in the first hollow fitting and step (h) may comprise drilling third and fourth second hollow fitting injection passages in the second hollow fitting, wherein each injection passage has an outlet proximate a groove.

In some embodiments, step (e) may comprise providing the first groove in the outer surface of the first opposed end of the replacement section of pipe and providing the second groove in the outer surface of the first spaced apart end of the pipe to be repaired; and wherein step (g) may comprise providing the third groove in the outer surface of the second opposed end of the replacement section of pipe and providing the fourth groove in the outer surface of the second spaced apart end of the pipe to be repaired.

In some embodiments, step (e) may comprise providing the first groove in the interior surface of the first hollow fitting proximate the first opposed end of the first hollow fitting and providing the second groove in the interior surface of the first hollow fitting proximate the second opposed end of the first hollow fitting; and wherein step (g) may comprise providing the third groove in the interior surface of the second hollow fitting proximate the first opposed end of the second hollow fitting and providing the fourth groove in the interior surface of the second hollow fitting proximate the second opposed end of the second hollow fitting.

In some embodiments, step (e) may comprise providing the first groove in the interior surface of the first hollow fitting proximate the first opposed end of the first hollow fitting and providing the second groove in the outer surface of the first spaced apart end of the pipe to be repaired; and wherein step (g) may comprise providing the third groove in the interior surface of the second hollow fitting proximate the first opposed end of the second hollow fitting and providing the fourth groove providing in the outer surface of the second spaced apart end of the pipe to be repaired.

In some embodiments, (i) the first groove may comprise a first recess in the outer surface of the first opposed end of the replacement section of pipe and a first mating recess in the interior surface of the first hollow fitting proximate the first opposed end of the first hollow fitting and the second groove may comprise a second recess in the outer surface of the first spaced apart end of the pipe to be repaired and a second mating recess in the interior surface of the first hollow fitting proximate the second opposed end of the first hollow fitting and wherein step (e) may comprise positioning the first opposed end of the replacement section of pipe and the first spaced apart end of the pipe to be repaired inside the first hollow fitting such that the first recess is generally aligned with the first mating recess and the second recess is generally aligned with the second mating recess; and (ii) the third groove may comprise a third recess in the outer surface of the second opposed end of the replacement section of pipe and a third mating recess in the interior surface of the second hollow fitting proximate the first opposed end of the second hollow fitting and the fourth groove may comprise a fourth recess in the outer surface of the second spaced apart end of the pipe to be repaired and a fourth mating recess in the interior surface of the second hollow fitting proximate the second opposed end of the second hollow fitting and wherein step (g) may comprise positioning the second opposed end of the replacement section of pipe and the second spaced apart end of the pipe to be repaired inside the second hollow fitting such that the third recess is generally aligned with the third mating recess and the fourth recess is generally aligned with the fourth mating recess.

In some embodiments, the at least one injection passage of the first hollow fitting may comprise a first injection passage having a first injection passage outlet and a second injection passage having a second injection passage outlet, wherein the at least one injection passage of the second hollow fitting may comprise a third injection passage having a third injection passage outlet and a fourth injection passage having a fourth injection passage outlet, and the method may further comprise positioning the first groove proximate the first injection passage outlet, positioning the second groove proximate the second injection passage outlet, positioning the third groove proximate the third injection passage outlet, and positioning the fourth groove proximate the fourth injection passage outlet.

In some embodiments, the method may further comprise injecting the joining material through the at least one first hollow fitting injection passage until a first signal is received that the first groove and the second groove are filled with the joining material, and the method may further comprise injecting the joining material through the at least one second hollow fitting injection passage until a second signal is received that the third groove and the fourth groove are filled with the joining material.

In some embodiments, the first signal may comprise joining material exiting a space between the first hollow fitting and the outer surface of one of the first opposed end of the replacement section of pipe and the first end of the pipe to be repaired and the second signal may comprise joining material exiting a space between the second hollow fitting and the outer surface of one of the second opposed end of the replacement section of pipe and the second end of the pipe to be repaired.

In some embodiments, the joining material may be injected at a temperature from 60-200° C.

In some embodiments, the joining material may be injected at a temperature from 100-150° C.

In some embodiments, the joining material may comprise from 5-100 wt % EVA and from 0-95 wt % PVC or CPVC, based on a total weight of the joining material.

In some embodiments, the joining material may comprise from 45-75 wt % EVA and from 25-55 wt % PVC or CPVC, based on a total weight of the joining material.

In another broad aspect, there is provided a hollow fitting for repairing a pipe which may be used with any other aspect or embodiment disclosed herein. In accordance with this aspect, there is provided a hollow fitting comprising at least one injection passage that extends from an outer surface of the fitting to an inner surface of the fitting, the fitting having first and second opposed ends and an interior cavity extending from a first opening provided in the first opposed end to a second opening in the second opposed and a first annular recess provided in the inner surface proximate the first opposed end and a second annular recess provided in the inner surface proximate the second opposed end.

In some embodiments, the hollow fitting may further comprise a first injection passage that extends from an outer surface of the hollow fitting to an inner surface of the hollow fitting.

In some embodiments, an outlet end of the first injection passage may be provided in the first annular recess and an outlet end of the second injection passage may be provided in the second annular recess.

In another broad aspect, there is provided a method of joining an end of a first pipe and an end of a second pipe, the end of the first pipe having an outer annular end surface, the end of the second pipe having a pipe receiving opening, an interior abutment surface positioned spaced inwardly from the pipe receiving opening, and an interior end surface between the interior abutment surface and the pipe receiving opening, the method comprising: (a) inserting the end of the first pipe into the end of the second pipe such that the outer annular end surface abuts the interior abutment surface, wherein a groove is positioned between the interior abutment surface and the pipe receiving opening, the groove comprising an open annular region between an outer surface of the first pipe and the interior end surface; and, (b) utilizing an injection passage that extends from an outer surface of the second pipe to an inner surface of the second pipe wherein the groove is in flow communication with an outlet end of injection passage to inject joining material into the groove.

In some embodiments, the groove may be provided in the outer surface of the first pipe.

In some embodiments, the groove may be provided in the interior end surface of the second pipe.

In some embodiments, the groove may comprise a first recess in the outer surface of the first pipe and a second recess in the interior end surface of the second pipe, and wherein the first recess is aligned with the second recess when the annular end surface abuts the interior abutment surface.

In some embodiments, the method may further comprise providing the end of the first pipe with a chamfer so that a diameter of the outer annular end surface is less than a diameter of the interior surface of the second pipe.

In some embodiments, the chamfer may be between 0.5° to 10°.

In some embodiments, the chamfer may be between 1° to 5°.

In some embodiments, the chamfer may be between 2° to 4°.

In some embodiments, the method may further comprise chamfering the end of the first pipe to provide the chamfer.

In some embodiments, the method may further comprise reaming the interior end surface so that a diameter of the interior end surface is greater than a diameter of the outer surface of the first pipe.

In some embodiments, at least one surface of the groove may be roughened.

In some embodiments, the method may further comprise roughening the at least one surface of the groove.

In some embodiments, the method may further comprise drilling the injection passage in the second pipe.

In some embodiments, the injection passage may be drilled while the end of the first pipe is been positioned inside the end of the second pipe.

In some embodiments, the method may further comprise using a single multi-function tool to drill the injection passage and to inject the joining material.

In another broad aspect, there is provided a method of connecting first and second parts of a piping system utilizing an injection tool having an actuator, the method comprising: (a) inserting an end of the first part into an open end of the second part wherein an interstitial space is provided between an inner surface of the second part and an outer surface of the first part; (b) providing an injection tool having an actuator, the actuator being calibrated such that each actuation of the actuator ejects a volume of pipe joining material that is equal in volume to at least a third of a volume of the interstitial space; (c) positioning the injection tool in flow communication with the interstitial space; and (d) actuating the actuator up to three times to fill the interstitial space with pipe joining material.

In some embodiments, the actuator comprises a squeeze trigger and the method further comprises squeezing the actuator up to three times to fill the interstitial space with pipe joining material.

In some embodiments, the actuator is calibrated such that each actuation of the actuator ejects a volume of pipe joining material that is equal in volume to at least half of the volume of the interstitial space, and wherein the actuating comprises actuating the actuator up to two times.

In some embodiments, the pipe joining material is provided as a solid stick and step (d) comprises actuating the actuator up to three times to advance the solid stick a corresponding number of times into a heating section of the injection tool and ejecting liquefied pipe joining material into the interstitial space to fill the interstitial space with pipe joining material.

In some embodiments, the solid stick is provided with engagement members and the actuator is drivingly connected to mating engagement members whereby actuating the actuator causes the mating engagement members to advance the solid stick into the heating section.

In some embodiments, the actuator comprises a squeeze trigger, the solid stick is provided with engagement members and the actuator is drivingly connected to mating engagement members whereby squeezing the actuator causes the mating engagement members to advance the solid stick into the heating section.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below. The methods and apparatus described herein may be used to connect pipes of various materials (e.g. metallic pipes, thermoplastic pipes) to create piping systems for transporting various liquids or gasses.

Furthermore, the methods and apparatus may have be applied to different sizes of piping, and/or piping systems made of different materials, and therefore may be applicable to piping systems for conveying potable water, non-potable or waste water, or other liquids and/or gasses.

BRIEF DESCRIPTION OF THE DRAWINGS

For a better understanding of the described embodiments and to show more clearly how they may be carried into effect, reference will now be made, by way of example, to the accompanying drawings in which:

FIG. 29 is a front view of an end of a pipe that has been chamfered, grooved, and cut using the pipe cutting tool of FIG. 20;

FIG. 37 is an exploded side view of a section of pipe being repaired using a pair of hollow fittings in accordance with another embodiment;

FIG. 38 is a cross section view of the section of pipe of FIG. 37 being repaired using a pair of hollow fittings;

DESCRIPTION OF EXAMPLE EMBODIMENTS

Figure 1:
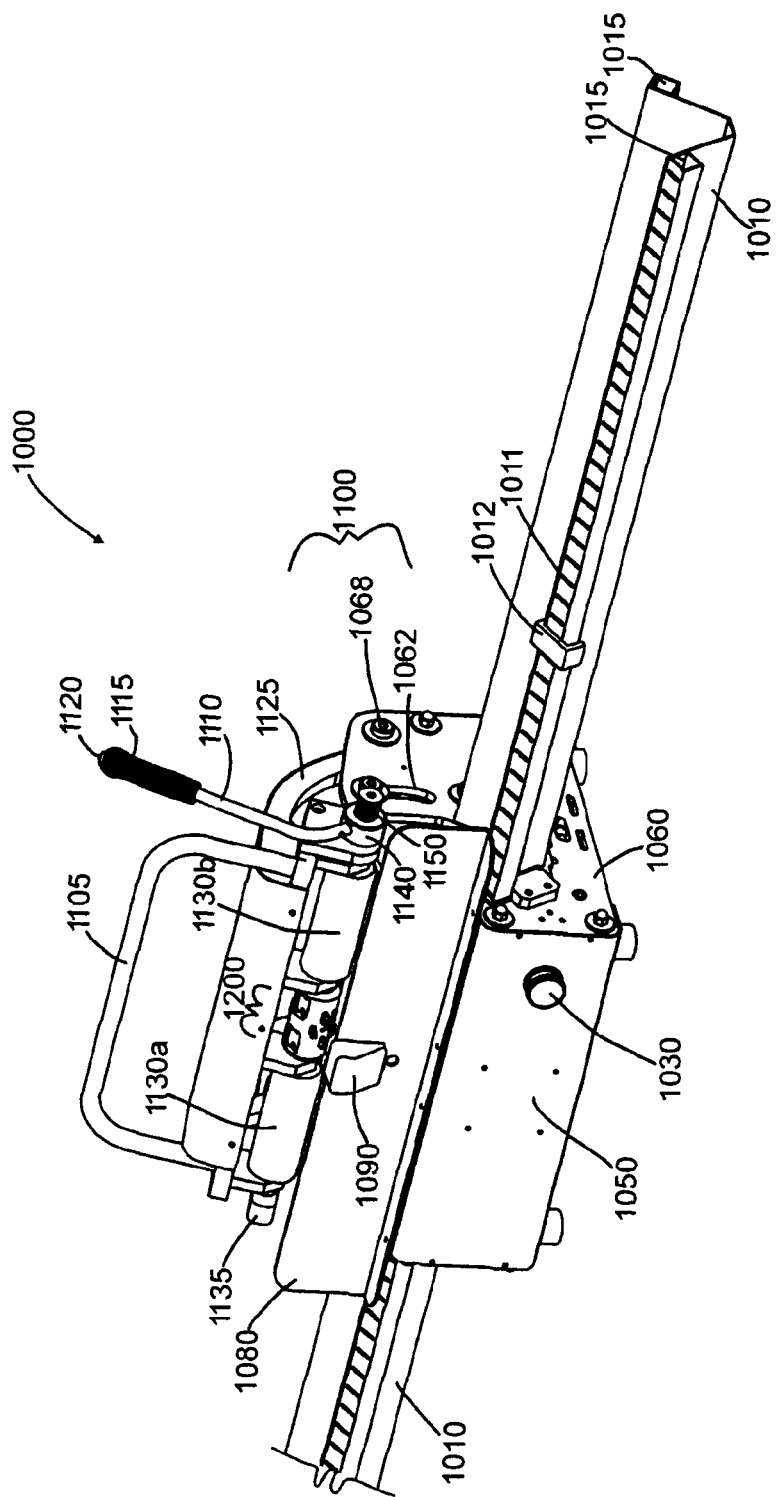
FIG. 1 is a front perspective view of a pipe cutting tool in accordance with one embodiment.

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The apparatuses, methods and compositions may be used with piping systems made of various materials. The pipes and/or fittings to be connected may be made of a thermoplastic material. The thermoplastic material may be one or more of acrylonitrile butadiene styrene (ABS), PVC, CPVC, ethylene vinyl acetate (EVA), polyethylene (PE) or the like.

Preferably, the thermoplastic material is one or more of PVC and CPVC. The pipes and/or fittings to be connected may be made of the same material or they may be made of different materials.

The drawings exemplify the use of the apparatuses, methods and compositions to connect sections or pipe together using a hollow filling. It will be appreciated that the same apparatuses, methods and compositions may be used to connect any parts of a piping system together or to repair any part of a piping system. For example, the apparatuses, methods and compositions may be used to connect a pipe with a fitting such as a valve, splitter, or the like, or to connect one fitting with another fitting.

It will be appreciated that some apparatuses and methods may use one or both of the pipe cutting tool and the pipe sealing tool disclosed herein. For example, in some embodiments, the pipe cutting tool disclosed herein may be used as part of the apparatuses and methods. In other cases, a different pipe cutting tool may be used or the fittings and/or pipes may be formed with one or more of the grooves, passages, and/or chamfers disclosed herein. Alternatively, or in addition, in some cases the pipe sealing tool disclosed herein may be used as part of the apparatuses and methods. In other cases, a different pipe sealing tool or tools may be used.

Pipe Cutting Tool

Reference is now made to FIGS. 1 to 29, which exemplify a pipe cutting tool 1000, which may also be referred to as a pipe cutting apparatus that may be used with any apparatus or method disclosed herein or may be used by itself.

Tool 1000 includes a base or lower portion, referred to generally as 1005, for supporting a pipe to be cut, and an upper frame or clamping member, referred to generally as 1100, movable relative to the base for securing a pipe to be cut therebetween, as will be discussed further subsequently.

Tool 1000 receives a pipe that it to be prepared for the methods disclosed herein. Accordingly tool 1000 may be provided with two optional pipe supporting trough extensions 1010, each extending outwardly from opposite sides of base 1005. Pipe supporting trough extensions 1010 are positioned and configured so as to support pipe that is being machined by tool 1000, and are preferably sized to compliment a trough 1020 in the base 1005 that is configured to support a pipe to be cut, as will be discussed further subsequently.

As pipe supporting trough extensions 1010 preferably extend a substantial distance from base 1005, pipe supporting trough extensions 1010 may be configured or reinforced to maintain their profile during use. For example, one or more stiffening members 1015 may be provided to prevent pipe supporting trough extension 1010 from bending and/or the profile of pipe supporting trough extensions 1010 may be configured to provide strength. It will be appreciated that in some embodiments, only one pipe supporting trough extension 1010 may be provided, and in some embodiments, no pipe supporting trough extensions may be provided.

Optionally, one or more adjustable pipe stops 1012 may be provided in each pipe supporting trough extension 1010, to assist in positioning a pipe to be cut so that a section of cut pipe has a desired length. Alternatively, or in addition, a ruler or the like may be included in the extensions 1010 for use in determining where to machine a pipe.

Tool 1000 may also include an emergency stop switch 1030 and/or a safety shield 1080 mounted to base 1005. Safety shield 1080 is preferably made from a durable, translucent material (e.g. poly(methyl methacrylate) or a similar translucent thermoplastic).

A visual alignment aid, such as laser pointer 1090 or a mechanical pointer, may also be provided, such as by being mounted to safety shield 1080 and/or base 1005, to assist a user in aligning a pipe to be cut.

Figure 2:
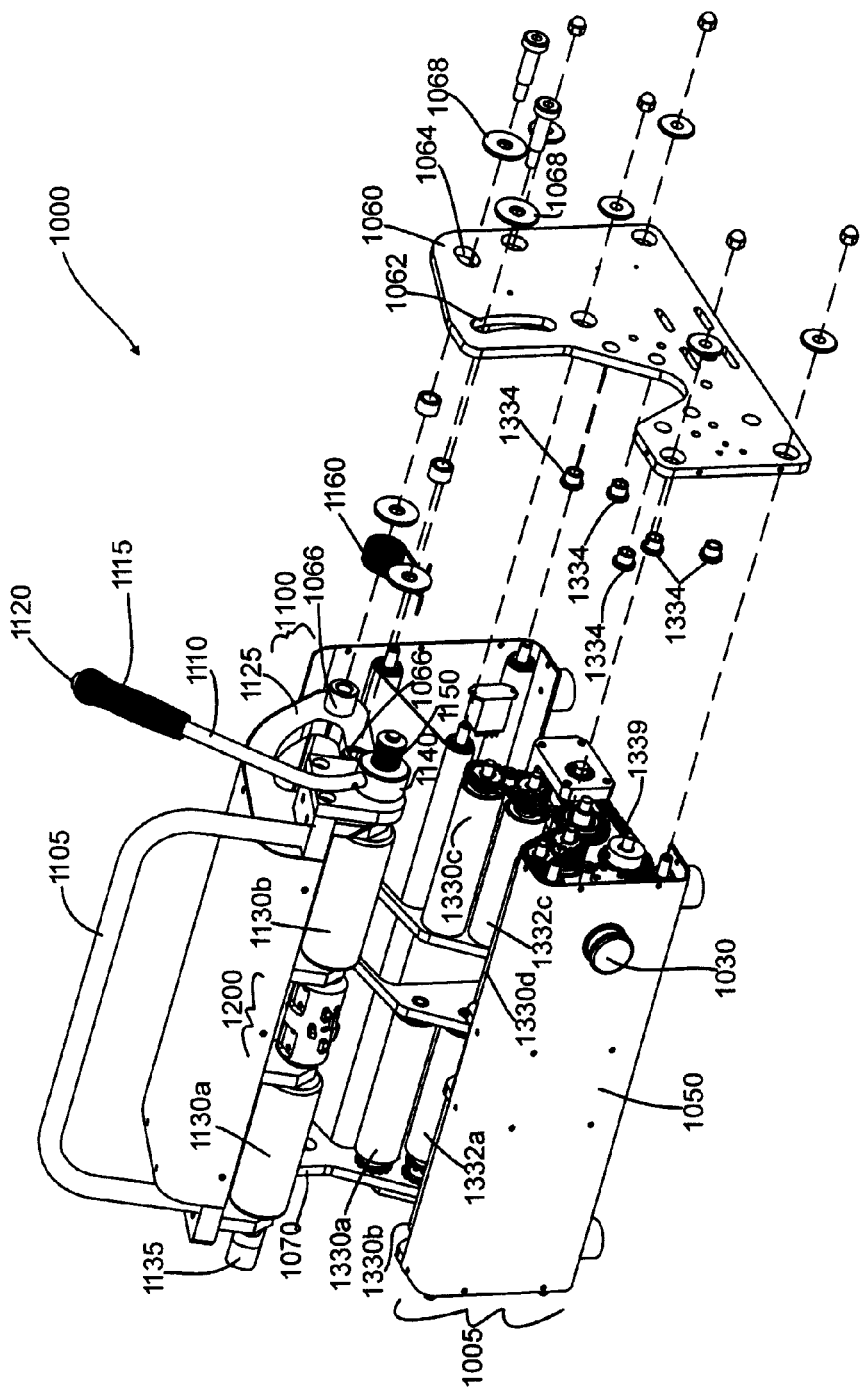
FIG. 2 is a partially-exploded front perspective view of the pipe cutting tool of FIG. 1.
Figure 3:
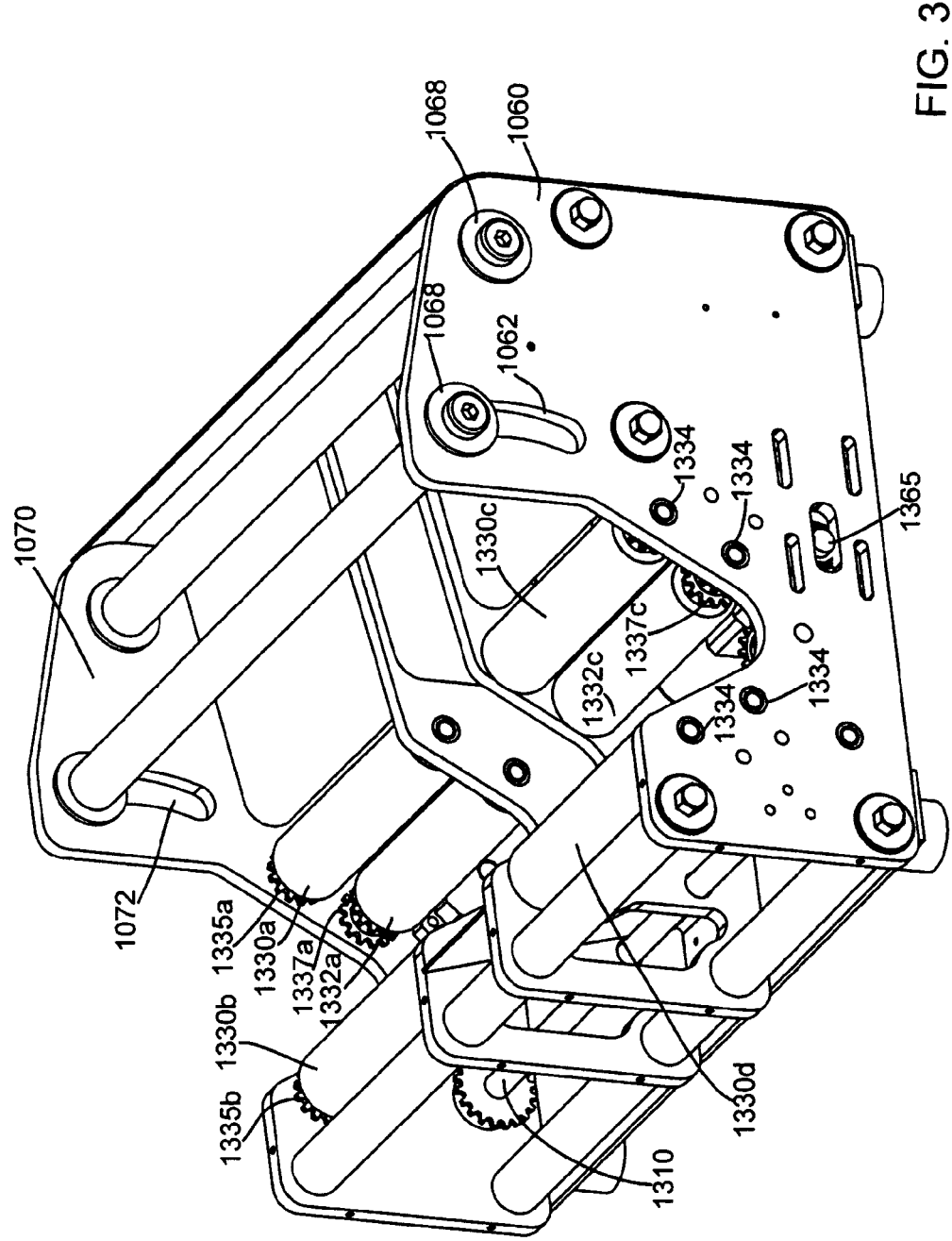
FIG. 3 is a perspective view of the pipe cutting tool of FIG. 1 with certain components removed.
Figure 4:
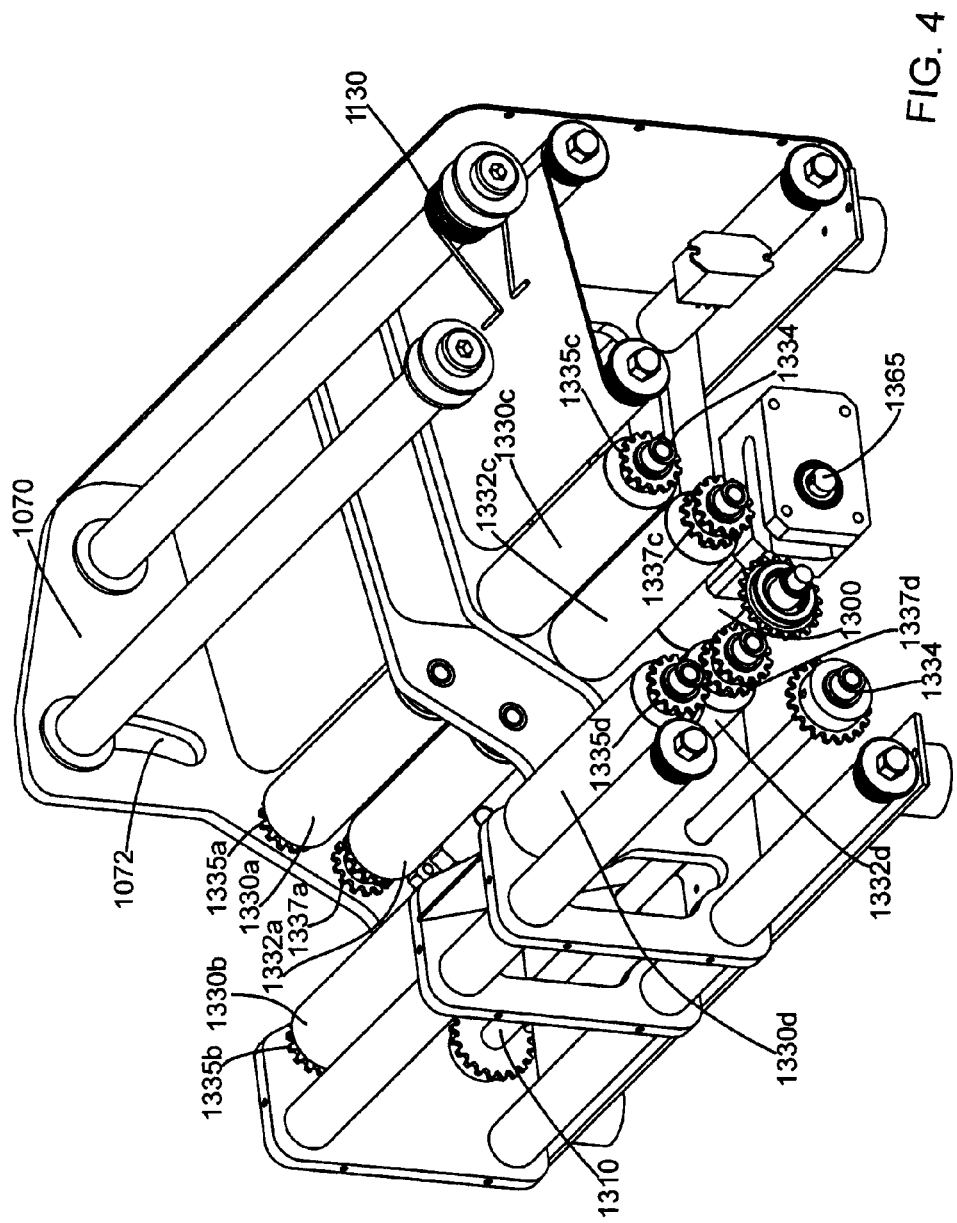
FIG. 4 is a perspective view of the pipe cutting tool of FIG. 1 with additional components removed.

As exemplified in FIG. 2, base 1005 may also have a support member for rollingly supporting a pipe as the pipe is machined. For example, base 1005 may comprise a plurality of rollers for supporting and, preferably, rotating a pipe to be cut. In the illustrated embodiment, two pairs of first lower rollers, 1330*a-b* and 1330*c-d*, are provided. Also, two pairs of second lower rollers, 1332*a-b* and 1332*c-d*, are also provided. As perhaps best seen in FIGS. 16 to 19, the first and second lower rollers may be arranged in generally V-shaped trough 1020 in base 1005. This arrangement allows tool 1000 to be used to cut pipes of different diameters, with larger diameter pipes being supported by first lower rollers 1330*a-d* (see e.g. FIGS. 16 and 17), and smaller diameter pipes being supported by second lower rollers 1332*a-d* (see e.g. FIGS. 18 and 19) than are positioned below first lower rollers 1330*a-d*.

A pipe that is positioned in tool 1000 is rotated as it is machined. As exemplified, upper and lower rollers are provided. It will be appreciated that one or both of the upper and lower rollers may be driven by a motor so as to rotate when the motor is energized. Accordingly, when the pipe is clamped between the upper and lower rollers and the motor energized, one or more rollers will rotate and this will cause the pipe to rotate while secured in position in tool 1000. Preferably, as exemplified, the lower rollers are driven.

As exemplified, each set of lower rollers comprises two first forward rollers and two second lower rollers. An advantage of this design is that cutting apparatus 1200 may be used to cut a pipe in half without the cutting tool contacting any of the lower rollers.

The lower rollers and the upper rollers may be mounted and optionally driven by any mechanism known in the machining arts. Returning to FIGS. 2 and 4, each of lower rollers 1330*a-d* and 1332*a-d* are mounted on base 1005 using a bearing or bushing 1334 on each end of each roller, allowing the rollers to rotate about their longitudinal axes. Each lower roller 1330*a-d* and 1332*a-d* also has at least one associated sprocket 1335*a-d* and 1337*a-d*. One or more chains 1339 allow the lower rollers to be driven by motor 1300 via a sprocket and chain drive. A separate drive shaft 1310 may be provided in base 1005 so that all lower rollers are synchronously driven.

First lower rollers 1330*a-d* and second lower rollers 1332*a-d* are preferably made from (or provided with an outer surface comprising) a material that has a relatively high coefficient of friction with the outer surface of a pipe to be cut, so that a pipe can be rotated by lower rollers with minimal slippage. For example, where tool 1000 is to be used to cut PVC or CPVC pipes, the outer surface of driven rollers, which are preferably the lower rollers 1330*a-d*, 1332*a-d* may be made of or comprise a material having a sufficient coefficient of friction to cause the pipe to rotate. The material may be one or more of a polyurethane, silicone, rubber or the like. In some embodiments, lower rollers 1330*a-d*, 1332*a-d* may comprise a layer of polyurethane, silicone, rubber or the like applied to an aluminum cylinder, for example, by over molding. The outer surface of rollers that are not driven, which are preferably the upper rollers, may be made of or comprise any material in the material handling arts such as a metal or they may be made of or comprise the same material as the driven rollers.

Preferably, first lower rollers 1330*a-d* and second lower rollers 1332*a-d* each have the same outer diameter, and as noted above are preferably rotated at a constant speed. As will be appreciated, this configuration results in the lower rollers rotating a pipe to be cut at a constant surface speed, regardless of the diameter of the pipe being rotated. That is, while a smaller diameter pipe being supported and rotated (e.g. by second lower rollers 1332a-d) may be rotated at a higher number of revolutions per minute (RPM) as compared with a larger diameter pipe being supported and rotated (e.g. by first lower rollers 1330a-d), since the surface speed of each lower roller is the same, the surface speed of any pipe being rotated by the lower rollers will be the same (assuming no slippage between the lower rollers and the pipe being rotated). It will be appreciated that first lower rollers 1330a-d and second lower rollers 1332a-d may rotate at different speeds and/or the rate of rotation may be adjustable.

Looking at FIG. 2, upper frame 1100 preferably includes a handle 1105, which is used to move upper frame 1100 relative to base 1005. Biasing member 1160 may be provided to bias upper frame 1100 towards an open position, as shown in FIG. 1. Handle 1105 may be connected to frame members 1125, which also support a pair of upper rollers 1130a-b and a cutting apparatus, referred to generally as 1200.

Figure 5:
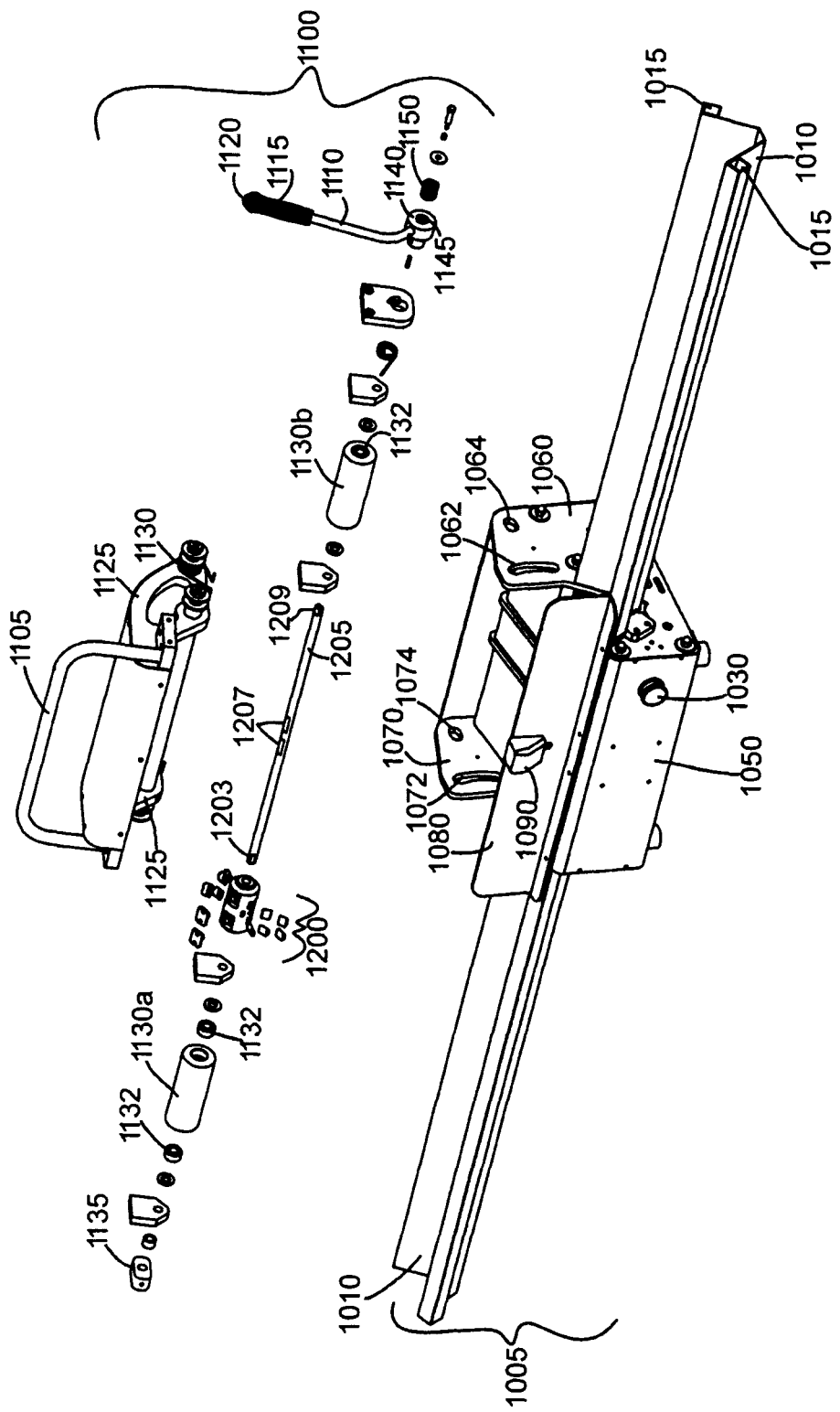
FIG. 5 is a partially exploded front perspective view of the pipe cutting tool of FIG. 1.

Unlike lower rollers 1330a-d and 1332a-d, upper rollers 1130a-b are preferably not driven, and are instead free to rotate about shaft 1205 (see FIG. 5). In use, when a pipe is supported by first lower rollers 1330a-d or second lower rollers 1332a-d, upper frame may be moved towards base 1005 until upper rollers 1130a-b contact the outer surface of the pipe, effectively clamping the pipe between upper rollers 1130a-b and first lower rollers 1330a-d (for larger diameter pipes) (an upper clamping position) or second lower rollers 1332a-d (for smaller diameter pipes) (a lower clamping position). Once a pipe to be cut has been clamped between the upper and lower rollers, engaging motor 1300 (e.g. using switch 1120) causes the lower rollers to rotate the pipe to be cut. This will also cause the upper rollers, if they are not driven, to rotate.

It will be appreciated that while the term "rollers" has been used, that any member that permits a pipe to be rotatably supported in tool 1000, or to be rotated while supported in tool 1000, may be used. For example, a belt may be provided that extends between two rollers, at least one of which is driven. Accordingly the belt may be fashioned similar to a conveyor belt. The belt may be positioned to engage and drive the pipe so as to cause the pipe to rotate while supported by non-driven rollers.

A single set of upper rollers is exemplified. The single set may accommodate pipes of any diameter. However, it will be appreciated that more than one set of upper rollers may be provided, each selected for use with different sizes of pipe.

Upper rollers 1130a-b are preferably made of a wear-resistant material, such as steel or aluminum, as the diameter of these rollers provides a fixed reference diameter for a depth of one or more tool bits of cutting apparatus 1200 engaging a pipe to be cut, as will be discussed subsequently. These rollers may be mode from or may be coated with a material that has a relatively high coefficient of friction.

A lever 1110 may also be provided to allow cutting apparatus 1200 to be rotated relative to frame members 1125. It will be appreciated that cutting apparatus may be manually moveable as exemplified or it may be automatically energized and moved when upper frame 1100 is moved to a clamping position.

A gripping surface 1115 may be provided on lever 1110, along with an optional switch 1120 for selectively actuating motor 1300. Alternatively, it will be appreciated that motor 1300 may be automatically energized when frame member 1125 is moved to a clamping position.

As exemplified in FIG. 5, cutting apparatus 1200 and upper rollers 1130a-b are mounted on shaft 1205, which is supported by upper frame 1100. Upper rollers 1130a-b may be mounted on one or more bearings 1132 on each end of each roller, allowing the rollers to rotate about shaft 1205. Preferably, bearings 1132 allow for axial displacement of shaft 1205 relative to upper rollers 1130a-b when reorienting cutting apparatus 1200, as will be discussed further subsequently. Bearings 1132 may be needle bearings.

Figure 6:
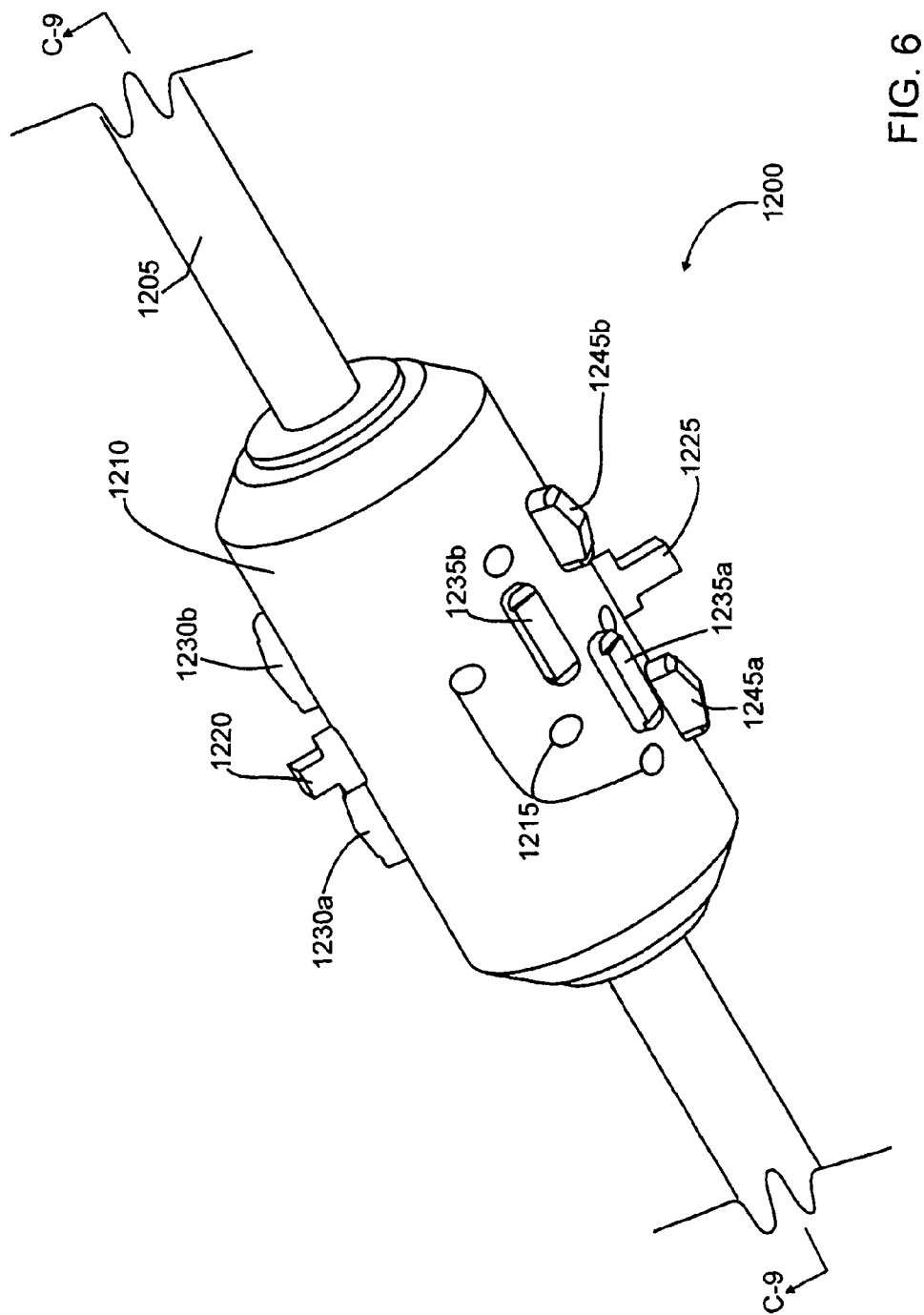
FIG. 6 is a perspective view of a cutting apparatus of the pipe cutting tool of FIG. 1.

As exemplified in FIG. 6, cutting apparatus 1200 may be configured to chamfer, groove, and cut a pipe. The machining operations may be conducted in any order. Preferably, the chamfering and grooving are conducted before the pipe is cut.

As exemplified, cutting apparatus 1200 includes a single cutter hub 1210 mounted on shaft 1205 which is adapted to chamfer, groove, and cut the pipe. Accordingly, cutter hub 1210 may support a number of tool bits, including: one or more cutting tool bits 1220 and 1225; one or more chamfering tool bits 1230a, 1230b, and 1235a, 1235b; and one or more grooving tool bits 1240a, 1240b, and 1245a, 1245b. In addition to slots in which the tool bits are inserted, a plurality of holes 1215 are provided to allow set screws or other mechanical fasteners to be used to secure the tool bits to cutter hub 1210. If provided, the additional cutting, chamfering, and cutting tools bits may be configured for cutting pipes having a different diameter.

Figure 7:
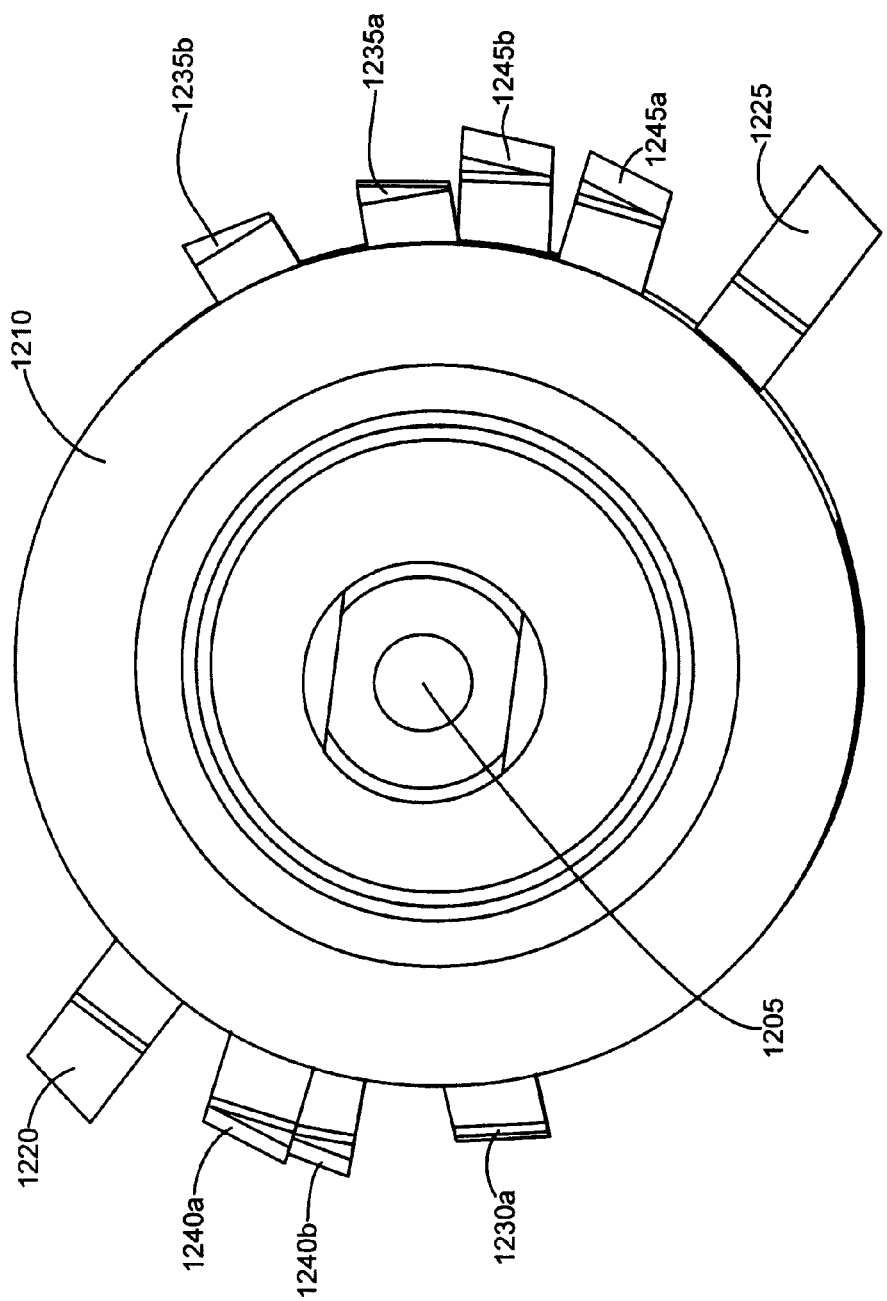
FIG. 7 is an end view of the cutting apparatus of FIG. 6.
Figure 8:
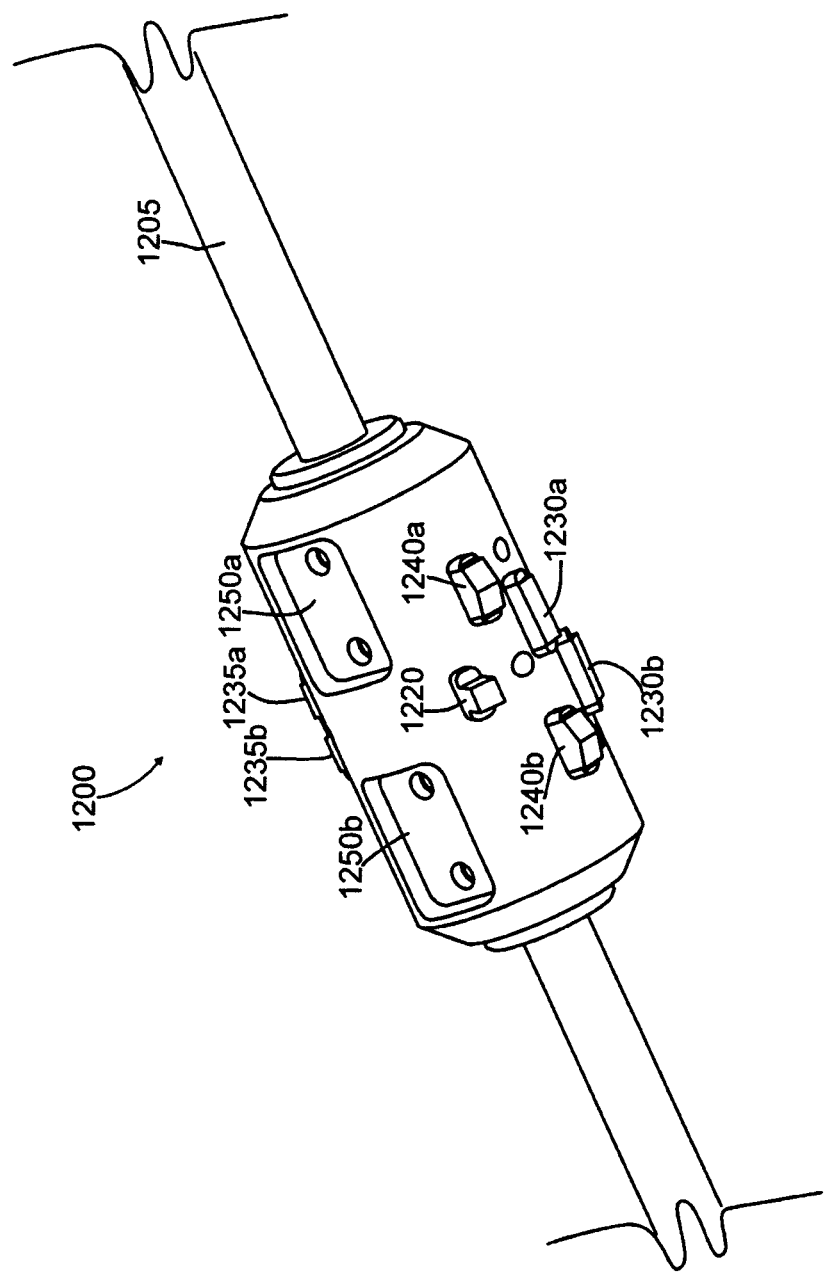
FIG. 8 is another perspective view of a cutting apparatus of the pipe cutting tool of FIG. 1.
Figure 9:
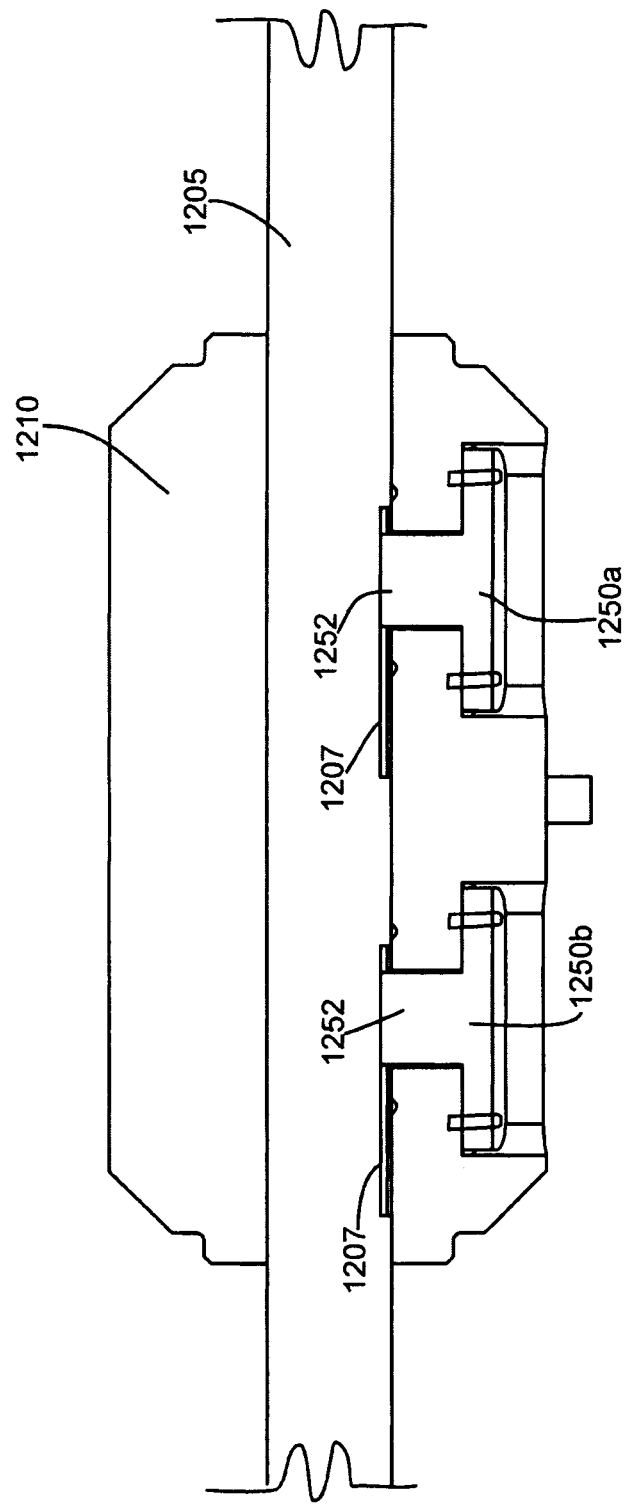
FIG. 9 is a cross section view along line C-9-C-9 in FIG. 6 of the cutting apparatus of FIG. 6.

Turning to FIG. 7, in some embodiments a first set of tool bits 1220, 1230a-b, and 1240a-b may be provided on one side of cutter hub 1210, while a second set of tool bits 1225, 1235a-b, and 1245a-b may be provided on the other side of cutter hub 1210. As will be discussed subsequently, the first set of tool bits may be used when machining pipes supported in the first set of lower rollers, while the second set of tool bits may be used when machining pipes supported in the second set of lower rollers.

It will be appreciated that, in alternate embodiments, more than one cutting hub 1210 may be provided. For example, a cutting hub may be provided for chamfering a pipe, a cutting hub may be provided for grooving a pipe, and a cutting hub may be provided for cutting a pipe. Alternatively, or in addition, a cutting hub may be provided for machining pipes supported in the first set of lower rollers, while another cutting hub may be used when machining pipes supported in the second set of lower rollers.

In some embodiments, cutter hub 1210 or the cutting tools may be moveable. For example, in some embodiments, cutter hub 1210 may rotate or vibrate so as to cut a pipe. In such a case, the pipe may or may not rotate while in the tool 1000. Accordingly, the rollers may be configured to non-rotatably hold a pipe.

Cutter hub 1210 may be non-rotatably mounted on shaft 1205 using any mechanism known in the machining arts, such as welding, set screws, a key or the like. As exemplified in FIGS. 8 and 9, cutter hub 1210 may be mounted on shaft 1205 using one or more T-shaped key members 1250a-b. More specifically, a flange 1252 of each key member 1250a-b may extend into one or more slots 1207 in shaft 1205, preventing cutter hub 1210 from rotating about shaft 1205, while allowing cutter hub 1210 to be axially displaced relative to shaft 1205 when reorienting cutting apparatus 1200, as will be discussed subsequently.

Figure 10:
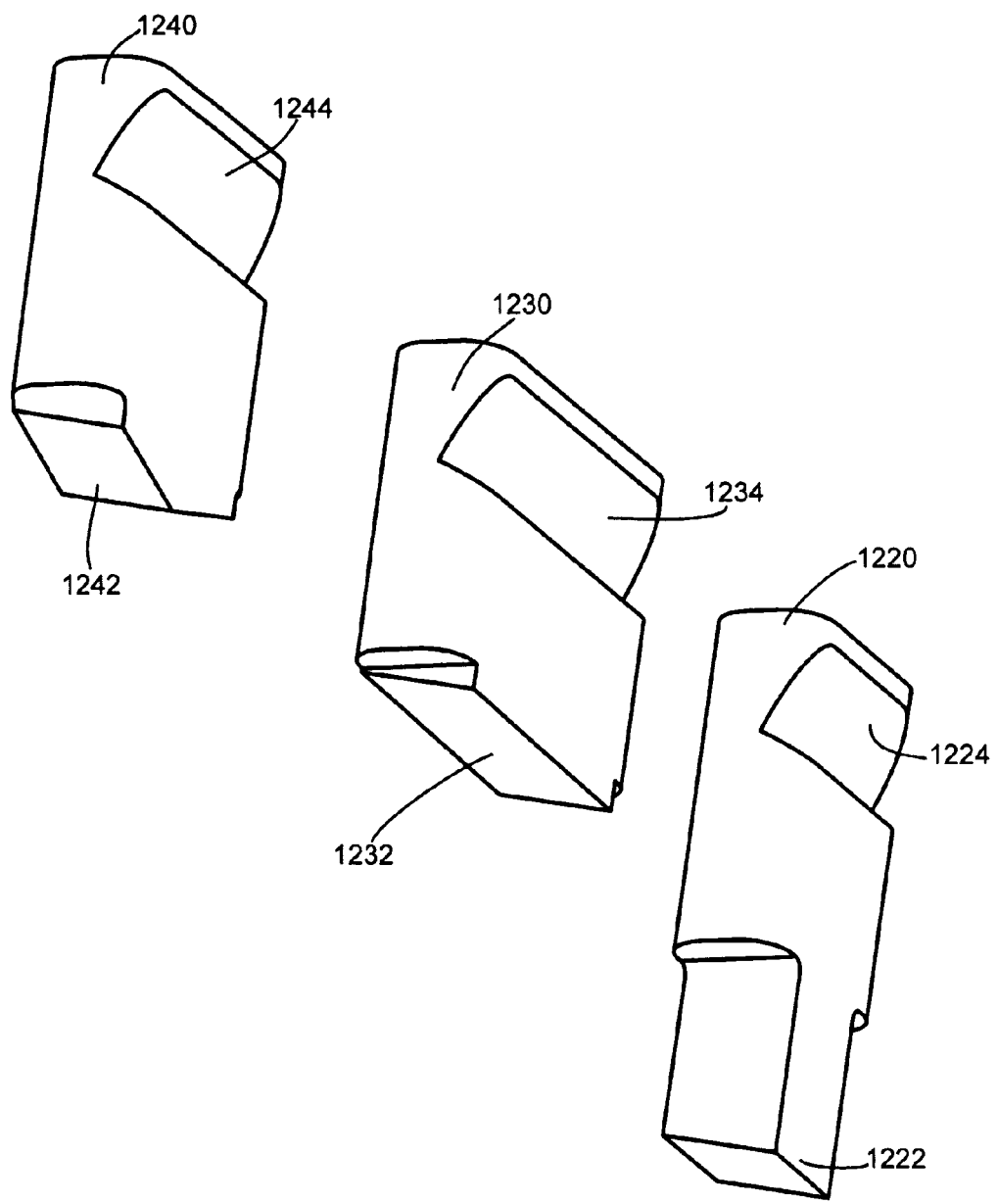
FIG. 10 is a perspective view of tool bits that may be used with the cutting apparatus of FIG. 6.
Figure 11:
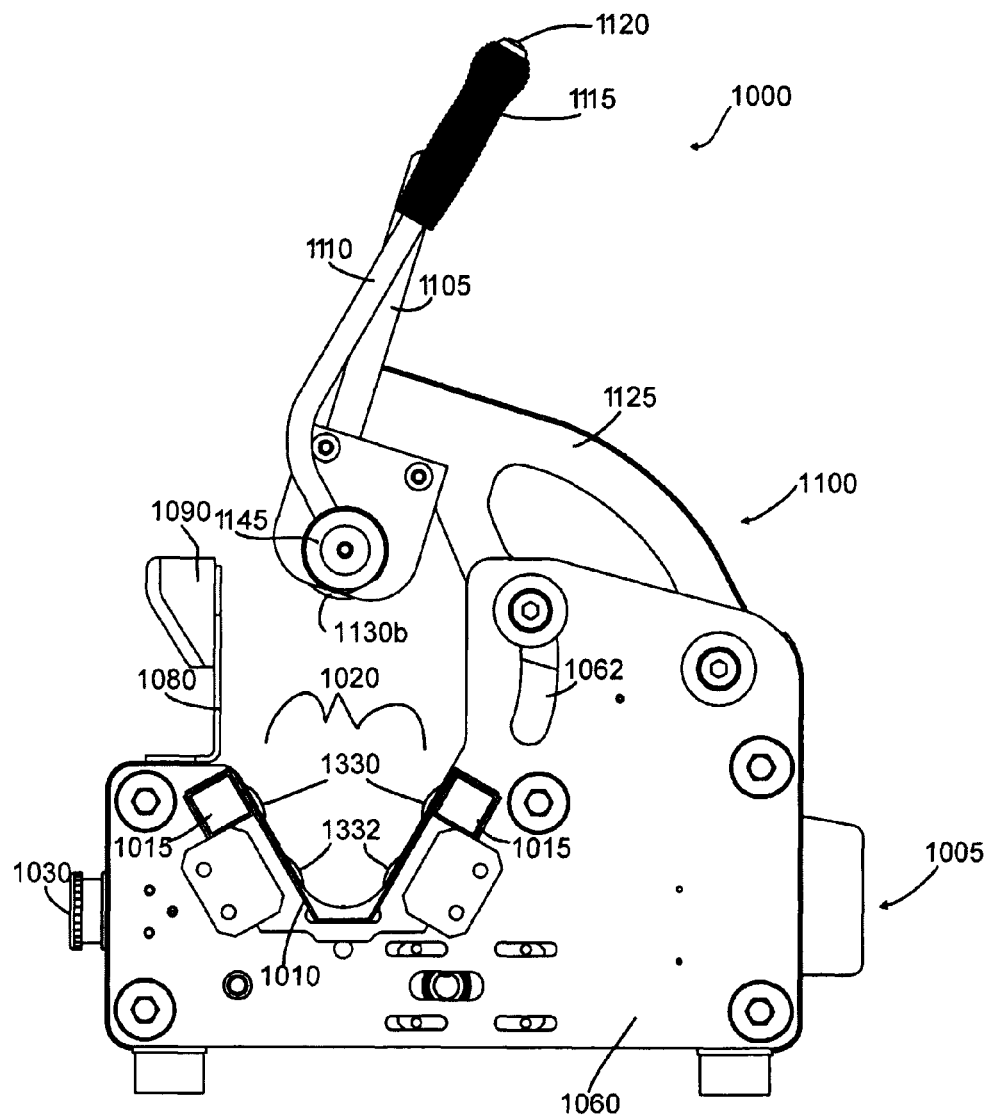
FIG. 11 is an end view of one side of the pipe cutting tool of FIG. 1.
Figure 12:
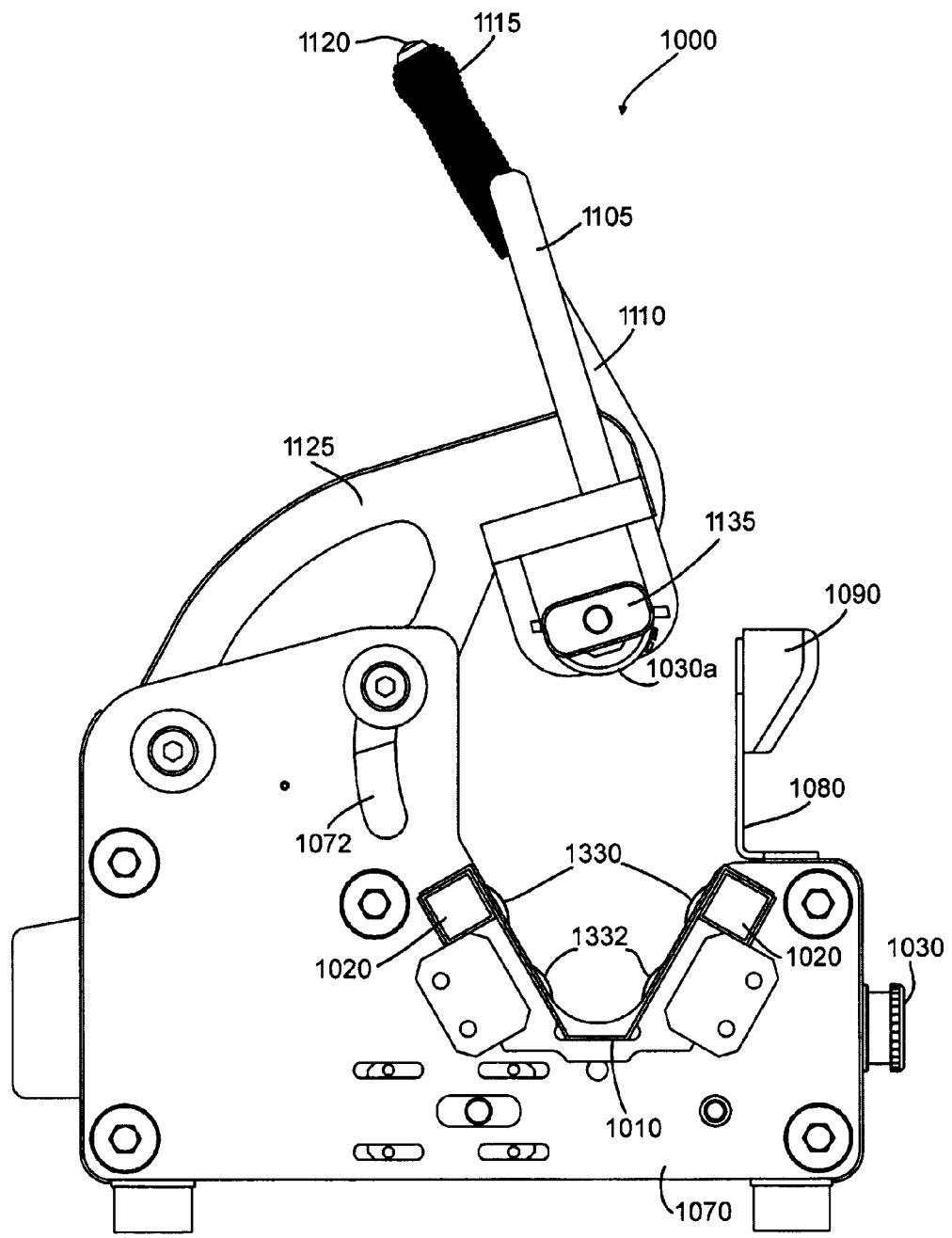
FIG. 12 is an end view of the other side of the pipe cutting tool of FIG. 1.
Figure 13:
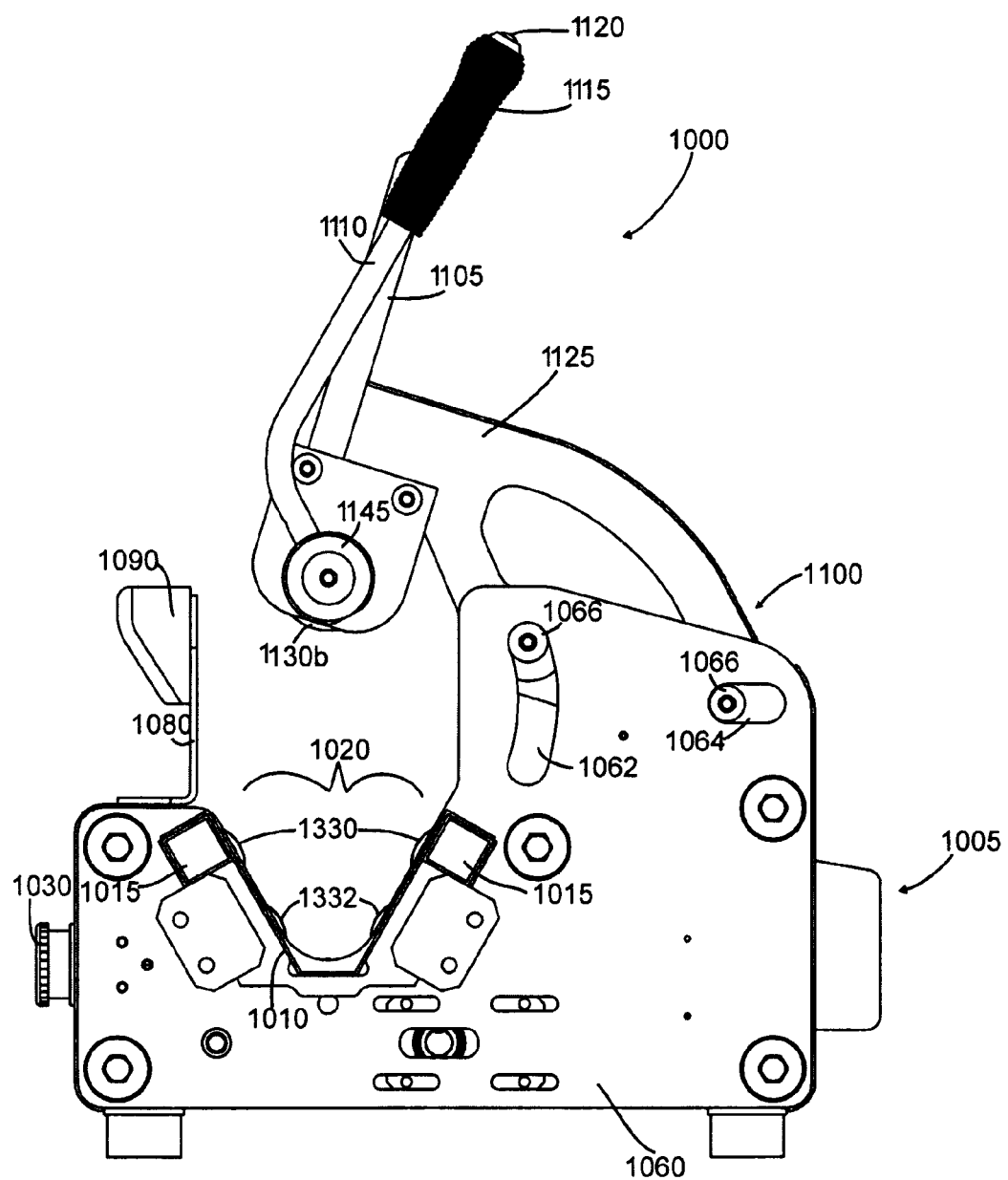
FIG. 13 is an end view of the pipe cutting tool of FIG. 1 with certain components removed.
Figure 14:
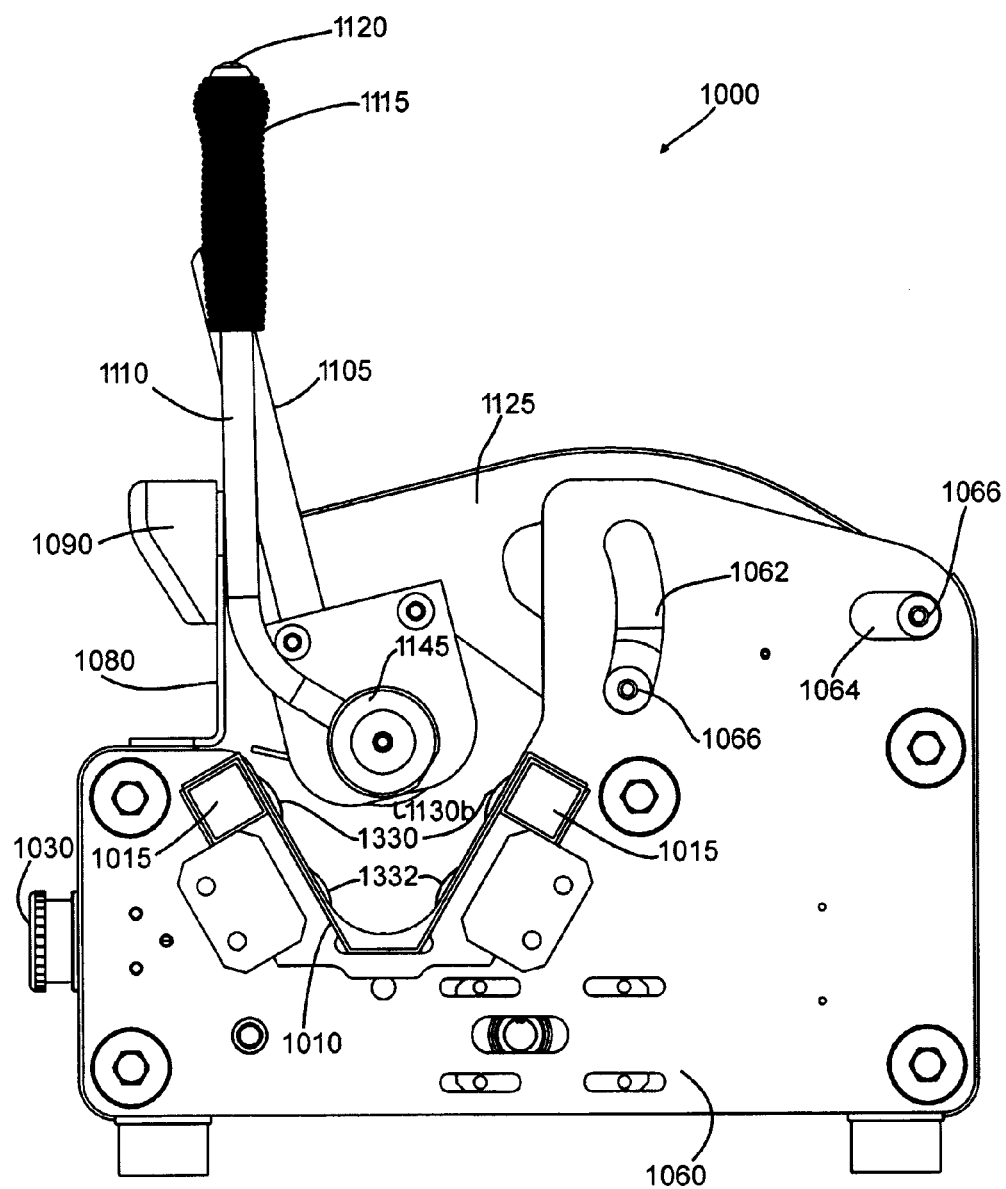
FIG. 14 is an end view of the pipe cutting tool of FIG. 1 with certain components removed, with the upper frame in another position.
Figure 15:
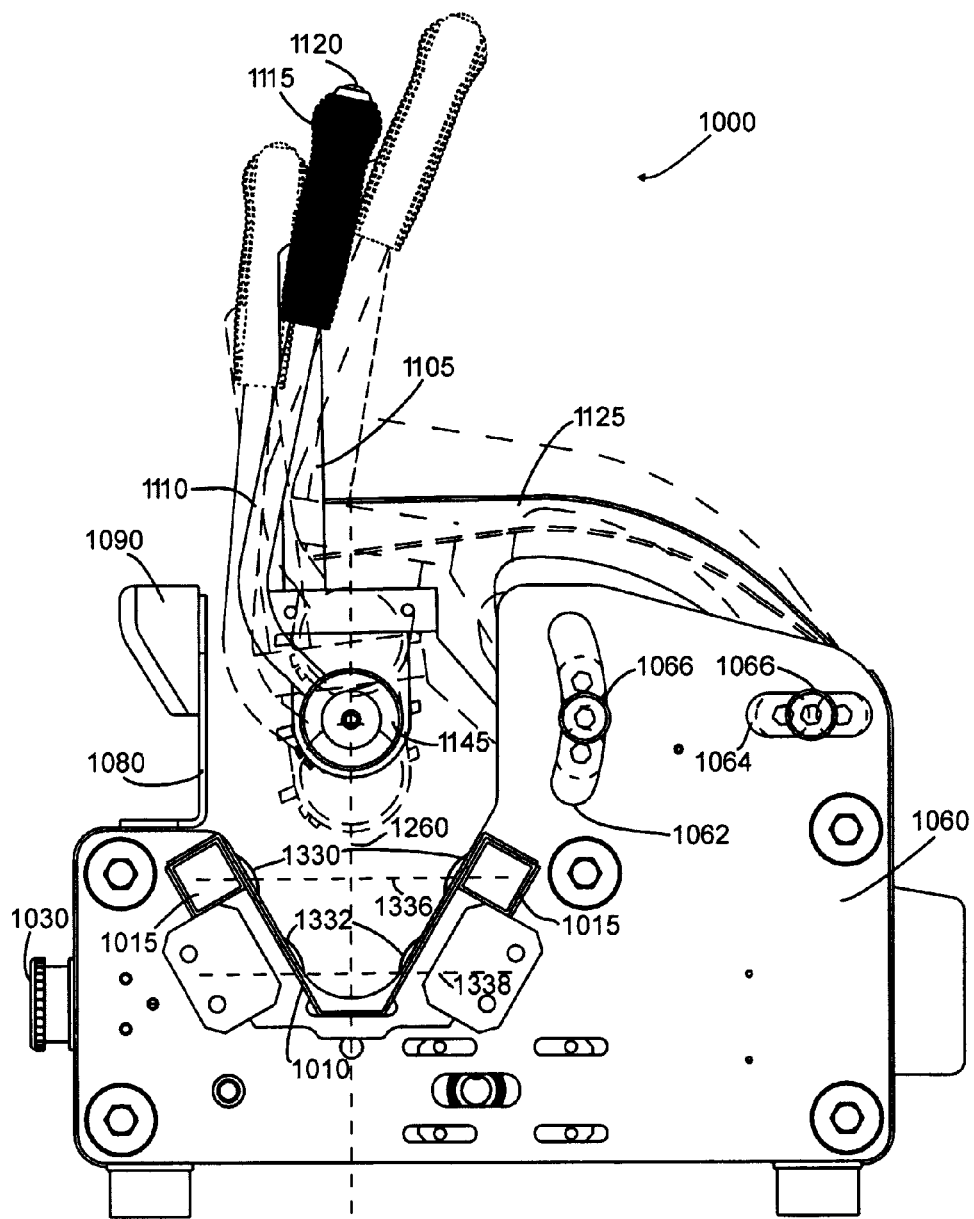
FIG. 15 is an end view of the pipe cutting tool of FIG. 1 with certain components removed, with the upper frame in yet another position.

As shown in FIG. 10, cutting tool bit 1220 may comprise cutting surface 1222 for cutting a pipe, and notch 1224 for securing cutting tool bit 1220 to cutter hub 1210. Chamfering tool bit 1230 may comprise chamfering surface 1232 for chamfering a pipe, and notch 1234 for securing chamfering tool bit 1230 to cutter hub 1210. Grooving tool bit 1240 may comprise grooving surface 1242 for grooving a pipe, and notch 1244 for securing grooving tool bit 1240 to cutter hub 1210.

If additional cutting, chamfering, and/or cutting tools bits are provided, then the tool may be adjustable to so that alternate tools bits are engaged based on the size of the pipe that is used. For example, if one set of tool bits is provided for a pipe of a first diameter or range of diameters and another set of tool bits is provided for a pipe of a second diameter or range of diameters, then the cutting apparatus may be manipulatable to selectively present a particular set of tool bits for use. The tool bits may be manually selected or automatically selected, e.g. based on the clamping position of the upper frame 1100.

For example, as exemplified in FIGS. 2 and 5, cutting hub may be rotatable so as to present a second set of tool bits to machine a pipe. A handle 1135 may be mounted on a first end 1203 of shaft 1205. Handle 1135 allows a user to reorient cutting apparatus 1200 relative to upper frame 1100 between a first orientation (which may be referred to as a first position) in which the first set of cutting tools can be used to machine a pipe, and a second orientation (which may be referred to as a second position) in which the second set of cutting tools can be used to machine a pipe. For example, the first set of tool bits located on one side of cutting apparatus 1200 may be configured to engage relatively large diameter pipes, such as pipes supported by first lower rollers 1330, while the second set of tool bits located on the other side of cutting apparatus 1200 may be configured to engage relatively small diameter pipes, such as pipes supported by second lower rollers 1332.

As exemplified, handle 1135 allows shaft 1205 to be axially displaced relative to upper frame 1100 and lever coupling 1140, so that a keyed surface 1209 of a second end of shaft 1205 is withdrawn from a corresponding slot 1145 in lever coupling 1140, permitting shaft 1205 to be axially rotated relative to lever coupling 1140. As noted above, bearings 1132 allow shaft 1205 to be axially displaced relative to upper rollers 1130a-b, and key members 1250a-b and slots 1207 allow shaft 1205 to be axially displaced relative to cutter hub 1210.

Normally, engagement of keyed surface 1209 and corresponding slot 1145 allows shaft 1205 and cutting apparatus 1200 to be rotated relative to upper frame 1100 using lever 1110. But when keyed surface 1209 is withdrawn from corresponding slot 1145, handle 1135 can also be used to rotate shaft 1205 relative to lever coupling 1140. It will be appreciated that rotating shaft 1205 also rotates cutter hub 1210, as cutter hub 1210 is non-rotationally mounted to shaft 1205. Thus, by axially displacing and then rotating handle 1135, cutting apparatus 1200 can be repositioned (which may also be referred to as reoriented) relative to upper frame 1100.

Keyed surface 1209 and corresponding slot 1145 are preferably configured such that shaft 1205 can only be inserted into lever coupling 1145 in one of two positions, one for each set of tool bits. For example, shaft 1205 may need to be rotated approximately 180° relative to lever coupling 1145 before shaft 1205 can be re-inserted into lever coupling 1145. Additional positions may be provided if additional sets of tool bits are provided at differing angular positions around a cutting hub.

Preferably, a biasing member 1150 is provided to bias shaft 1205 towards lever coupling 1145. In some embodiments, keyed surface 1209 and/or corresponding slot 1145 may be configured to present a cam surface so that, absent a force applied to handle 1135, the force provided by biasing member 1150 will also cause shaft 1205 to rotate relative to lever coupling 1145 and return to a position where keyed surface 1209 is inserted in corresponding slot 1145.

Upper frame 1100 is moveably mounted to base 1005 using any mechanism known in the machining arts. As exemplified in FIGS. 2, 11, and 12, upper frame 1100 may be moveably mounted to base 1005, such as by using pairs of opposing front slots 1062 and 1072, and rear slots 1064 and 1074, located in opposing side panels 1060 and 1070, respectively. As exemplified in at least FIG. 2, front slots 1062, 1072 are generally arcuate, while rear slots 1064, 1074 are substantially straight.

Upper frame may move downwardly in any direction, but it is preferred that the cutting hub travels generally vertically as the pipe is machined, and more preferably, as the upper frame is moved to the clamping position and then used to machine a pipe. As exemplified in FIGS. 13 to 15, in which washers 1068 have been removed to more clearly show the position of pins 1066 relative to slots 1062 and 1064, this arrangement results in shaft 1205 and cutting apparatus 1200 travelling in a substantially vertical plane 1260 (see FIG. 15) throughout its range of motion relative to base 1005. Preferably, this vertical plane is located substantially perpendicular to a horizontal plane 1360 defined by the axes of the first set of lower rollers, and also substantially perpendicular to a horizontal plane 1362 defined by the axes of the second set of lower rollers.

Figure 16:
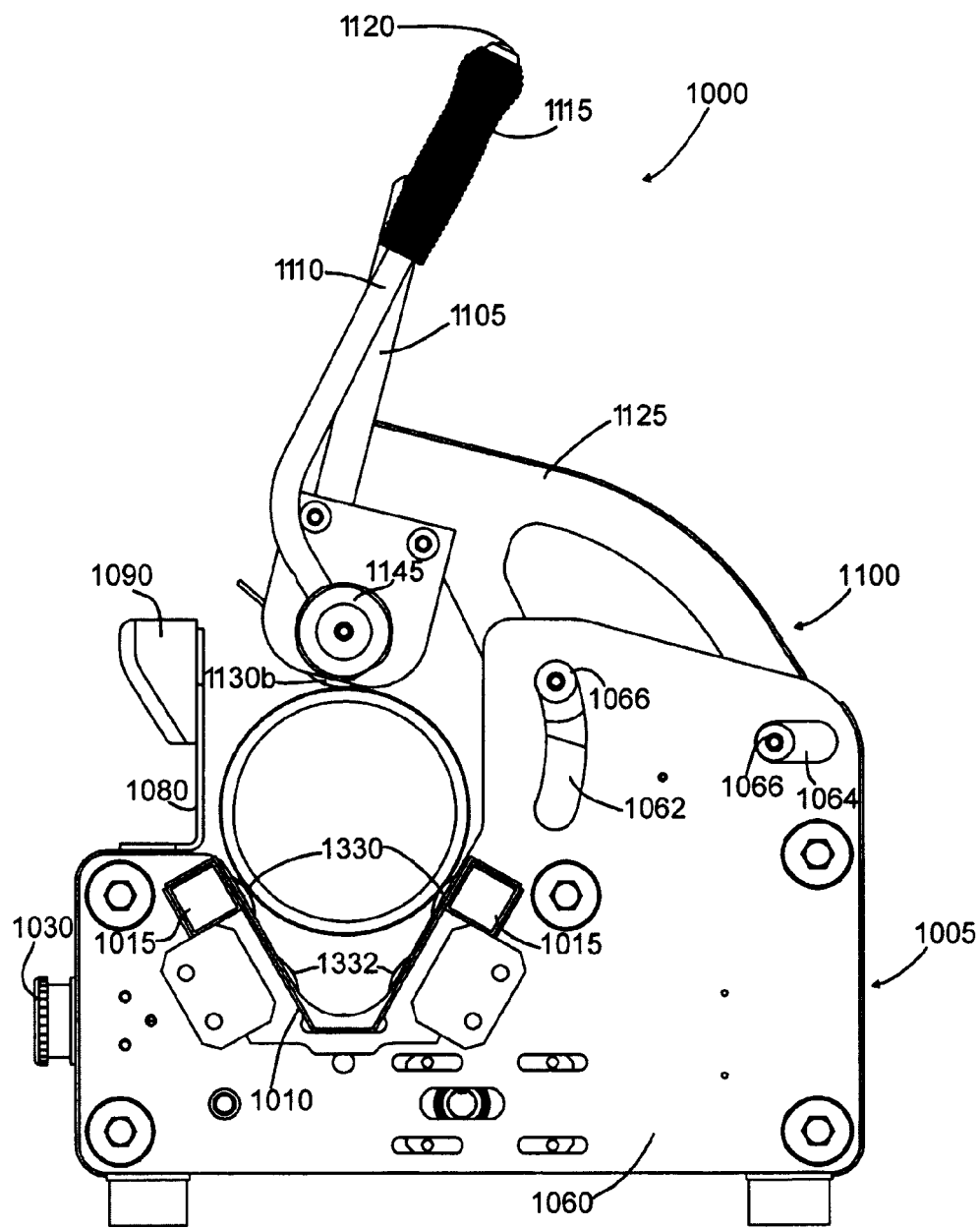
FIG. 16 is an end view of the pipe cutting tool of FIG. 1 with certain components removed, in a clamping position about a pipe of a first diameter.
Figure 17:
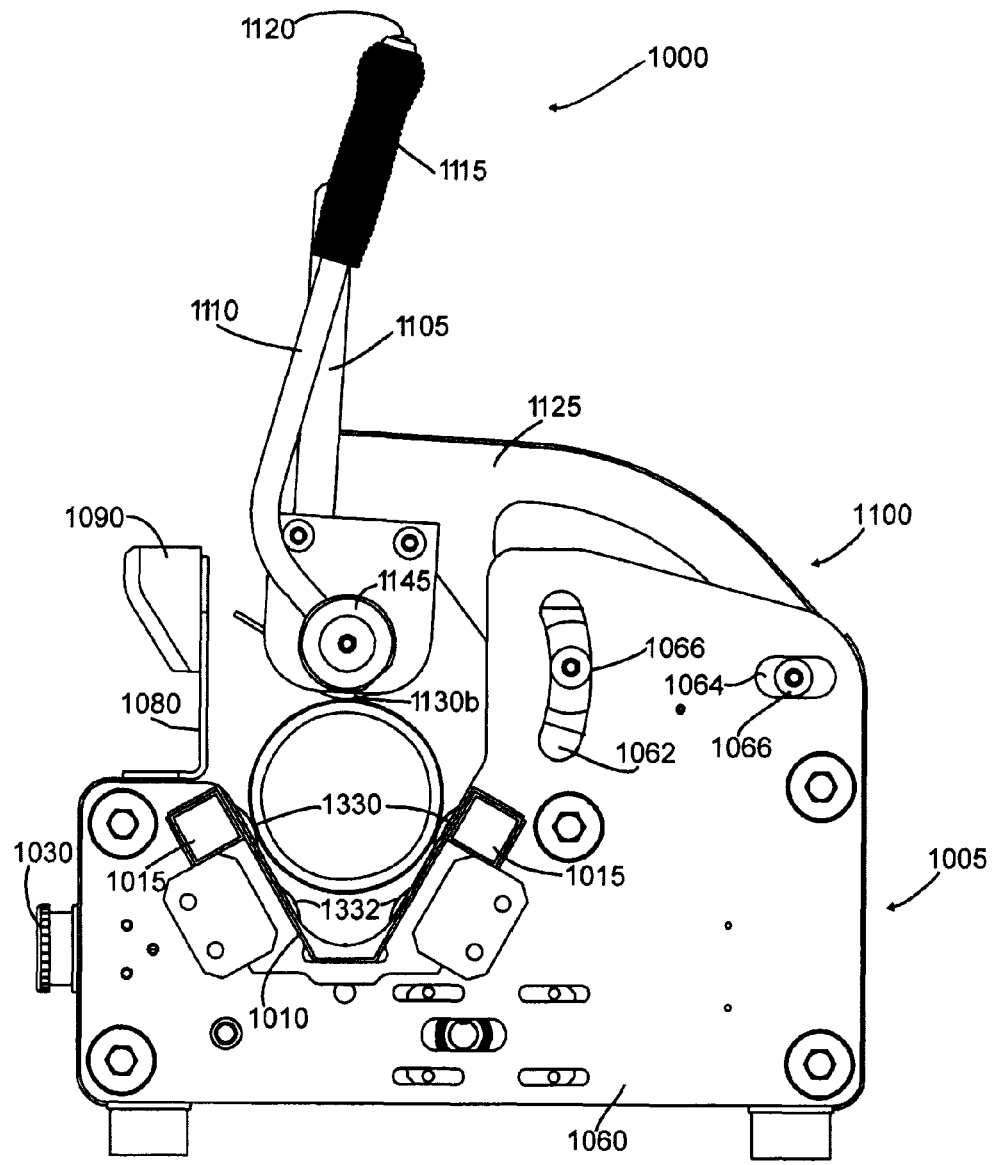
FIG. 17 is an end view of the pipe cutting tool of FIG. 1 with certain components removed, in a clamping position about a pipe of a second diameter.
Figure 18:
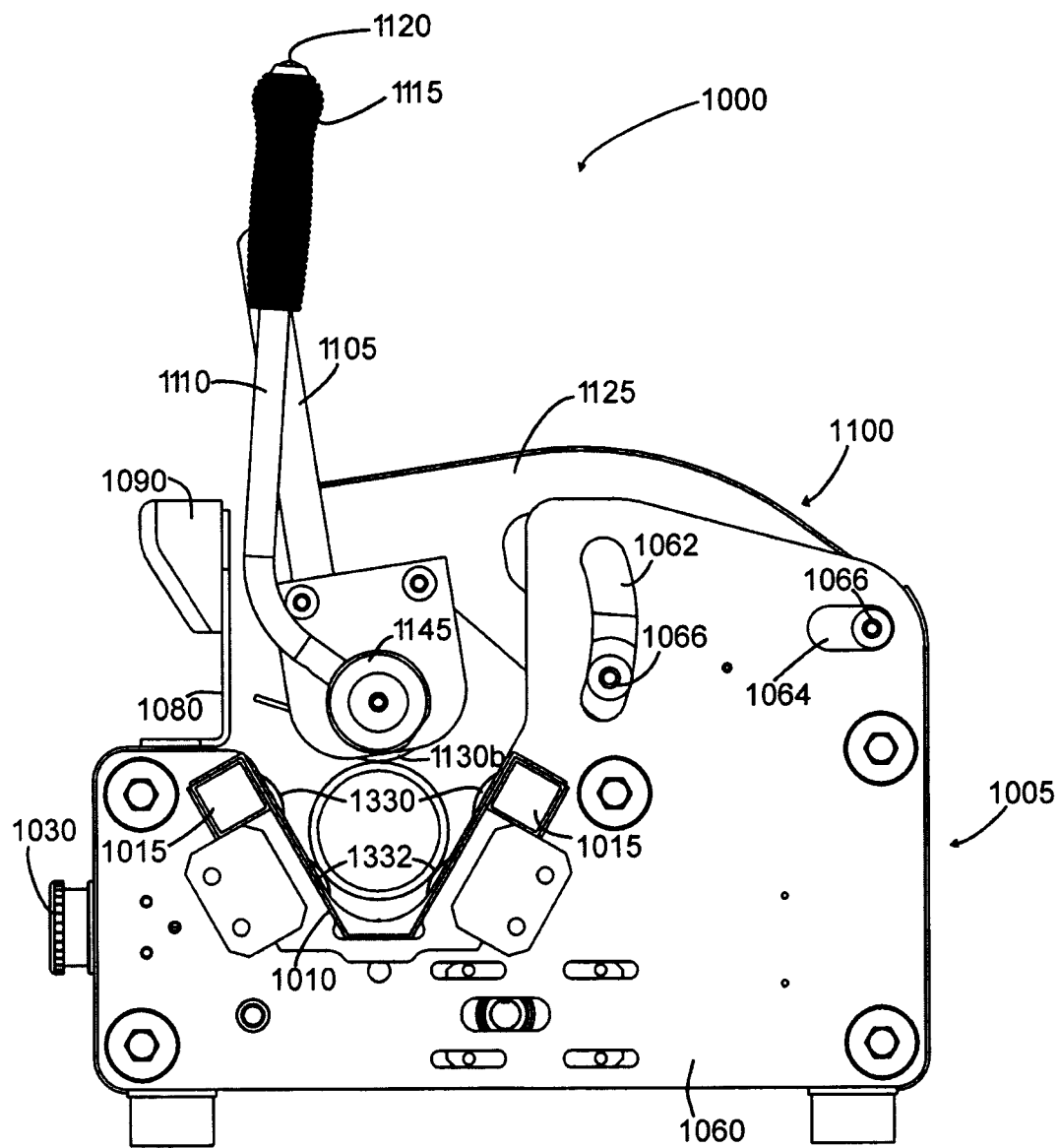
FIG. 18 is an end view of the pipe cutting tool of FIG. 1 with certain components removed, in a clamping position about a pipe of a third diameter.
Figure 19:
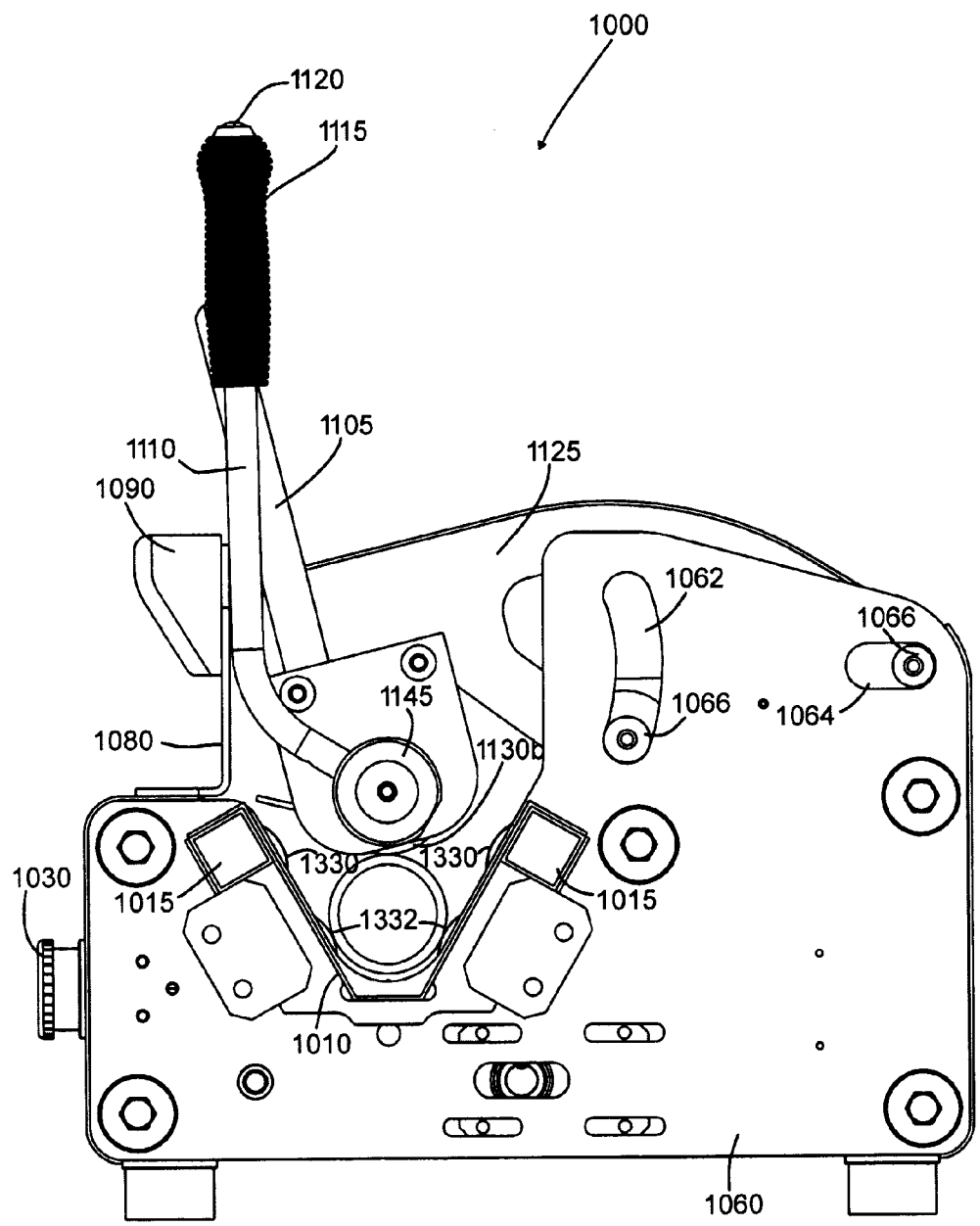
FIG. 19 is an end view of the pipe cutting tool of FIG. 1 with certain components removed, in a clamping position about a pipe of a fourth diameter.

As shown in FIGS. 16 to 19, this results in cutting apparatus 1200 moving towards the longitudinal axis of a pipe to be cut, whether the pipe to be cut is supported by the first lower rollers, as shown in FIGS. 16 and 17, or whether the pipe to be cut is supported by the second lower rollers, as shown in FIGS. 18 and 19.

Figure 20:
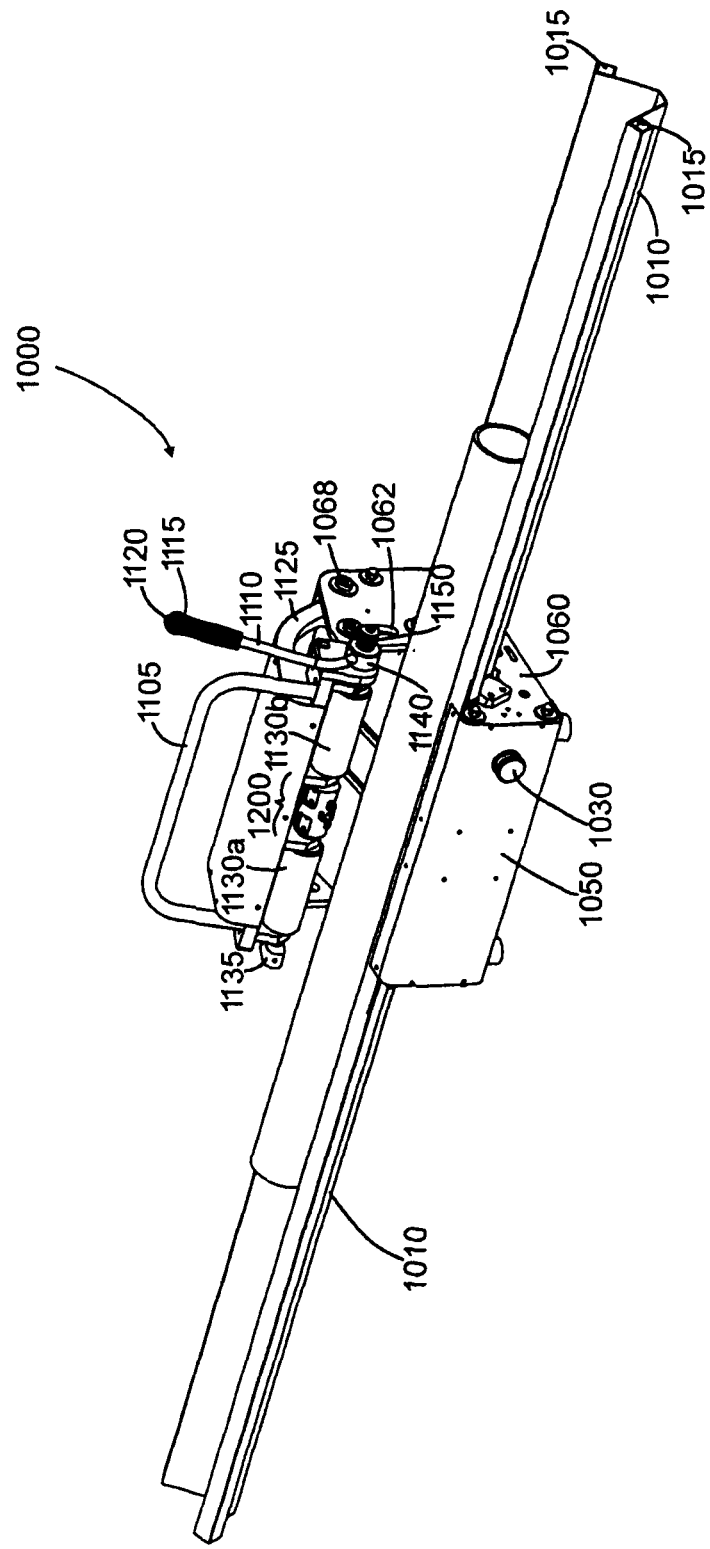
FIG. 20 is a front perspective view of the pipe cutting tool of FIG. 1 with certain components removed, and with a pipe being supported by a set of lower rollers.

The use of pipe cutting apparatus 1000 will now be described with reference to FIGS. 20 to 28. First, as shown in FIG. 20, a pipe to be cut may be positioned so that at least a portion of the pipe is supported by either the first set of lower rollers or the second set of lower rollers. For clarity, safety shield 1080 is not shown.

Figure 21:
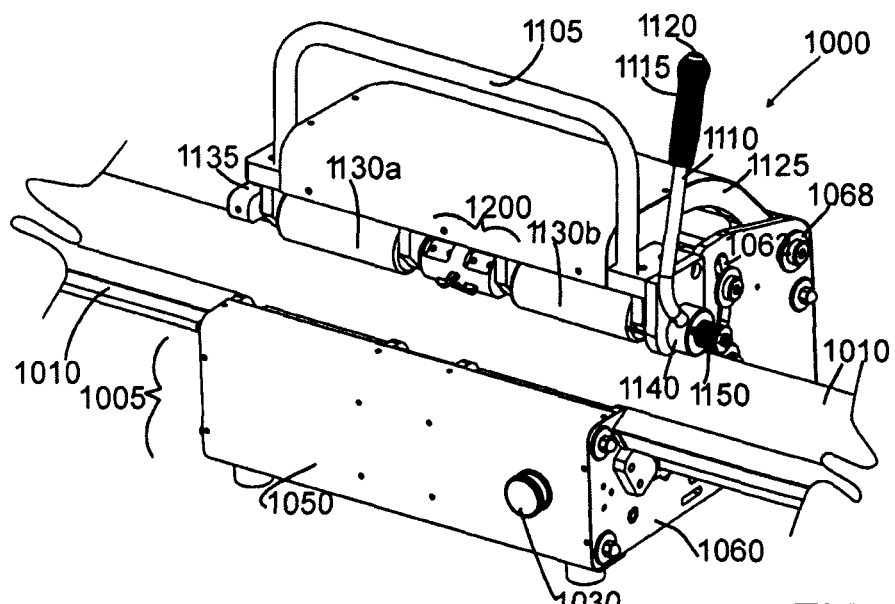
FIG. 21 is a front perspective view of the pipe cutting tool of FIG. 20 with the upper frame in a clamping position, and a lever in a neutral position.
Figure 22:
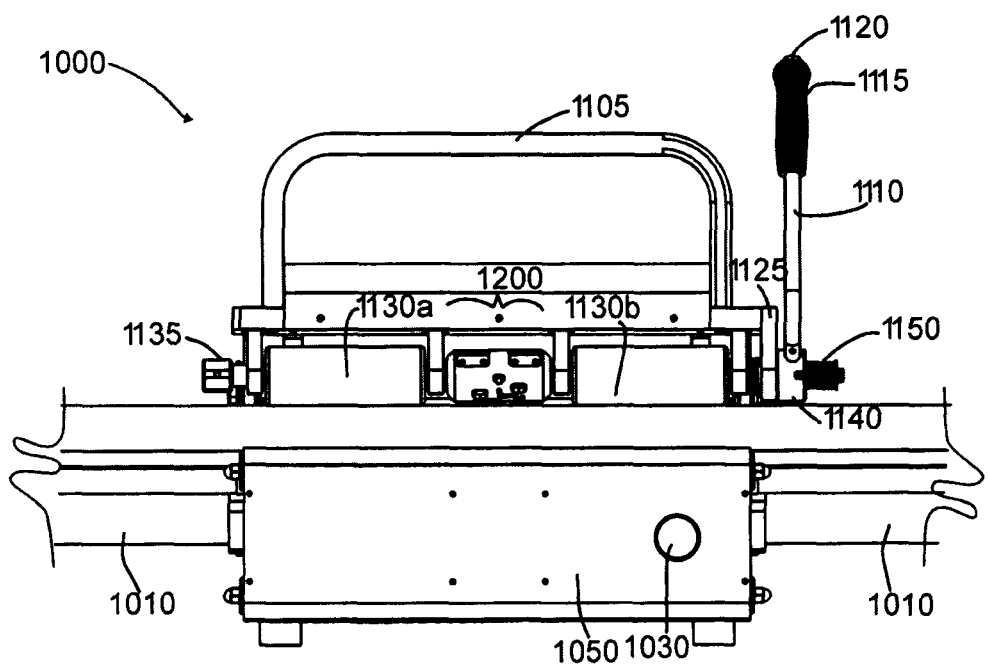
FIG. 22 is a front view of the pipe cutting tool of FIG. 20 with the upper frame in a clamping position, and a lever in a neutral position.

In FIGS. 21 and 22, upper frame 1100 has been moved from the open position shown in FIG. 20 to a position where upper rollers 1130 are in contact with the pipe to be cut. This position may be referred to as a clamping position. Note that, as exemplified, the upper rollers are in contact with the pipe to be cut but cutting apparatus 1200 is not in contact with the pipe in this position. It will be appreciated that cutting apparatus 1200 may engage the pipe before, during or after the upper rollers are brought into contact with the pipe and the upper frame is moved to a clamping position.

Figure 23:
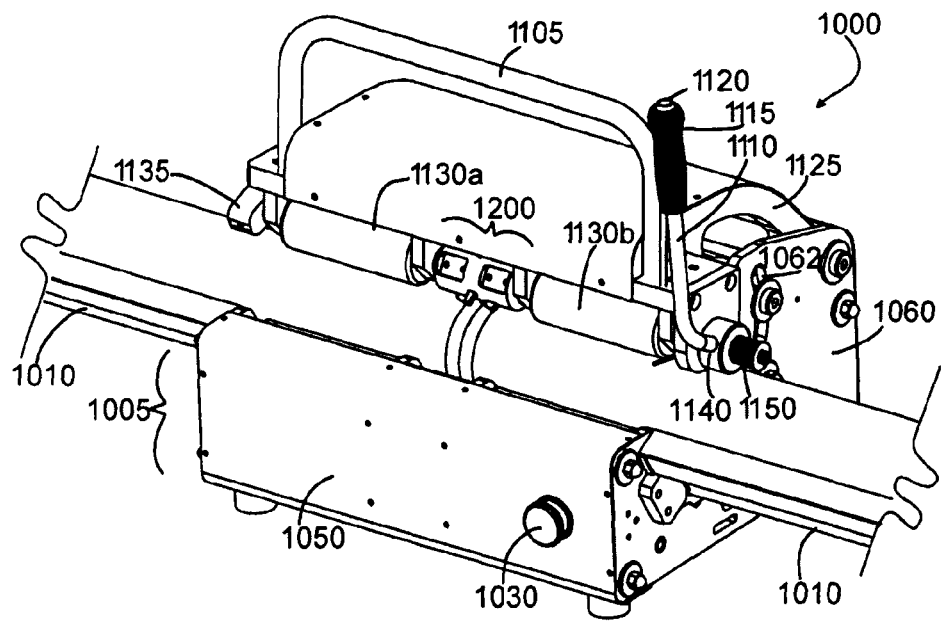
FIG. 23 is a front perspective view of the pipe cutting tool of FIG. 20 with the upper frame in a clamping position, and a lever in a chamfering position.
Figure 24:
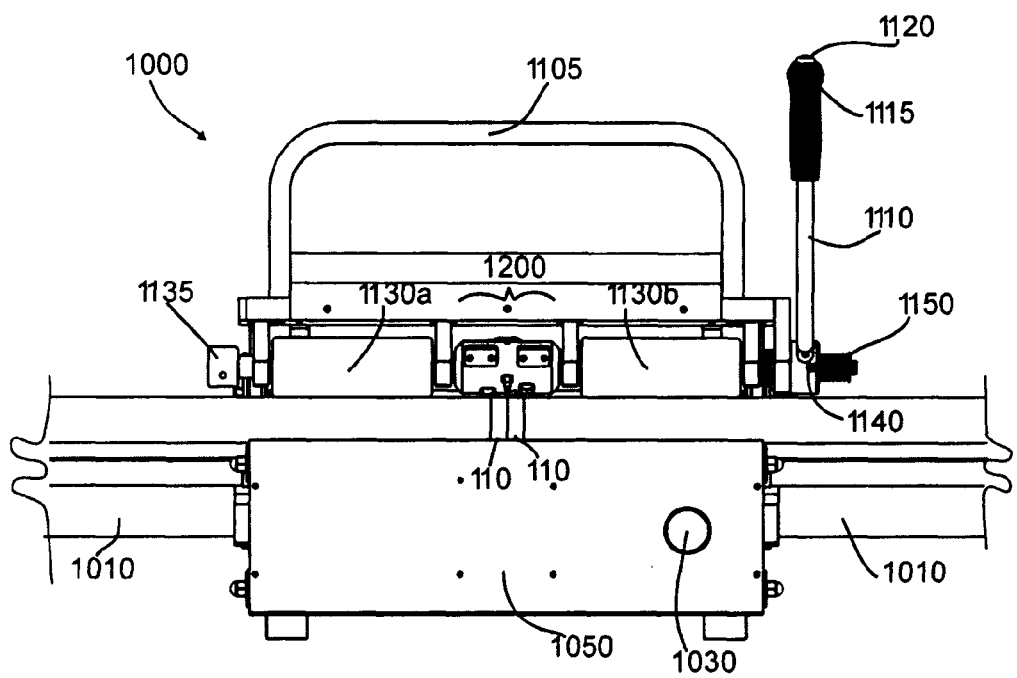
FIG. 24 is a front view of the pipe cutting tool of FIG. 20 with the upper frame in a clamping position, and a lever in a chamfering position.

In FIGS. 23 and 24, motor 1300, which in this embodiment is manually actuatable, has been actuated to rotate the lower rollers (thereby rotating the pipe to be cut due to the pipe engaging the upper and the lower rollers), and lever 1110 has been moved from the neutral position shown in FIGS. 21 and 22 to a position where shaft 1205 and cutting apparatus 1200 have been rotated, and chamfering tool bits 1230a-b mounted on cutter hub 1210 have been brought into engagement with the pipe and have lathed out a portion of the pipe to provide a pair of chamfered surfaces.

Figure 25:
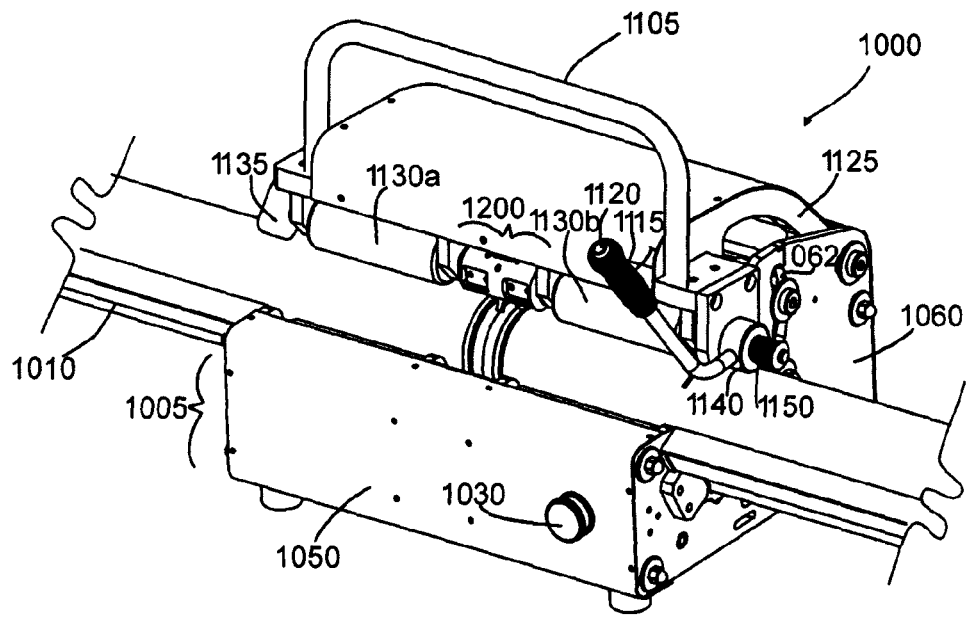
FIG. 25 is a front perspective view of the pipe cutting tool of FIG. 20 with the upper frame in a clamping position, and a lever in a grooving position.
Figure 26:
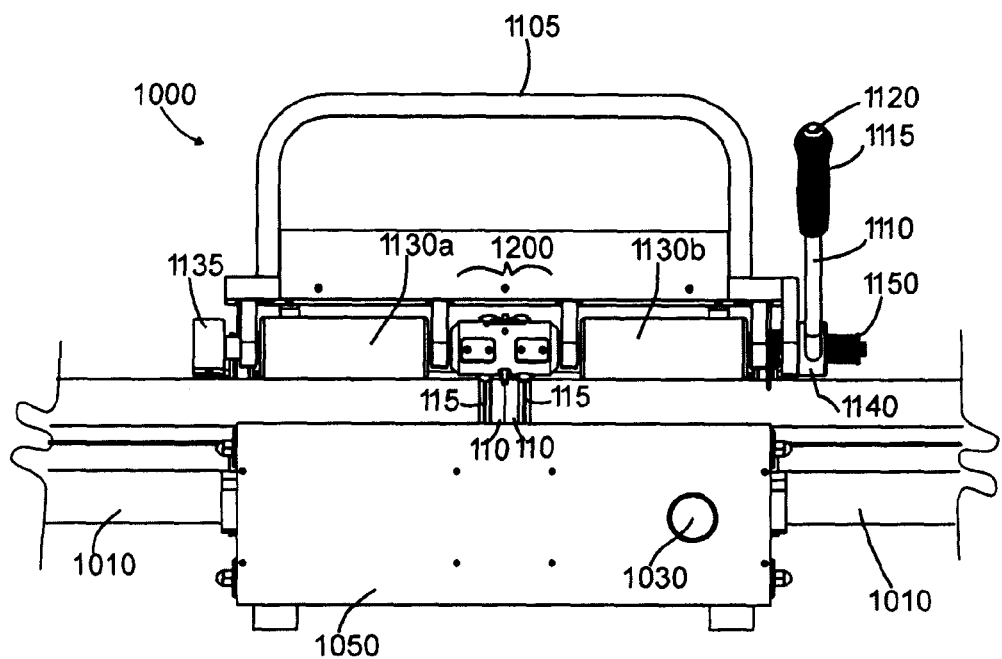
FIG. 26 is a front view of the pipe cutting tool of FIG. 20 with the upper frame in a clamping position, and a lever in a grooving position.

In FIGS. 25 and 26, lever 1110 has been moved from the position shown in FIGS. 23 and 24 to a position where shaft 1205 and cutting apparatus 1200 have been rotated further downwardly, and grooving tool bits 1240a-b mounted on cutter hub 1210 have been brought into engagement with the pipe and have lathed out a portion of the pipe to provide a par of grooves in the pipe.

Figure 27:
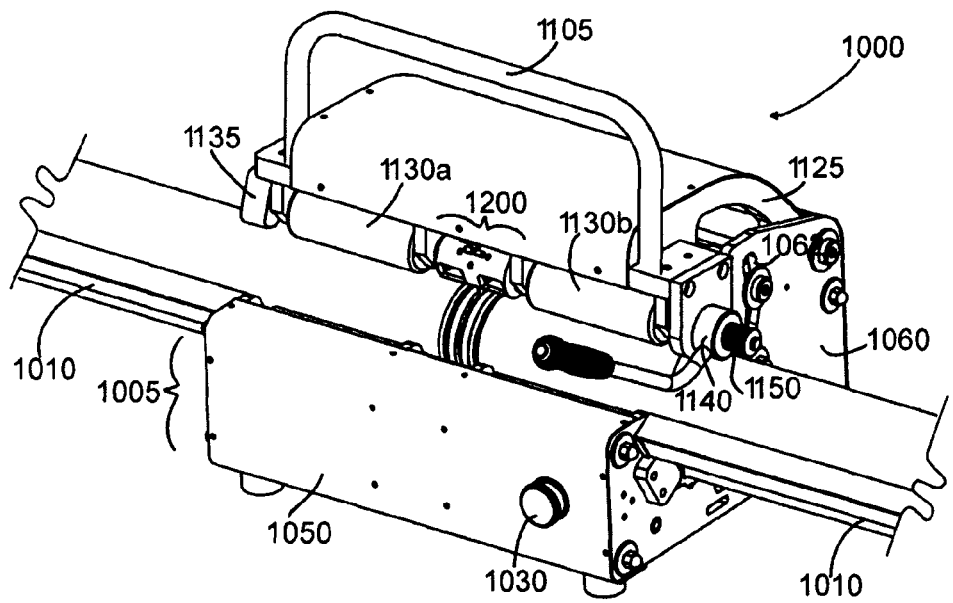
FIG. 27 is a front perspective view of the pipe cutting tool of FIG. 20 with the upper frame in a clamping position, and a lever in a cutting position.
Figure 28:
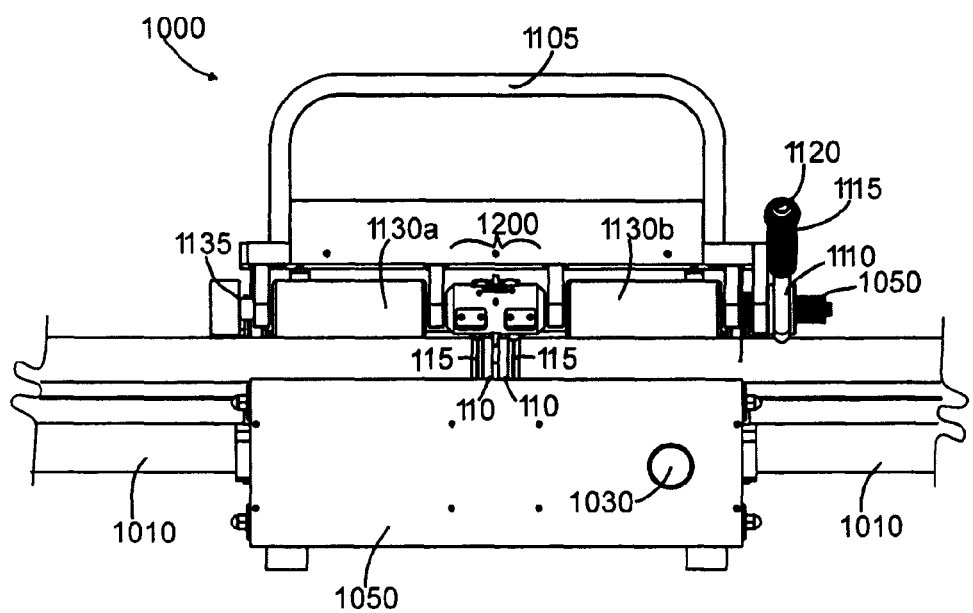
FIG. 28 is a front view of the pipe cutting tool of FIG. 20 with the upper frame in a clamping position, and a lever in a cutting position.

In FIGS. 27 and 28, lever 1110 has been moved from the position shown in FIGS. 25 and 26 to a position where shaft 1205 and cutting apparatus 1200 have been rotated still further downwardly, and cutting tool bit 1220 mounted on cutter hub 1210 has been brought into engagement with the pipe and cut the pipe into two sections, with an end of each of the cut sections having been chamfered and grooved, as discussed above.

While in the illustrated embodiment, the tool bits are arranged on cutter hub 1210 in a staggered manner, so that in use chamfering tool bits 1230a-b engage the pipe first, followed by grooving tool bits 1240a-b, followed by cutting tool bit 1220, it will be appreciated that the tool bits may be arranged on cutter hub 1210 so that a pipe is lathed and cut in a different order. For example, the grooving, chamfering, and cutting tool bits may be arranged on cutter hub 1210 to sequentially groove, chamfer, and the cut the pipe, or they may be arranged on cutter hub 1210 to sequentially chamfer, groove, and then cut the pipe.

Preferably, each machining operation is completed or substantially completed before the next machining operation commences. An advantage of this design is that a smaller and/or lighter motor may be used. For example, the peak load placed on the motor by completing the machining operations sequentially is lower than the peak load if the machining operations were to occur simultaneously, and therefore a motor having a lower rated power output may be used. As it may be desirable for tool 1000 to be moved close to a position at which the pipes are to be joined, reducing the weight of the tool 1000 increases its portability.

It will also be appreciated that there may be an overlap between the chamfering, grooving, and cutting operations, and that while the respective tool bits may engage an outer surface of the pipe in a sequential manner, one or more of the operation may begin before a preceding operation has been completed. For example, grooving tool bits 1240a-b may be arranged on cutter hub 1210 so that they engage the pipe and start to groove the pipe before chamfering tool bits 1230a-b have completed removing the material to form the chamfered surface on the pipe (e.g. before chamfering tool bits 1230a-b have reached their maximum tooling depth). Similarly, cutting tool bit 1220 may be arranged on cutter hub 1210 so that it engages the pipe and start to cut the pipe before grooving tool bits 1240a-b have completed grooving the pipe.

In other embodiments, the grooving and chamfering tool bits may be arranged on cutter hub 1210 so that the chamfering tool bits 1230a-b and the grooving tool bits 1240a-b contemporaneously groove and chamfer the pipe, with the cutting member arranged to subsequently cut the pipe. Alternatively, the grooving, chamfering, and cutting tool bits may be arranged on cutter hub 1210 to contemporaneously groove, chamfer, and cut the pipe.

FIG. 29 illustrates an end of a pipe cut using cutting tool 1000, showing annular groove 115 and chamfered surface 110. It will be appreciated that the depth of groove 115 is dependent on the cutting depth of grooving tool bit 1240, being the difference between the radial distance of grooving surface 1242 from the longitudinal axis of cutter hub 1210, and the radius of upper roller 1130. A deeper groove will enable additional cement to be injected. It will be appreciated that if the abutting surface to which the pipe is to be joined also has a groove, a shallower groove may be utilized. It will be appreciated that the radial distance of grooving surface 1242 may be adjustable or the tool bits may be replaceable so that tool bits having differing lengths may be used.

It will also be appreciated that the particular profile of groove 115 is dependent on the shape of grooving tool bit 1240 (and more specifically the profile of grooving surface 1242). A wider groove will enable additional cement to be injected. It will be appreciated that the tool bits may be replaceable so that tool bits having differing grooving profiles may be used.

Figure 31:
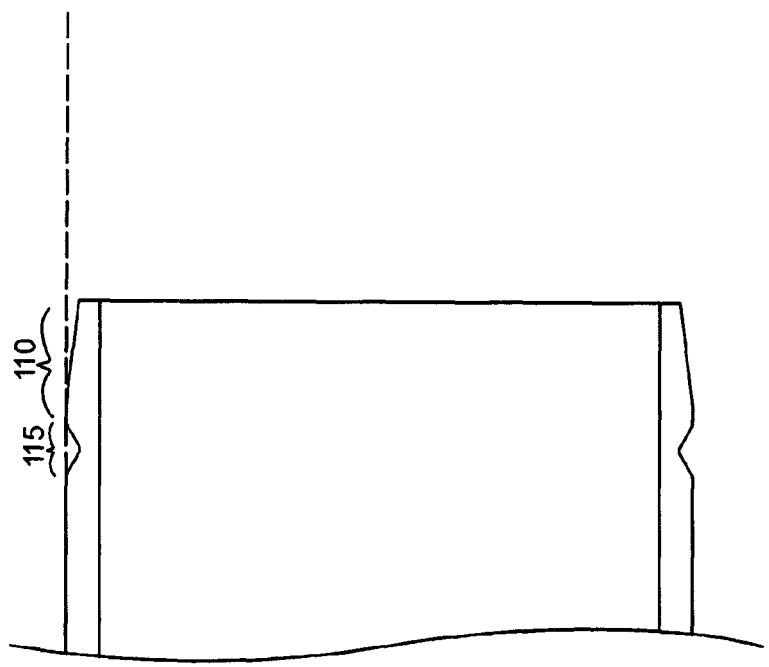
FIG. 31 is a cross-section view of another example end of a pipe that has been chamfered, grooved, and cut using the pipe cutting tool of FIG. 20.
Figure 30:
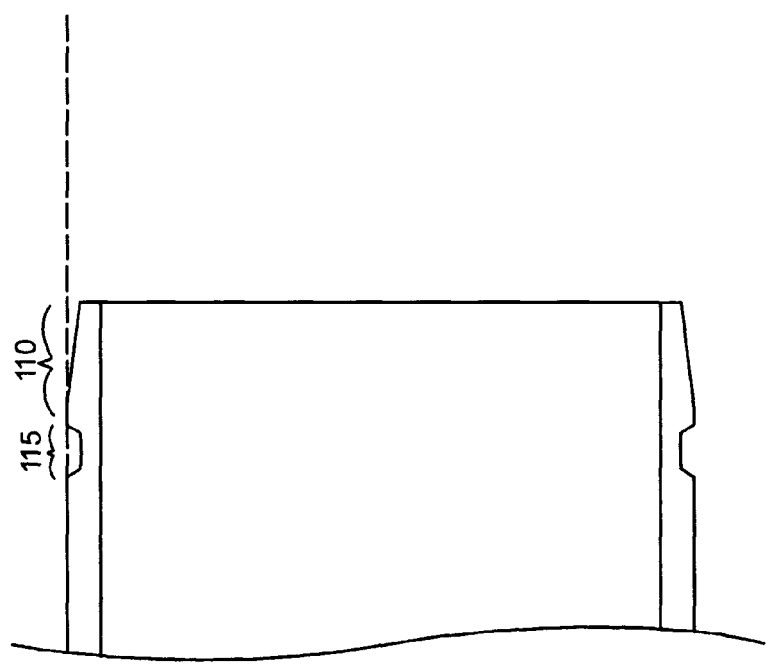
FIG. 30 is a cross-section view of an example end of a pipe that has been chamfered, grooved, and cut using the pipe cutting tool of FIG. 20.
Figure 32:
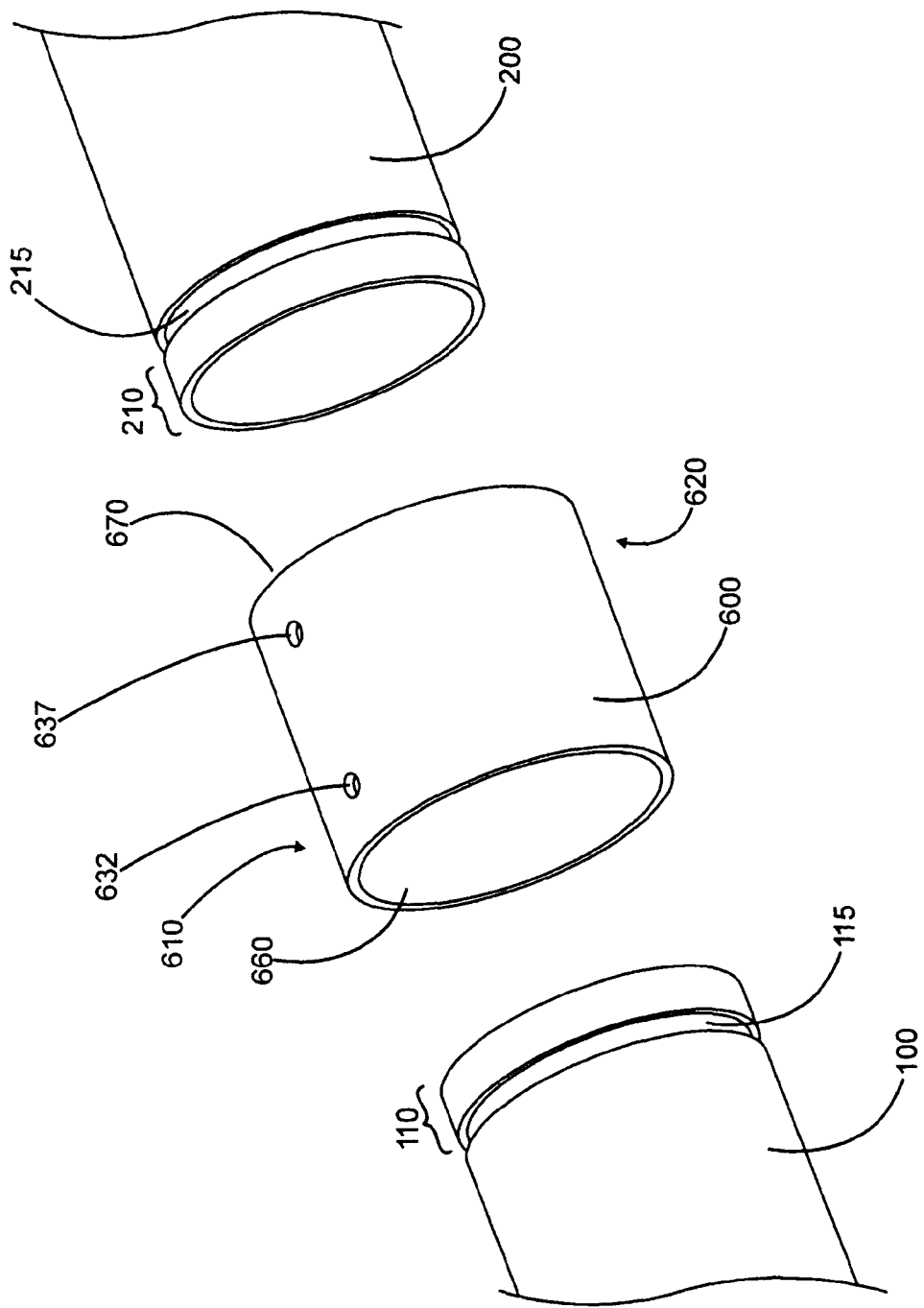
FIG. 32 is an exploded perspective view of two pipe ends and a hollow fitting in accordance with another embodiment.
Figure 33:
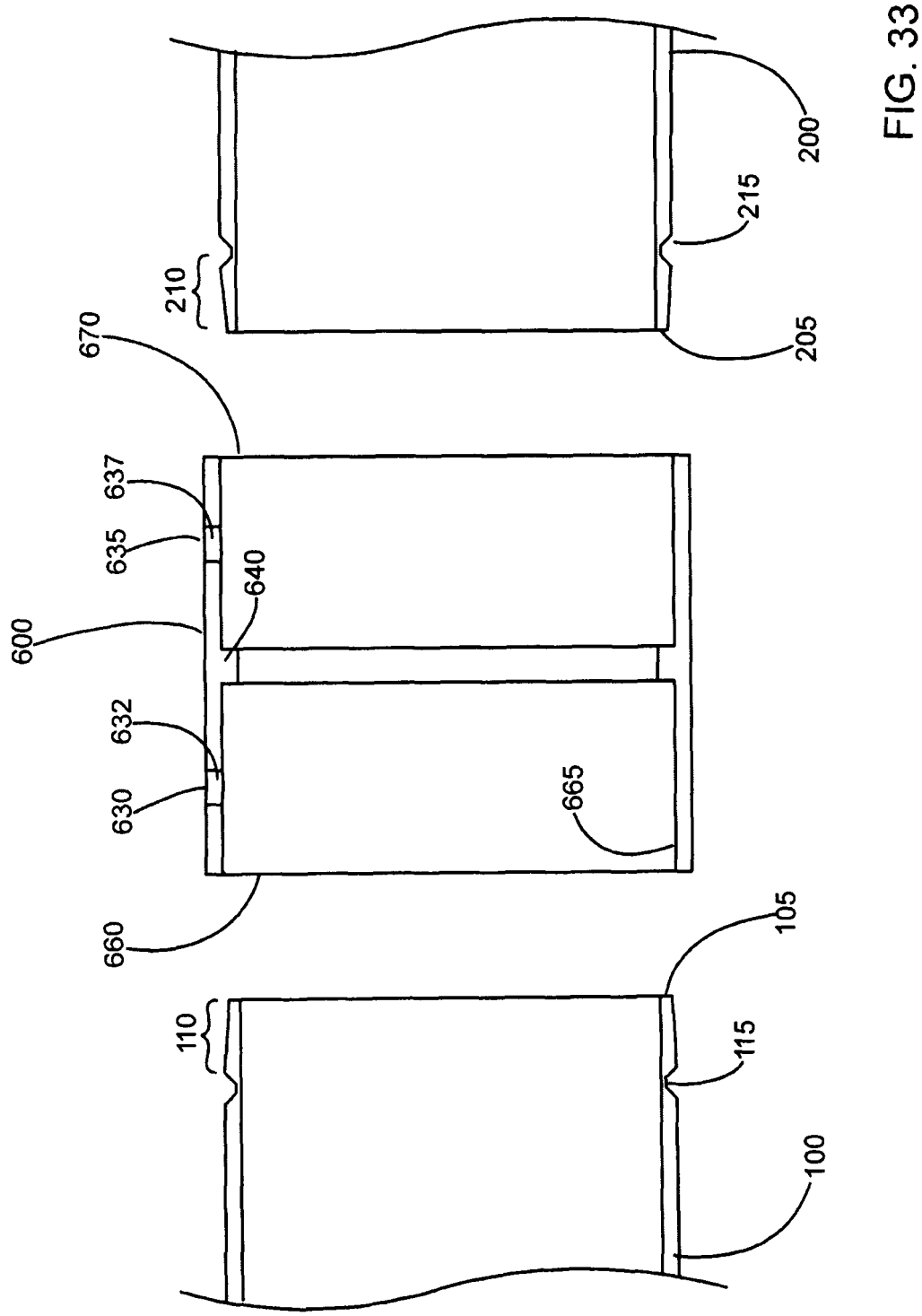
FIG. 33 is an exploded cross section view of the two pipe ends and hollow fitting of FIG. 32.

In some embodiments, grooving tool bit 1240 may be configured to provide a rough inner surface of the groove. An advantage of this option is that increased surface area is provided for the cement to adhere to. FIGS. 30 and 31 provide non-limiting examples of the types of groove profiles that may be lathed into a pipe using cutting tool 1000.

Similarly, the depth and angle of chamfer 110 is dependent on the cutting depth and profile of chamfering tool bit 1230, being the difference between the radial distance of chamfering surface 1232 from the longitudinal axis of cutter hub 1210, and the radius of upper roller 1130. In some embodiments, the chamfering member is configured to provide a chamfer of between 0.5° to 10°, preferably between 1° to 5°, and more preferably between 2° to 4°. It will be appreciated that the chamfering angle may be adjustable or the tool bits may be replaceable so that tool bits having differing chamfering angles may be used.

An advantage of chamfering the pipe is that, when a pipe is cut, the new end of the pipe is chamfered.

In some embodiments, tool 1000 may be used to chamfer, or grove and chamfer, the end of a pipe as manufactured. While the end of a pipe as manufactured may be chamfered, the degree of chamfering may vary within manufacturing tolerances. By chambering the end of a pipe, the chamfer may be applied that is suitable for use with a hollow filling (e.g., the end of the pipe is machined so as to fit into a hollow fitting with a suitable or known spacing of the abutting surfaces).

In the illustrated embodiment of tool 1000, by providing two chamfering tool bits and two grooving tool bits in each set of tool bits (i.e. chamfering tool bits 1230a-b and grooving tool bits 1240a-b, and chamfering tool bits 1235a-b and grooving tool bits 1245a-b), apparatus 1000 is able to cut a pipe while providing chamfers and grooves on each cut end. In another embodiment (not shown), only one chamfering tool bit and one grooving tool bit is provided as part of each set of tool bits of a cutting apparatus 1200, and as a result only one of the ends of a pipe is grooved and chamfered. Such an embodiment could also be used to lathe an end of a pipe to provide a chamfer and groove without cutting (or substantially shortening) the pipe end being lathed.

In embodiments where only one chamfering tool bit and one grooving tool bit is provided as part of cutting apparatus 1200, upper frame 1100 may be repositionable relative to base 1005 between a first orientation in which the grooving tool bit is located closer to a first end of base 1005 than the cutting tool bit, and a second orientation in which the cutting tool bit is located closer to the first end of base 1005 than the grooving tool bit (e.g., the upper frame is rotatable about a vertical axis or the upper frame is removable from base 1005 and mountable once rotated 180° about a vertical axis. An advantage of this design is that the same tool may be used to treat opposite ends of a long length of pipe, e.g., a 10-15 foot length, without moving tool 1000 or rotating the pipe to present each end to the tool for machining. For example, a first end of a pipe may be grooved and chamfered (and optionally cut) with upper frame 1100 in the first orientation. The upper frame 1100 may then be repositioned to the second orientation and the pipe may then be slid so that the other end of the pipe is positioned at the location of the tool bits so that the second end of the pipe may be grooved, chamfered, and optionally cut without rotating the pipe about its longitudinal axis. This may be advantageous, for example, where tool 1000 is being used in a long, narrow workspace (such as a hallway) to lathe and/or cut lengths of pipe that are longer than width of the workspace.

Methods for Connecting Pipes

FIGS. 32 to 43 exemplify methods and apparatuses for connecting pipes. These methods and apparatuses may use pipes machined using tool 1000. Alternatively, the methods and apparatuses may use parts of a piping system that are used as manufactured or which are prepared using alternate techniques.

The methods and apparatuses exemplified use an insertion fit, i.e., one end of one part of a piping system is inserted into an open end of another part of the piping system. For example, FIGS. 32 and 33 exemplify the use of a hollow fitting 600. As shown therein an end of a first pipe 100 and an end of a second pipe 200 are positioned on opposed sides of hollow fitting 600. Hollow fitting 600 has a first opening 660 in a first end 610 of the fitting for receiving an end of the first pipe 100, and a second opening 670 in a second end 620 of the fitting for receiving an end of the second pipe 100.

As shown, each end 610, 620 is provided with an injection passage (632 and 637, respectively) that extends through the wall of the fitting. Each passage has an associated inlet 630 and 635. It will be appreciated that each end 610, 620 may have one or more passages 632, 637. Passages 632, 637 may be pre-formed in hollow fitting 600, such as during the manufacturing process. Alternatively, hollow fitting 600 may be manufactured without passages 632, 637 and the passages may be formed (e.g. drilled) prior to or as part of the connection process.

Also as exemplified, an annular groove 115 has been provided on the outer surface of pipe 100, and end 110 of pipe 100 has preferably been provided with a chamfer between an end face 105 and annular groove 115. Similarly, an annular groove 215 has been provided on the outer surface of pipe 200, and end 210 of pipe 200 has preferably been provided with a chamfer between an end face 205 and annular groove 215.

To connect the pipes and the hollow fitting 600, the ends 110, 210 of pipes 100, 200 are inserted into openings 660, 670 of fitting 600. Space is provided between the inner surface 665 of hollow fitting 600 and the outer surface of pipe end 110 for receipt of a pipe joining material. In order to form a complete seal, the pipe joining material must be received around the entire perimeter of the outer surface of pipe 100, 200. Accordingly, an annular band of pipe joining material is provided. The annular band need not have a constant width in the axial direction of pipe 100, 200. Optional grooves 115, 215 provide a location for the receipt of the pipe joining material so that an annular band of pipe joining material may be provided interior of the hollow fitting 600. Alternatively, or in addition, the pipe joining material may be provided in the gap or clearance between the inner surface 665 of hollow fitting 600 and the outer surface of pipe end 110. The clearance is preferably relatively small (e.g. between ¹⁄₁₆" and ¼", preferably between ⅛" and ¼").

Figure 34:
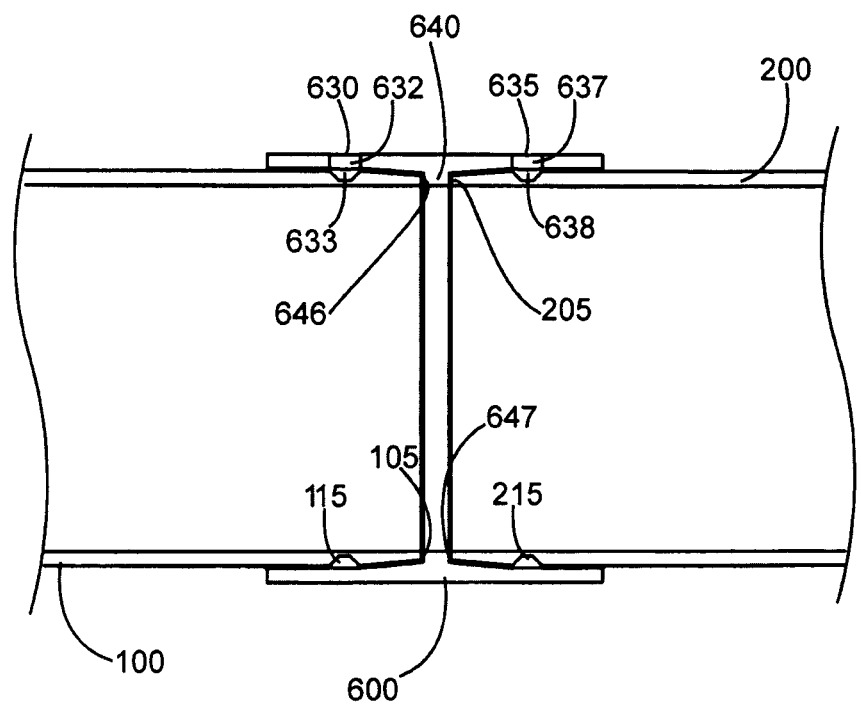
FIG. 34 is a cross section view of the two pipe ends inserted into the hollow fitting of FIG. 32.

As exemplified in FIG. 34, preformed passages 632, 637 are aligned with grooves 115, 215 that are provided on the outer surface of pipes 100, 200. Accordingly, it is preferred to provide a mechanism that permits a user to know when the passages are aligned with the grooves. Accordingly, the outer surface of a pipe 100, 200 may be marked, e.g., with an insertion line or a different color on the outer surface, to indicate when the pipe is inserted a predetermined distance such that the passages 632, 637 are aligned with grooves 115, 215. Alternatively, hollow fitting 600 and/or pipes 100, 200 may be configured such that an end of a pipe may be inserted only up to a predetermined distance into hollow fitting 600. This may assist in aligning one or more features (e.g. injection passages, grooves) of the fitting and/or the pipe end with each other. Therefore, a stop member may be provided inside hollow fitting 600. For example, as exemplified in FIGS. 33 and 34, hollow fitting 600 may comprise an interior ridge 640 that provides a first abutment surface 646 against which a pipe end inserted into first opening 660 will abut when inserted the predetermined distance and a second abutment surface 647 against which a pipe end inserted into second opening 670 will abut when inserted the predetermined distance.

Preferably, abutment surfaces 646, 647 do not have a greater inward radial extent than the inner surface of pipe 100, 200. Therefore, abutment surfaces 646, 647 will not extend into the flow path of fluid in the pipes 100, 200. Preferably, the inner radial extent of abutment surfaces 646, 647 are located proximate the inner surface of pipes 100, 200 so that the transition from pipe 100 to pipe 200 is relatively uninterrupted and thereby turbulence is not produced.

It will be appreciated that the outlet of passages 632, 637 are in flow communication with grooves 115, 215 when pipe 100, 200 is inserted in hollow member 600 such that a joining material injected into passages 632, 637 will be received in grooves 115, 215. Accordingly, while it is preferred that the outlet of passages 632, 637 faces the center of grooves 115, 215, passages 632, 637 may be off center from, and may be off-set from, grooves 115, 215.

It will be appreciated that the configuring the pipe and/or the hollow fitting so that it is known when a pipe is inserted a predetermined distance may be useful when passages 632, 637 are not pre-formed. For example, if passages 632, 637 are formed when pipe 100, 200 is inserted into hollow fitting, then knowing the location of groove 115, 215 with respect to hollow fitting 600 will enable an user (e.g. an installer such as a plumber or other tradesperson) to form the passages so that the passages are in flow communication with the grooves.

Chamfering pipe end 110, 210 may facilitate inserting pipe 100, 200 until end face 105, 205 abuts abutment surface 646, 647 whereby groove 115, 215 and injection passage 632, 637 are positioned such that outlet 633, 638 of injection passage 632, 637 is in fluid communication with groove 115, 215. It will be appreciated that if pipe 100, 200 and hollow fitting 600 are appropriately sized, then chamfering may not be required to insert pipe 100, 200 into hollow fitting 600.

It will be appreciated that by chamfering the end of pipe 100, 200, the clearance between the inner surface 665 of hollow fitting 600 and the outer surface of pipe end 110 may not be constant but may increase towards the open end of pipe 100, 200.

Figure 35:
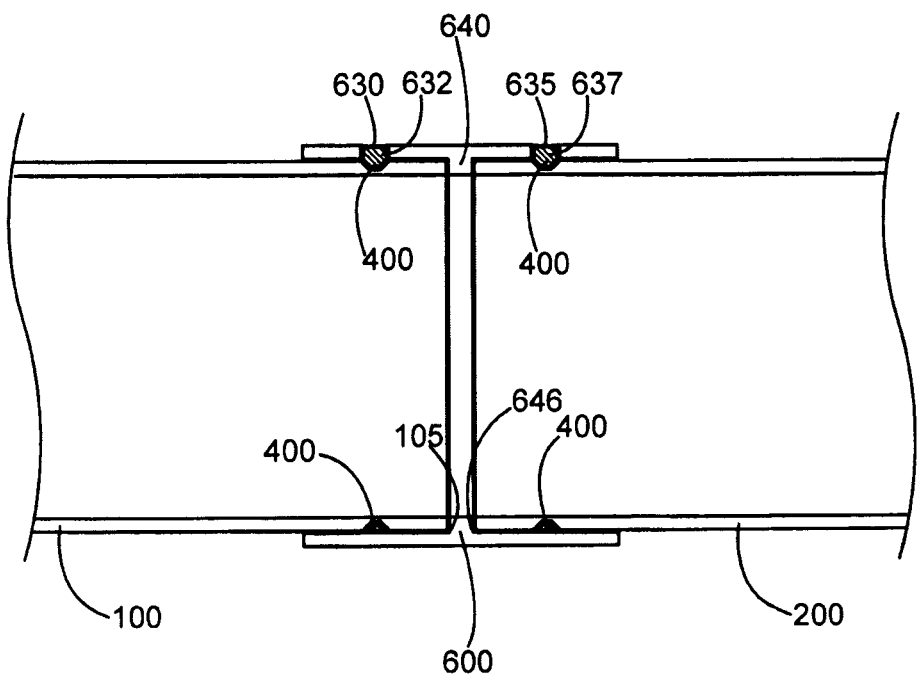
FIG. 35 is a cross section view of the two pipe ends and the hollow fitting of FIG. 32 after pipe joining material has been injected.
Figure 36:
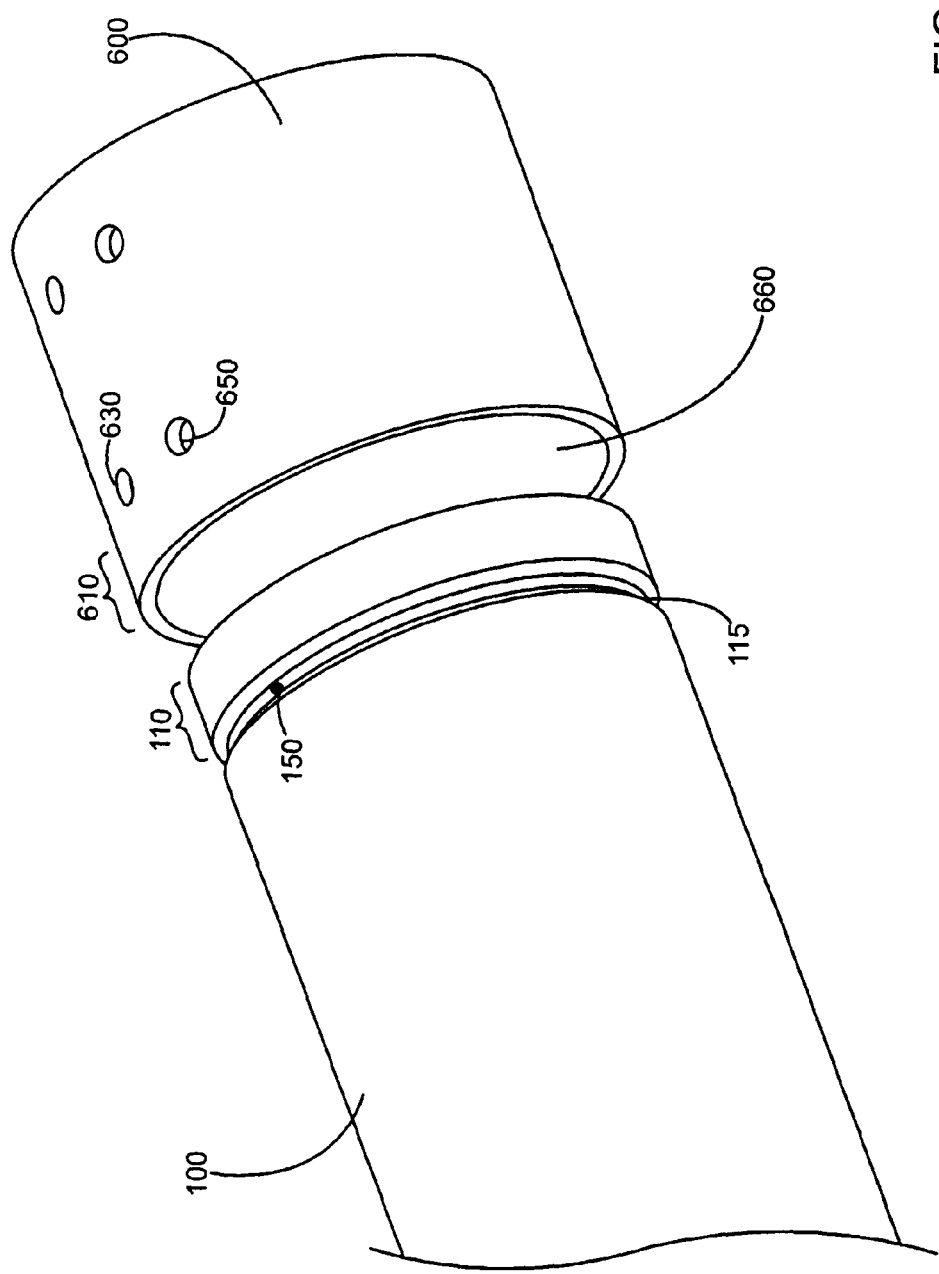
FIG. 36 is an exploded perspective view of a pipe end and a hollow fitting in accordance with another embodiment.

As exemplified in FIG. 35, after end 110 has been inserted into fitting 600, a pipe joining material 400 may be injected to join the pipe end and hollow fitting 600. In FIG. 35, end 110 has been inserted into fitting 600 so that outlet 633 of injection passage 632 is in fluid communication with groove 115, allowing a pipe joining material 400 to be injected into groove 115 via inlet 630 of injection passage 632. Similarly, after end 210 has been inserted into fitting 600 so that outlet 638 of injection passage 637 is in fluid communication with groove 215, pipe joining material 400 may be injected into groove 215 via inlet 635 of injection passage 637.

The pipe joining material, as discussed subsequently, may be selected based on the composition of the pipe and the hollow fitting that are to be joined. Preferably, the pipe joining material is made of a similar material to that of the pipe and the hollow fitting. Accordingly, once cured, the interstitial space or clearance between the pipe and the hollow fitting has a similar composition to that of the pipe and the hollow fitting. For example, if the pipe and hollow fitting are made of PVC or CPVC, then the pipe joining material may comprise from 1 to 95 wt % PVC and/or CPVC and from 15 to 95% polyamide, based on a total weight of the pipe joining material.

Pipe joining material may be injected in a fluid state, and may be injected at a temperature of from 60 to 200° C., or at a temperature of from 100 to 150° C. When injected at such temperatures, the pipe joining material may remain fluid until the interstitial space or clearance between the pipe and the hollow fitting is filled.

In some embodiments, pipe joining material 400 may be injected using a pipe sealing apparatus 2000, as discussed subsequently.

When injecting pipe joining material into groove 115 via injection passage 632, the gap between inner surface 665 and the outer surface of pipe end 110 may be sufficient (e.g., from ¹⁄₁₆" to ¼", preferably from ¹⁄₁₆ to ⅛") to allow air to escape as pipe joining material is injected and fills groove 115, displacing the air from the groove. Alternatively, or in addition, one or more vent passages may be provided through the wall of fitting 600 to allow air to evacuate groove 115 as pipe joining material is injected. As exemplified in FIG. 36, a vent passage 650 may be provided adjacent injection passage 632. It will be appreciated that vent passage 650 may be provided an any angular distance around the outer surface of hollow fitting 600 from injection passage 632, 637.

In some embodiments, the pipe and/or the hollow fitting are configured to inhibit pipe joining material exiting vent passage 650 until the interstitial space and/or groove is filled with pipe joining material. For example, vent passage may be filled with a blocking material that will flow when heated by pipe joining material (e.g., a wax). Therefore, pipe joining material may be injected until the interstitial space and/or groove are filled with pipe joining material at which time the heat of the pipe joining material has heated the blocking material to a sufficient extent that the blocking material can flow and permit pipe joining material to escape via the vent passage. Alternatively, or in addition, a barrier 150 (e.g. a bead of cured thermoplastic material) may be provided in groove 115 prior to the insertion of pipe end 110 into fitting 600, and pipe 100 and fitting 600 may be aligned so that barrier 150 is disposed between vent passage 650 and injection passage 632, and acts as a barrier to pipe joining material flowing directly to vent passage 650. Instead, injected pipe joining material is directed to flow around groove 115 and exit through vent passage 650. Accordingly, pipe joining material exiting vent passage 650 may provide an indication that groove 115 has been substantially filled with pipe joining material.

Also, the gap between inner surface 665 and the outer surface of pipe end 110 may be sufficient (e.g., from ¹⁄₁₆" to ¼", preferably from ¹⁄₁₆" to ⅛") to prevent a significant quantity of pipe joining material from flowing out opening 660, 670 of hollow fitting 600 at the location of the gap between inner surface 665 and the outer surface of pipe end 110. Optionally, one or more seals (e.g. O-rings) may be provided on one or both sides of groove 115 to ensure injected pipe joining material is substantially confined to the annular cavity defined by groove 115 and inner surface 665.

Alternately, or in addition, the viscosity of the pipe joining material may be adjusted to reduce or inhibit pipe joining material from flowing out of the interstitial space into which it is injected, such as by flowing out opening 660, 670 of hollow fitting 600. It will be appreciated that, typically, the gap between inner surface 665 and the outer surface of pipe end 110 will increase with an increase in the diameter of the pipe being joined. Therefore, in accordance with a method of this disclosure, a pipe joining material having a higher viscosity may be selected as the diameter of a pipe increase. Optionally, the colour of the pipe joining material may be colour coded based on the viscosity of the pipe joining material at application temperatures. For example, a pipe joining material having a viscosity of 12,000-14,000 cps at application temperature may be used when the gap is ¼"; a pipe joining material having a viscosity of 8,000-10,000 cps at application temperature may be used when the gap is ³⁄₁₆"; and, a pipe joining material having a viscosity of 4,000-5,000 cps at application temperature may be used when the gap is ⅛". Accordingly, the sticks of pipe joining material may be colour coded so that, depending upon the gap, an installer may select pipe joining material to reduce or inhibit leakage during application based on the diameter of the pipe or fitting being joined to a piping system.

In some embodiments, hollow fitting 600 may not be initially provided with injection passages 632 and 637. Instead, injection passages 632, 637 may be drilled through the wall of fitting 600, either before or after one or more of pipe ends 110, 210 have been inserted into fitting 600.

In some embodiments, injection passages 632, 637 and/or vent passages 650 may be drilled using a pipe sealing apparatus 2000, as discussed subsequently.

As noted previously, in some embodiments fitting 600 may not be provided with an interior ridge. Such a fitting may be used, for example, when repairing a pipe that has been installed as part of a piping system. As exemplified in FIGS. 37 and 38, repairing a pipe 500 may comprise removing a section of the pipe to be repaired and leaving first and second spaced apart ends 510, 520 of the pipe to be repaired in situ. A hollow fitting 700 may then be slid over each of the first and second spaced apart ends 510, 520. Without interior ridges, fittings 700 can be positioned (e.g. slid) over their respective pipe ends so that a replacement section of pipe 550 may be positioned between the first and second spaced apart ends of the pipe to be repaired, as exemplified in FIG. 37. Preferably, replacement section of pipe 550 is proximate the size of the gap between ends 510, 520. Alternatively, fittings 700 may be positioned (e.g. slid) over one or both ends of the replacement section of pipe 550 so that the replacement section of pipe 550 may be positioned between the first and second spaced apart ends. Once the replacement section of pipe is in position, the hollow fittings may be repositioned so that they each overlie an end of the replacement section of pipe and an end of the pipe to be repaired, as exemplified in FIG. 38.

While in FIGS. 32 to 38, the annular space or cavity into which pipe joining material may be injected was shown as being defined by an annular groove 115, 215 in an outer surface of a pipe end, it will be appreciated that the cavity into which pipe joining material may be injected may be otherwise defined.

Figure 40:
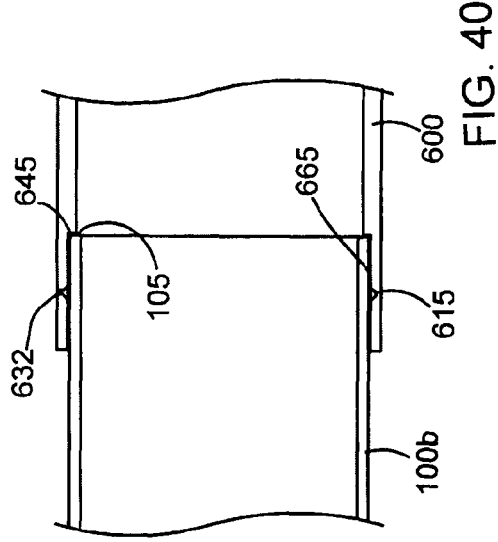
FIGS. 39 to 41 are cross section views of a pipe end and a housing in accordance with various embodiments.
Figure 39:
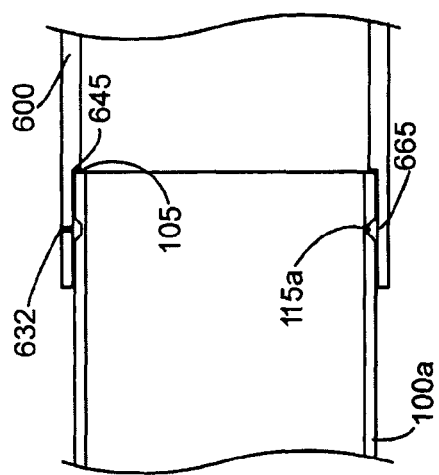
Figure 41:
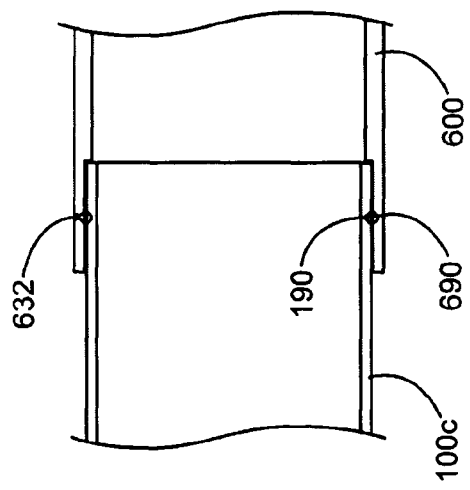

For example, turning to FIGS. 39 to 41, FIG. 39 exemplifies a pipe 100a having groove 115a inserted into a fitting 600a. As with the embodiment of FIG. 34, pipe joining material 400 may be injected into the annular region (which may also be referred to as an interstitial space) defined by groove 115a and inner surface 665.

Alternatively, as exemplified in FIG. 40, an inner groove 615 may be provided in inner surface 665 of fitting 600, and an end 110b of a pipe 100b may not be provided with a groove on its outer surface. In such an embodiment, pipe joining material 400 may be injected into the annular region (or interstitial space) defined by inner groove 615 and the outer surface of pipe end 110b.

Alternatively, as exemplified in FIG. 41, an inner groove 690 may be provided in inner surface 665 of fitting 600, and an end 110c of a pipe 100c may be provided with a groove 190 on its outer surface. In such an embodiment, after end 110c has been inserted into fitting 600 so that inner groove 690 and groove 190 are aligned, pipe joining material 400 may be injected into the annular region (or interstitial space) defined by inner groove 690 and groove 190.

In some embodiments, pipe joining material 400 may be injected into an interstitial space between parts of a piping system (e.g. as shown in FIGS. 39 to 41) using an injection tool that has an actuator to control the ejection of pipe joining material from the injection tool (such as a pipe sealing tool 2000, as discussed subsequently). Accordingly, a user of the injection tool may position an outlet of the injection tool in (or adjacent to) an injection passage, and then actuate the actuator to eject pipe joining material from the tool into the interstitial space.

In some embodiments, the actuator of such an injection tool may be calibrated or otherwise configured so that each actuation of the actuator ejects a predetermined volume of pipe joining material. For example, if the actuator comprises a trigger, lever, or other movable member with a fixed range of motion or travel, a substantially similar volume of pipe joining material may be ejected from the injection tool each time the actuator is moved through its range of motion.

In some embodiments, the injection tool may be calibrated or otherwise configured so that the volume of pipe joining material ejected for each actuation of the actuator is based on an estimated volume of an interstitial space between parts of a piping system. The interstitial space refers to the space between opposed facing surfaces of the parts to be connected and includes the volume of the groove if a groove is provided. For example, if pipes of one or more standard diameters are used, and grooves of a substantially uniform depth and width are provided, the volume of the interstitial space between parts to be joined may be estimated based on the diameter of the pipe. If the volume of the interstitial space is known (or can be estimated with a reasonable degree of accuracy), the injection tool may be calibrated or otherwise configured so that the volume of pipe joining material ejected for each actuation of the actuator is substantially equal to a known fraction of the volume of the interstitial space. In this way, a user of the injection tool may be able to actuate the actuator a certain number of times and be confident that the interstitial space has been filled with pipe joining material.

For example, if the actuator is calibrated to eject a volume of pipe joining material equal to (or slightly greater than) a third of the estimated volume of an interstitial space, a user may actuate the actuator three times and be confident that sufficient pipe joining material has been injected (i.e. that the interstitial space has been filled). Similarly, the actuator may be calibrated to eject a volume of pipe joining material equal to (or slightly greater than) half of the estimated volume of an interstitial space, and a user may safely assume that sufficient pipe joining material has been injected after actuating the actuator two times. Similarly, the actuator may be calibrated to eject a volume of pipe joining material equal to (or slightly greater than) the estimated volume of an interstitial space, and a user may safely assume that sufficient pipe joining material has been injected after actuating the actuator once.

It will also be appreciated that while only one annular space or cavity into which pipe joining material may be injected was provided in each of FIGS. 39 to 40, two or more axially spaced apart grooves defining two or more cavities (into which pipe joining material may be injected, separately or together) may be provided on a pipe end and/or within a hollow fitting.

Also, while in FIGS. 32 to 38, the annular space or cavity into which pipe joining material may be injected was shown as being defined between a pipe end and a hollow fitting, it will be appreciated that the ends of two pipes may be joined without the use of a separate fitting.

Figure 42:
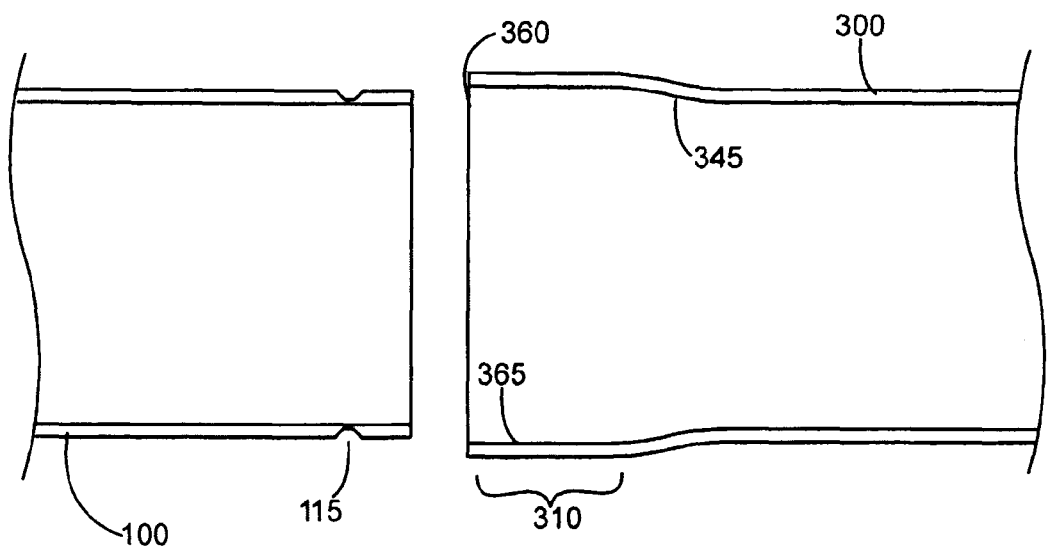
FIG. 42 is a cross section view of two pipe ends in accordance with another embodiment.
Figure 43:
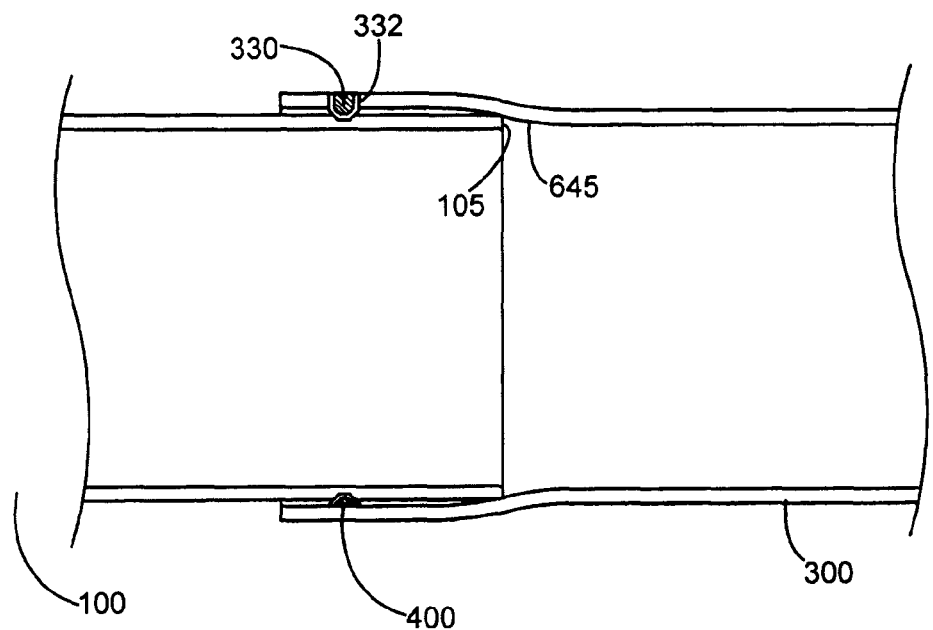
FIG. 43 is a perspective view of the two pipe ends of FIG. 42 after one end has been inserted into the other.

For example, as exemplified in FIGS. 42 and 43, in some embodiments one of the ends of one of the pipes may be flared or otherwise shaped to receive an end of the other pipe, which may obviate the need for fitting 600.

For example, as exemplified in FIG. 42, an end 310 of a pipe 300 may be flared to provide an opening 360 in which an end 110 of a pipe 100 may be inserted.

Preferably, pipe end 310 and/or pipe end 110 is configured such that pipe 100 may be inserted up to (and preferably only up to) a predetermined distance into pipe 300. This may assist in aligning one or more features (e.g. injection passages, grooves) of the fitting and/or the pipe end with each other. For example, an inner tapered surface 345 of pipe 300 may act as an abutment surface for an end face 105 of pipe 100.

As exemplified in FIG. 43, end 110 of pipe 100 has been inserted into end 310 of pipe 300 until end face 105 abuts abutment surface 345, an injection passage 332 has been drilled in end 310, and pipe joining material 400 has been injected into groove 115 via inlet 330 of injection passage 332.

While not shown, it will be appreciated that in alternative embodiments, an inner groove may be provided in inner surface 365 of pipe end 310, without providing a groove on pipe 100 (e.g. as per FIG. 40), or an inner recess may be provided in inner surface 365 of pipe end 310 along with a recess on pipe 100 (e.g. as per FIG. 41).

It will be appreciated that, in an alternate embodiment, hollow fitting 600 may be sized to be received in pipe 100, 200. Pipe Sealing Tool.

Reference is now made to FIGS. 44 to 55, which exemplify a pipe sealing tool 2000 (which may also be referred to as a pipe sealing gun) that may be used with any apparatus or method disclosed herein or may be used by itself.

Tool 2000 is utilized to inject pipe sealing material into the interstitial space between a pipe and a fitting and/or into a groove. Accordingly, as exemplified, tool 2000 comprises a pipe joining material section, referred to generally as 2100, for holding pipe joining material for injection into a cavity, and an actuator, referred to generally as 2200, drivingly connected to the pipe joining material section for drawing pipe joining material from the pipe joining material section and out an injection or delivery nozzle of tool 2000.

Pipe joining material section 2100 is configured to hold or retain pipe joining material that is to be injected into a cavity. For example, pipe joining material section 2100 may comprise a cavity that receives pipe joining material and is adapted to eject the pipe joining material at a sufficient pressure such that the pipe joining material may be fill the required space to join to parts of a piping system together. If the pipe joining material is not fluid at ambient temperature, then the pipe joining material section 2100 may also prepare the pipe joining material for injection into a cavity, which may include conveying the pipe joining material within tool 2000 to a heating section in tool 2000 and/or heating the pipe joining material prior to injection.

Pipe joining material 400 may be supplied as a solid cylindrical tube or stick 2150. Accordingly, pipe joining material section 2100 may be configured to receive stick 2150 and heat the stick to produce a flowable pipe joining material that is ejected through nozzle 2110. Therefore, as exemplified in FIG. 49, pipe joining material section 2100 may comprise a delivery nozzle 2110, a heating section 2120, a transition section 2130, and an alignment section 2140.

Preferably, pipe joining material sticks 2150 are formed as elongated cylinders, and may be provided with engagement members, preferably female engagement members, such as a plurality of teeth or grooves or recesses 2155 for engagement with mating engagement members of actuator 2200, as will be discussed further subsequently. (As noted previously, pipe joining material may comprise from 1 to 95 wt % PVC and/or CPVC and from 15 to 95% polyamide, based on a total weight of the pipe joining material.)

Alignment section 2140 acts to receive and optionally to coaxially align and guide a stick 2150 of pipe joining material 400 into transition section 2130 and hot material section 2122. Accordingly, alignment section 2140 is configured to receive stick 2150. For example, tool 2000 may be configured to accept sticks 2150 via a pipe joining material receiving port 2001 aligned with pipe joining material section 2100. Accordingly, a user may slide a stick 2150 into alignment section 2140 as required. Alternatively, alignment section 2140 may have an openable door and, when the door is opened, stick 2150 may be inserted into a chamber.

While alignment section 2140 is shown as a separate component, it will be appreciated that one or more components of housing 2005 may be configured to act as an alignment section for pipe joining material stick 2150.

Optional transition section 2130 acts as a guide for pipe joining material stick 2150, and/or as a thermal barrier between alignment section 2140 and a hot material section 2122. Transition section 2130 is preferably made of a thermally insulating material that also has a low coefficient of friction with the pipe joining material when it is in either a liquid or solid state. In some embodiments, transition section 2130 is made of polytetrafluoroethylene (PTFE). A retaining band 2132 may be provided to secure transition section 2130 to hot material section 2122.

Transition section 2130 may also be configured to secure pipe joining material section 2100 within tool housing 2005. For example, transition section 2130 may be provided with a groove 2134 that engages with an interior wall 2106 of housing 2005, so that a load applied to delivery nozzle 2110 along the longitudinal axis of pipe joining material section 2100 (such as when delivery nozzle 2110 is pressed against a surface of a pipe) is transferred to wall 2106, restraining pipe joining material section 2100 within housing 2005. As will be appreciated, pipe joining material section 2100 may additionally, or otherwise, be restrained against movement relative to housing 2005. It will be appreciated that transition section 2130 may be part of alignment section 2140.

Heating section 2120 is configured to heat the pipe joining material to a desired temperature for use and may be of any design known in the art. As exemplified, heating section 2120 may comprise a hot material section 2122, which defines a chamber to contain the pipe joining material as it is heated, surrounded by a heater 2124, such as a band heater. Accordingly, hot material section 2122 defines a chamber in which pipe joining material 400 may be melted or liquefied. It will be appreciated that the pipe joining material at the upstream end of hot material section 2122 (i.e. the portion adjacent transition section 2130) may be solid and may fit sufficiently tightly so as to prevent liquefied pipe joining material flowing upstream to transition section 2130.

Heating section 2120 may be controlled by any mechanism. For example, the heating element(s) in heating section 2120 may be actuated when pipe joining material is being advanced through the section, such as by the lever 2020. Alternatively, the heating elements may be actuated to maintain the pipe joining material at a desired temperature or temperature range. Accordingly, heating element(s) in heating section 2120 may be operatively connected to control electronics 2300 and/or a power supply by wires (not shown). In some embodiments, heating section 2120 comprises a temperature sensor such as a thermocouple (not shown) to measure the temperature of the band heater, the temperature of the pipe joining material at one or more locations within heating section 2120, and/or a temperature of the hot material section 2122. The power supply may be one or more on-board batteries or power drawn from an external power supply, such as an external battery or an AC cord that is configured to plug into a household electrical outlet.

Delivery nozzle 2110 may be of any design for ejecting liquefied pipe joining material 400 from tool 2000. As exemplified, delivery nozzle comprises a separate optional heat tip 2112 and nozzle 2114. It will be appreciated that delivery nozzle 2110 may comprise a single component acting as both nozzle and heat tip. If passages 632, 637 are preformed, nozzle 2114 may be sized to be received therein. Alternatively, if tool 2000 is used to form the passages, nozzle 2114 may be sized to be received in the passages so formed.

As noted previously, an actuator may be provided to drivingly advance pipe joining material through pipe joining material section 2100. Actuator 2200 may be of any design that is useable to cause pipe joining material 400 to pass through tool 2000. Therefore, the design may vary based on the configuration of, e.g., the pipe joining material receiving chamber. For example, if the chamber holds liquid pipe joining material, actuator 2200 may be configured to constrict the chamber or pressurize the chamber to eject the liquid pipe joining material. If the pipe joining material is inserted into tool 2000 as a solid, then actuator 2200 may be configured to directly or indirectly interact with the solid pipe joining material. For example, actuator 2200 may actuate a motor that drives a member that moves the solid pipe joining material into heating section 2120. Alternatively, actuator 2200 may directly interact with stick 2150 such as by having engagement members that are configured to engage and advance stick 2150. Optionally, as exemplified, stick 2150 is provided with mating engagement members (e.g., recesses 2155). For example, as exemplified in FIG. 51, actuator 2200 may comprise lever 2020, a pipe joining material engaging member 2210 having one or more pipe joining material engaging pawls 2212, and an actuator sled 2220. Actuator sled 2220 may be supported in a track 2013 in housing 2005, or otherwise supported within tool 2000 such that actuator sled 2220 can be translated substantially parallel to a longitudinal axis of pipe joining material section 2100.

Figure 52:
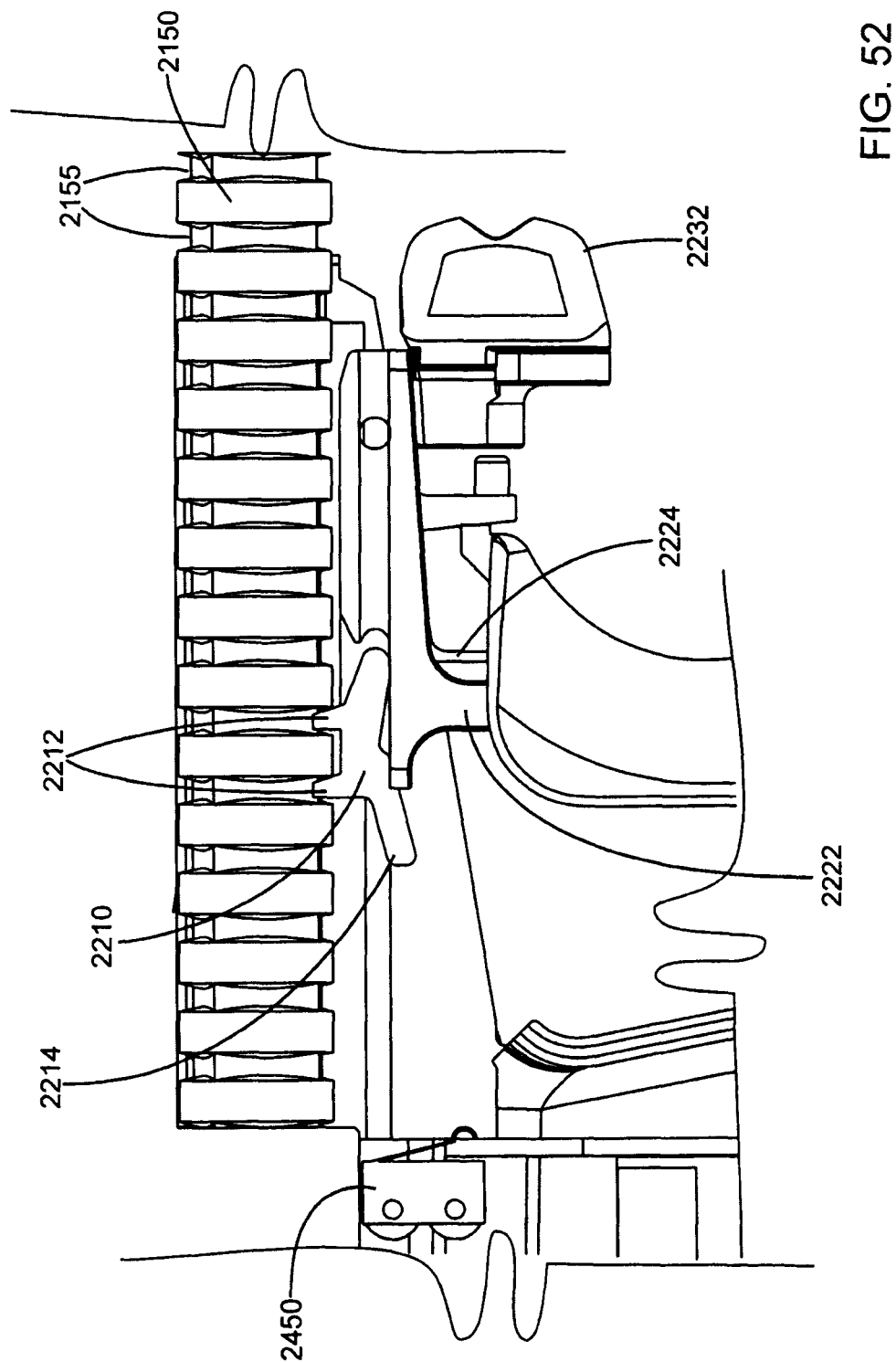
FIG. 52 is an partially cut away view of an end of the actuator of the pipe sealing tool of FIG. 44.
Figure 53:
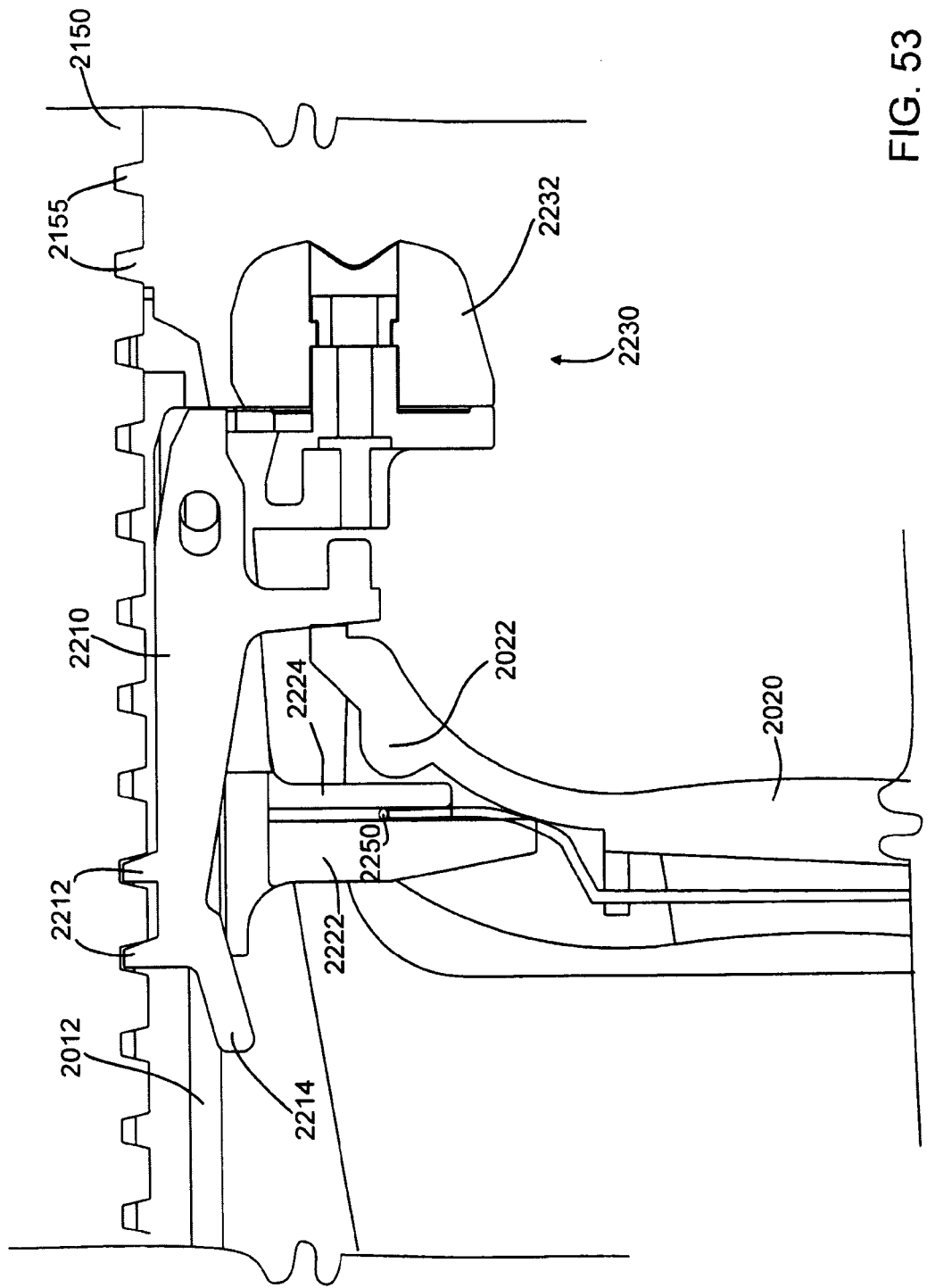
FIG. 53 is a cross section along the line G-1-G1 in FIG. 44 of the end of the actuator of FIG. 52.

As exemplified in FIGS. 52 and 53, a cam surface 2023 of lever 2020 may engage a flange 2224 of actuator sled 2220 so that when lever 2020 is moved towards tool handle 2002, a rotational movement of lever 2020 results in a linear motion of actuator sled 2220 and pipe joining material engaging member 2210, generally parallel to pipe joining material section 2100. Therefore, as actuator 2200 is depressed, the engagement of pawls 2212 into recesses 2155 causes stick 2150 to advance in the downstream direction.

As discussed above, in some embodiments actuator 2200 may configured so that each time it is actuated, a substantially similar volume of pipe joining material is ejected from delivery nozzle 2110. For example, tool 2000 may be configured such that each time lever 2020 is squeezed against handle 2002, actuator sled 2220 is advanced the same distance, and the engagement of pawls 2212 and recesses 2155 cause stick 2150 to advance the same distance towards heating section 2120 and/or delivery nozzle 2110. In this way, a substantially similar volume of pipe joining material 400 will be ejected in response to each actuation of actuator 2200.

In some embodiments, an interlock 2230 may be provided to disengage the actuator from the stick 2150 or other actuation mechanism. As exemplified, interlock 2230 may reposition pipe joining material engaging member 2210 relative to actuator sled 2220 between an engaging position where the one or more pipe joining material engaging pawls 2212 engage with one or more teeth provided on pipe joining material stick 2150 (see e.g. FIGS. 52 and 53), and a non-engaging position where the one or more pipe joining material engaging pawls 2212 do not engage with one or more teeth provided on pipe joining material stick 2150 (see e.g. FIG. 54). As a result, when pipe joining material engaging member 2210 is in the engaging position, applying a force to lever 2020 towards handle 2002 results in a force being applied to pipe joining material stick 2150 by pipe joining material engaging pawls 2212 to move the pipe joining material in the downstream direction, and when pipe joining material engaging member 2210 is in the non-engaging position, actuator sled 2220 and pipe joining material engaging member 2210 can be moved in the downstream direction towards alignment section 2140 without applying a force to pipe joining material stick 2150.

For example, interlock 2230 may comprise a rotatable dial 2232 formed with—or connected to—a cam surface 2233 that interfaces with a rear end 2216 of pipe joining material engaging member 2210 such that by rotating dial 2232 in one direction, cam surface 2233 may drive pipe joining material engaging member 2210 away from actuator sled 2220 thereby repositioning pipe joining material engaging member 2210 to the non-engaging position. Similarly, by rotating dial 2232 in the other direction or further in the same direction, a biasing member (not shown) may drive pipe joining material engaging member 2210 towards actuator sled 2220 thereby repositioning pipe joining material engaging member 2210 to the engaging position.

Other interlock mechanisms may be used. For example, the interlock mechanism may be a member that inhibits lever 2020 being depressed, such as a guard or a pin that is inserted in front of lever 2020 as a physical barrier to inward movement of lever 2020.

Optionally, tool 2000 may include a member to issue a signal when an amount of pipe joining material that is sufficient to fill a determined (or estimated) volume of a cavity into which pipe joining material is to be injected has been injected into the cavity. The member may be a pressure sensor, temperature sensor or volume analyzer.

For example, as exemplified in FIG. 53, an electromagnetic transducer (such as a load cell) or other force sensor 2250 may be provided to measure a net force applied to lever 2020, such as when the lever is being advanced towards handle 2002. Accordingly, when pipe joining material engaging member 2210 is engaged with one or more recesses provided on pipe joining material stick 2150, and a user squeezes lever 2020, transducer 2250 may output (e.g. via cable 2253) a signal indicative of the cavity being filled. For example, when the cavity is filled, the resistance to movement of pipe joining material stick 2150 forwardly through pipe joining material section 2100 will increase and force sensor 2250 may then cause a signal to issue (which may be audio and/or visual and/or tactile, such as a vibrator). This signal therefore indicates when the cavity is filled. In some embodiments, the signal may be proportional to the resistance provided to pipe joining material stick 2150 being advanced forwardly through pipe joining material section 2100 towards delivery nozzle 2110. In this case, the signal level may change (e.g., increase) as the resistance of lever 2020 to movement increases thereby providing a warning as the cavity is filled.

Transducer 2250 is preferably located between first and second flanges 2222, 2224 that extend from actuator sled 2220. First transducer flange 2222 may be relatively thicker than second transducer flange, and/or otherwise shaped or constructed so that flange 2222 is more resistant to lateral force than flange 2224. In this way, when cam surface 2022 engages second transducer flange 2224, second transducer flange 2224 may be displaced towards first transducer flange 2222, actuating transducer 2250. This arrangement accounts for the relative movement of cam surface 2022 (travelling on the arcuate path of lever 2020) and actuator sled 2220 (travelling in a linear path substantially parallel to pipe joining material section 2100) as lever 2020 is brought towards handle 2002 by allowing cam surface 2023 to move across a face of transducer flange 2224 while still actuating transducer 2250.

Alternatively, or additionally, a pressure sensor (not shown) may be located elsewhere within pipe joining material section 2100 (e.g. within hot material section 2122) and operable to measure the pressure of liquefied pipe joining material 400. A signal representing an increase in pressure of liquefied pipe joining material to a predetermined level may be indicative that a cavity into which the pipe joining material is being injecting is full.

Alternatively, or additionally, a temperature sensor (not shown), such as an infra-red (IR) thermometer may be located on a front facing surface of the housing 2005 (e.g. in an aperture 2003), and configured to measure a surface temperature of an object, such as a pipe or a housing, into which a liquefied pipe joining material is being injected by gun 2000. A signal representing that the surface temperature of the object has reached a predetermined value may be indicative that a cavity into which the pipe joining material is being injecting is full.

Alternatively, or additionally, a volume analyzer (not shown) configured to determine a volume (or an estimated volume) of a cavity into which pipe joining material will be injected may be provided. For example, the volume analyzer may comprise a sensor (not shown), such as a camera mounted on a forward facing surface of housing 2005 (e.g. in an aperture 2003), configured to determine a diameter of a pipe and to provide a signal to control electronics 2300 for determining, based on the pipe diameter, a volume of a cavity into which pipe joining material is to be injected. For example, for a pipe of a given diameter, a controller or the like may be programmed with the volume of pipe joining material required to fill a cavity when a particular hollow fitting 600 is utilized.

In embodiments where actuator 2200 is configured so that each time it is actuated, a substantially similar volume of pipe joining material is ejected from delivery nozzle 2110, the volume analyzer and/or control electronics 2300 may be configured to display an indication to a user (e.g. via display screen 2350) as to how many times actuator 2200 should be actuated to ensure the cavity into which pipe joining material is to be injected is filled with pipe joining material.

Where a volume analyzer is provided, a delivery analyser (not shown) may also be provided. The delivery analyzer is configured to determine when an amount of pipe joining material sufficient to fill a determined (or estimated) volume of a cavity into which pipe joining material is to be injected. For example, a linear encoder may be provided to track the movement of a pipe joining material stick 2150 as it advances through pipe joining material section 2100. Provided an average diameter of the pipe joining material section 2100 is known, a volume of pipe joining material ejected from delivery nozzle 2110 may then be determined based on the advancement of pipe joining material stick 2150. As another example, a rotary encoder may be provided at the connection 2004 between lever 2020 and handle 2002, and a linear advancement of pipe joining material stick 2150 may be determined based on the rotation of lever 2020. A flow meter may alternatively be utilized.

As will be appreciated, a delivery analyzer may also be provided in embodiments without a volume analyzer. For example, a user may be able to select from one or more standard pipe diameters, using a dedicated switch (not shown), a user interface associated with display 2350, or other means. Alternatively, the delivery analyzer may be configured to determine when a default or other predetermined quantity of pipe joining material has been ejected from delivery nozzle 2110.

Control electronics 2300 may be operatively coupled to some or all of the electronic sub-components of tool 2000. For example, control electronics 2300 may be coupled to heater 2124 and/or one or more temperature sensors (not shown) in heating section 2120 to regulate the temperature of pipe joining material within hot material section 2122. Control electronics 2300 may also be coupled to transducer 2250 and/or other sensors for determining when a cavity has been filled by pipe joining material ejected from delivery nozzle 2110.

Control electronics 2300 may also be configured to perform calculations for one or more of the volume analyzer, delivery analyzer, or other components coupled to tool 2000.

Control electronics 2300 may also be operatively coupled to one or more signaling members to convey information to a user of gun 2000 regarding the status of one or more monitored conditions. For example, a display screen 2350 may be provided to provide an indication that pipe joining material within pipe joining material section 2100 is at a suitable temperature to be ejected from delivery nozzle 2110. Display screen 2350 may also provide an indication that the output from one or more sensors, such as force sensor 2250 to issue a signal to a user of tool 2000 when the output from the one or more sensors is indicative that a cavity into which pipe joining material is being ejected has been filled.

Display screen 2350 may be any suitable display device, such as, for example, a liquid crystal display (LCD), a segment display, an Organic LED (OLED) display, a light emitting diode (LED) display, or an electrophoretic display. Display screen 2350 may also be a touch screen display, capable of receiving input from a user.

Other signaling members may be provided as an alternative to, or in addition to, display screen 2350. For example, an audio signalling member 2360 such as an electroacoustic transducer (or speaker) may be configured to provide an audible tone in response to a sensor detecting that a cavity has been filled, and/or when otherwise directed by control electronics 2300. As another example, a vibrating member such as a vibratory electric motor 2370, or other actuator, may be configured to provide haptic feedback to a user of tool 2000 when a sensor detects that a cavity has been filled, and/or when otherwise directed by control electronics 2300. As yet another example, one or more indicator lights (such as LEDs) may be incorporated into tool 2000 and configured to illuminate, strobe, and/or change colour in response to a sensor detecting that a cavity has been filled, and/or when otherwise directed by control electronics 2300. For example, one or more battery indicator lights (not shown) may be provided to convey information to a user regarding the status of a battery coupled to tool 2000.

Control electronics 2300 may also comprise a data logging module (not shown) for recording data related to one or more sensors and/or operations of tool 2000. For example, the data logging module may record data corresponding to a volume of pipe joining material ejected from delivery nozzle 2110, which may be estimated using data collected from the delivery analyzer. The data logging module may be configured to record a volume of pipe joining material ejected during each actuation of lever 2020, a total volume of pipe joining material ejected into each cavity (e.g. based on the volume of pipe joining material ejected between control electronics 2300 receiving signals from transducer 2250 or other sensor(s) indicative that a cavity into which the pipe joining material is being injecting is full), a total volume of pipe joining material ejected (e.g. based on a number of pipe joining material sticks that pass through pipe joining material section 2100), and/or a number of cavities that are filled (again, which may be based on a number of signals indicative that a cavity has been filled) and this information may be time stamped or otherwise tagged to provide an output, e.g., of the cavities filled per hour or per shift. The data logging module may also record data corresponding to a number of signals issued by the signaling member.

The data logging module may also record operational parameters one or more components of tool 2000, such as temperature readings from heating section 2120, electrical current draw by band heater 2124, force data from force sensor 2250, pressure date from a pressure sensor within pipe joining material section 2100, temperature data from an IR thermometer, etc.

The data logging module may also include a timing module, and be configured to record data corresponding to the time(s) at which a volume of pipe joining material was ejected from the delivery nozzle, which may be an absolute time (e.g. 12:00 am on May 24), and/or a relative time (e.g. 20 minutes since the last time a volume of pipe joining material was ejected from the delivery nozzle). Time information may also be recorded for other operational parameters, such as when band heater 2124 was turned on and off.

In this way, the data logging module may be operable to record a detailed log of the use of the tool throughout a predetermined time period, such as a working day, work week, or throughout a particular piping system installation project.

Control electronics 2300 may be configured to display some or all of the logged data on display screen 2350. Alternatively, or additionally, control electronics may comprise a communications module (not shown) configured to establish a communication channel between the data logging module and a computing device, such as a laptop computer, tablet computing device, mobile communication device, remote server, etc. The communication channel may be established by the communication module using any suitable wired or wireless protocol, and may be configured as a personal area network (PAN), a point-to-point network, or any other suitable network topology. Wired communication may be conducted in accordance with Universal Serial Bus (USB) standards, and tool 2000 may be provided with a Standard, Mini, or Micro USB port (not shown). Examples of wireless communication include standards developed by the Infrared Data Association (IrDA), Near Field Communication (NFC), and the 803.11 family of standards developed by the Institute of Electrical and Electronics Engineers (IEEE). In some embodiments, a relatively short-range wireless communications protocol such as Bluetooth® or Wireless USB may be used.

The communications module may be configured to transmit some or all of the recorded data to the computing device over the communication channel, so that data logged by tool 2000 may be reviewed, stored, and/or audited. For example, data logged by tool 2000 may be used to compare an amount of pipe joining material actually ejected by tool 2000 with a number of pipe joining material sticks requisitioned by a user of tool 2000 to confirm that the pipe joining material sticks provided to a user were actually used. The logged data may also be compared with an installation plan for a piping system being assembled, to confirm that the total number of cavities actually filled using tool 2000 corresponds with the total number of cavities required to be filled to correctly install the piping system.

Figure 50:
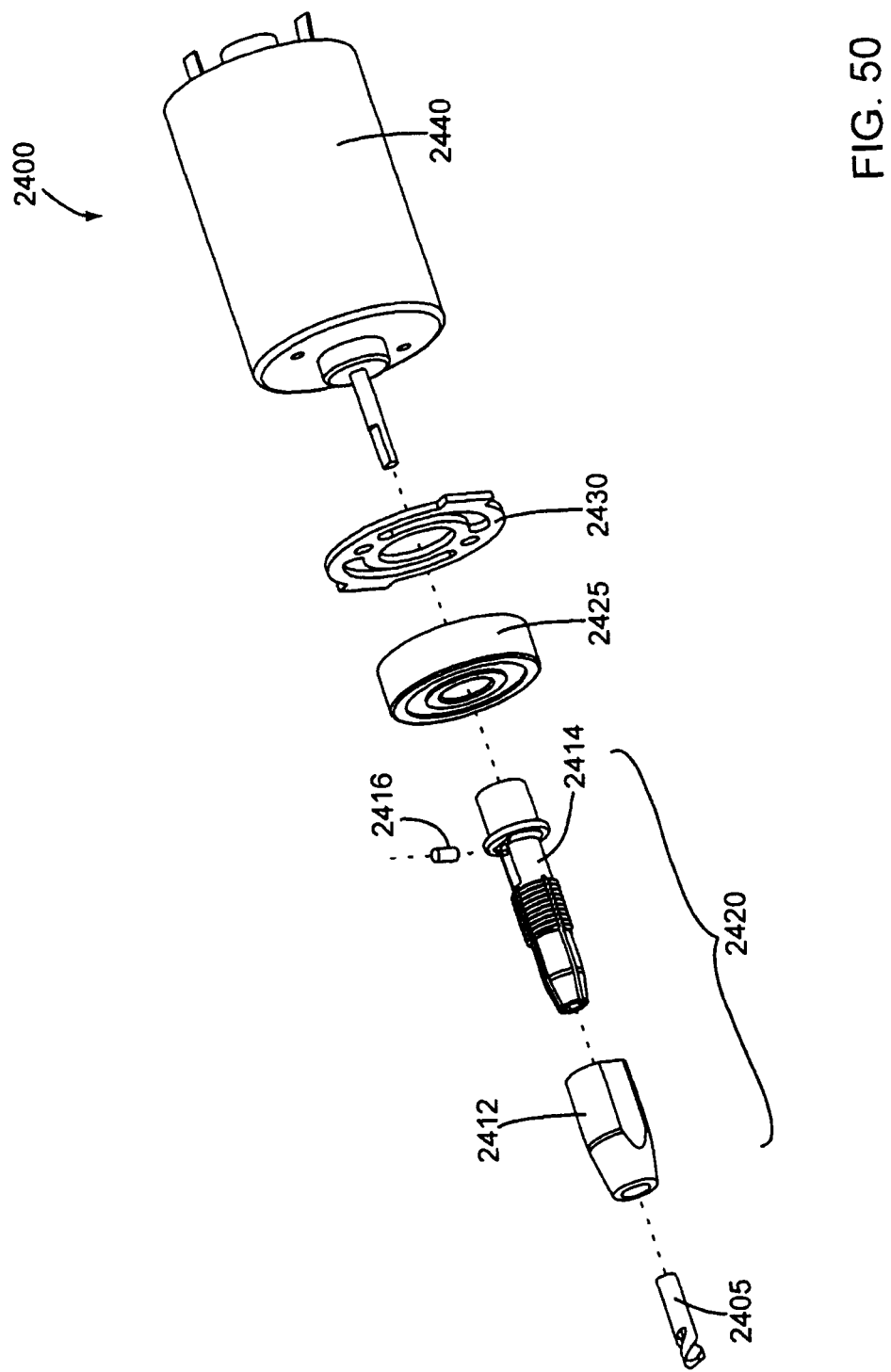
FIG. 50 is an exploded view of a drilling section of the pipe sealing tool of FIG. 44.
Figure 51:
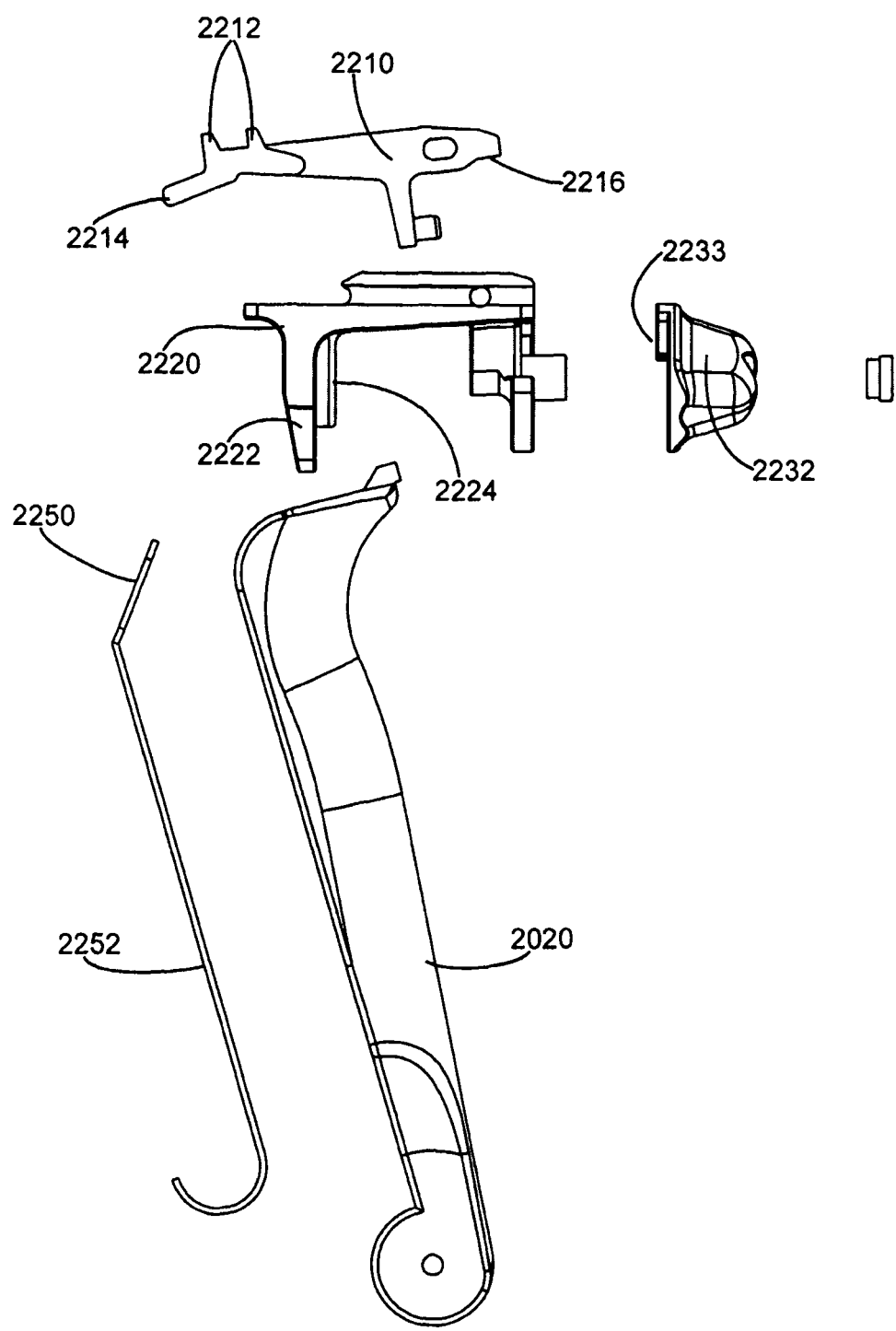
FIG. 51 is an exploded view of an actuator of the pipe sealing tool of FIG. 44.

Returning to FIG. 48, pipe connecting tool 2000 may comprise a drilling assembly 2400. As shown in FIG. 50, drilling assembly 2400 may comprise a drill chuck 2410, which may be keyless, for supporting a drill bit 2405. Chuck 2410 is shown with jaws or a collet 2414 and an outer sleeve 2412 for loosening or tightening the jaws about the drill bit. Set screw 2416 may be used to secure the chuck to the output shaft of a motor, such as electric motor 2440. One or more bearings 2425 and/or mounting plates 2430 may also be provided.

Figure 44:
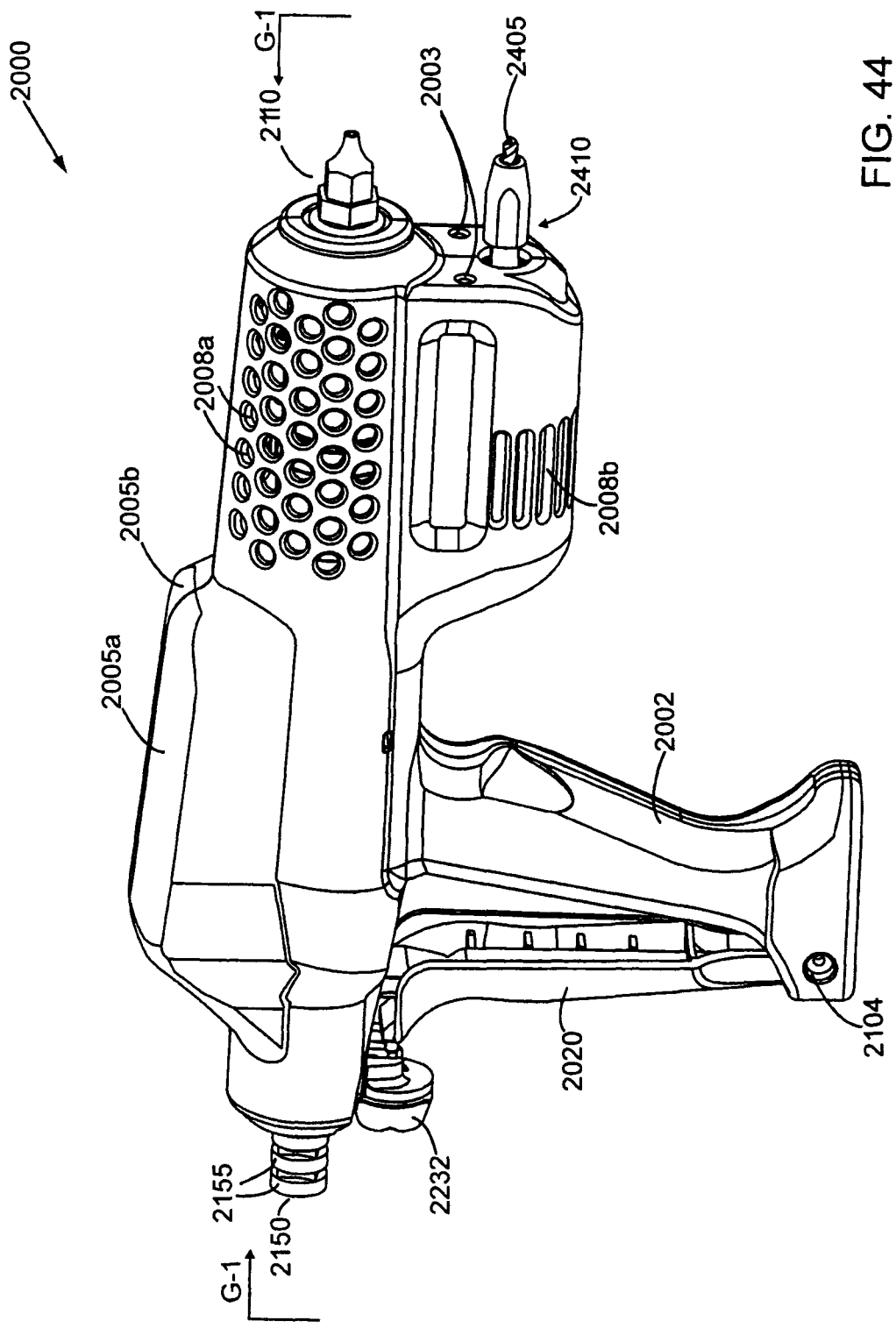
FIG. 44 is a front perspective view of a pipe sealing tool in accordance with at least one example embodiment.
Figure 45:
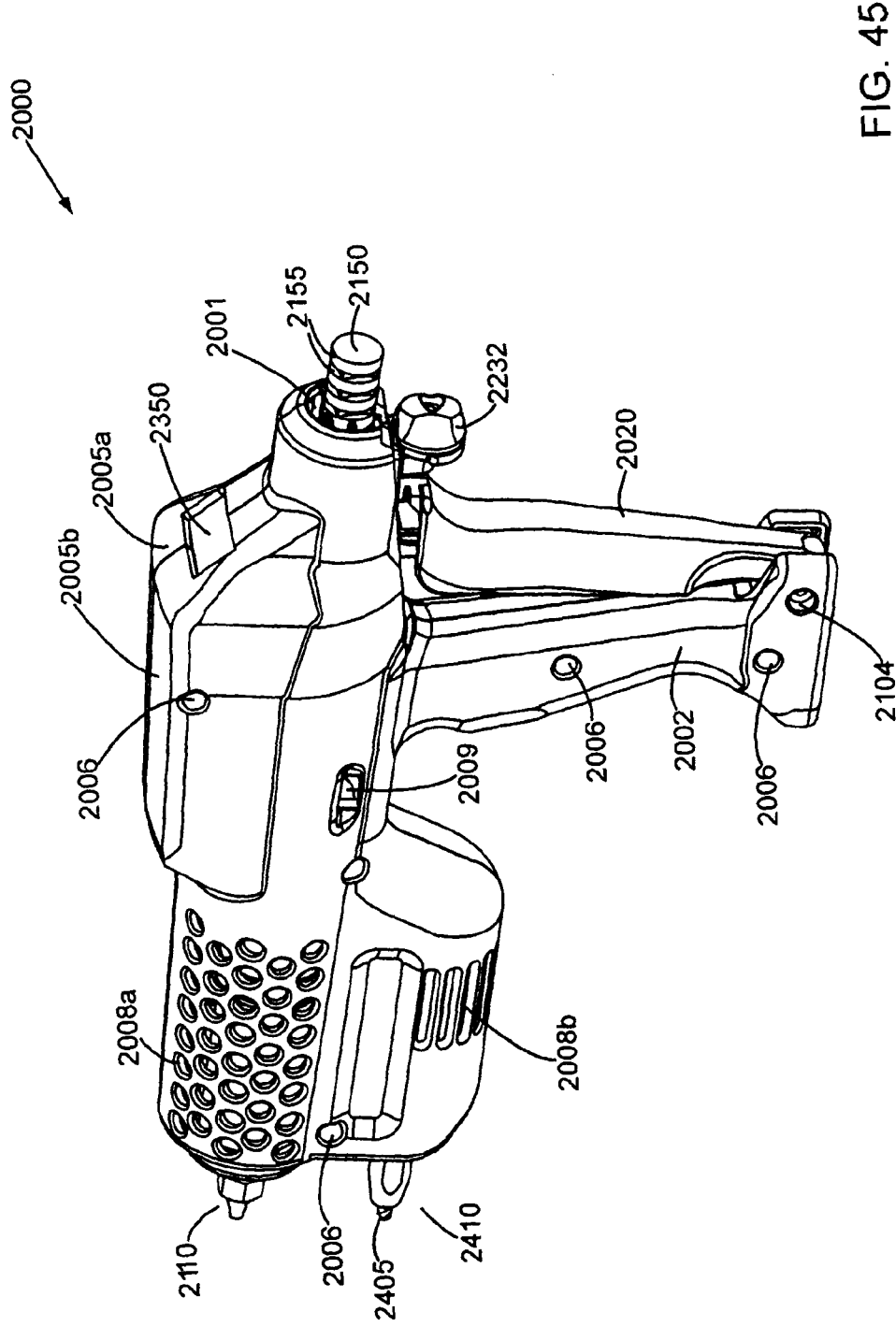
FIG. 45 is a rear perspective view of the pipe sealing tool of FIG. 44.
Figure 46:
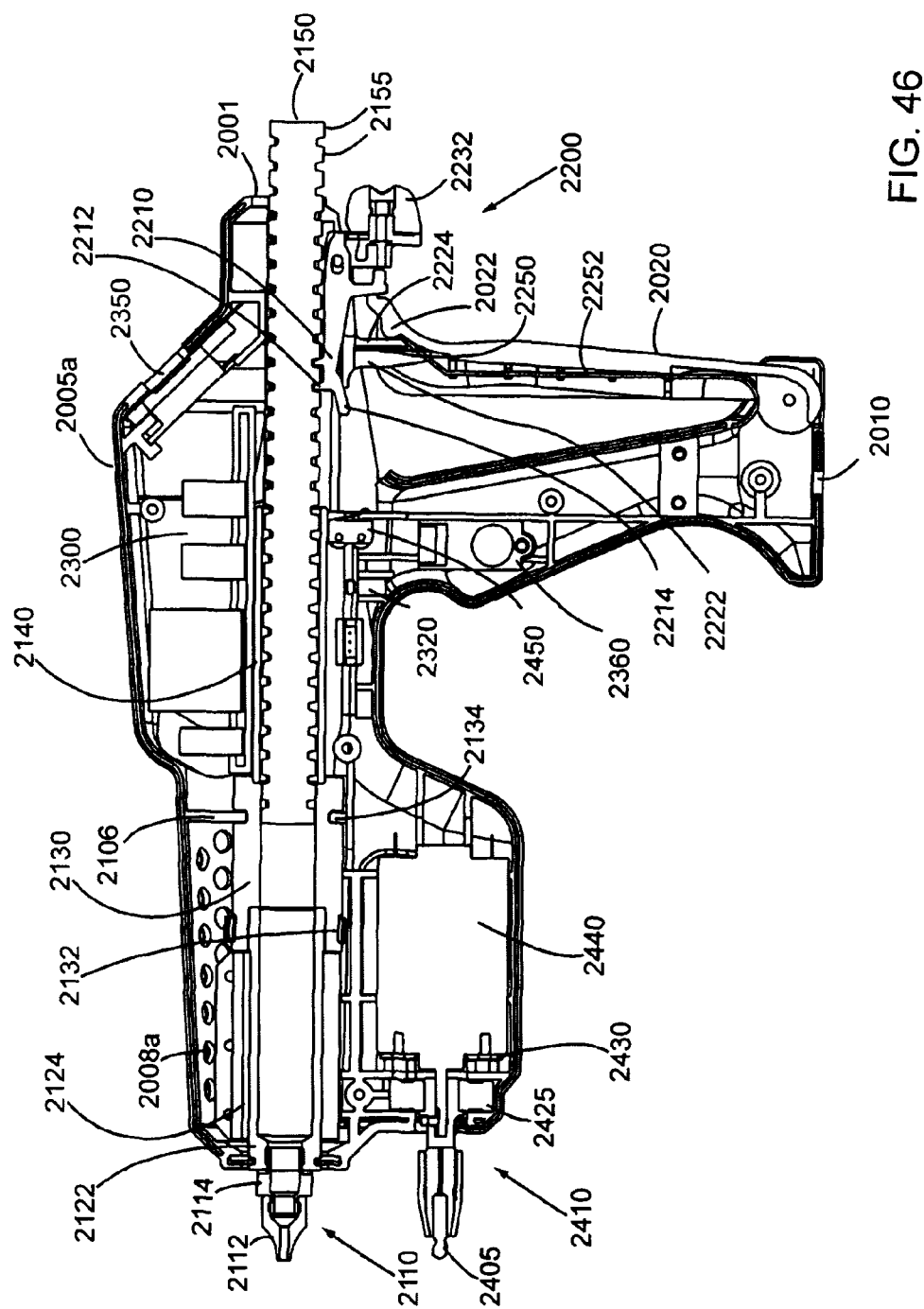
FIG. 46 is a cross section view along the line G-1-G-1 in FIG. 44 of the pipe sealing tool of FIG. 44.
Figure 47:
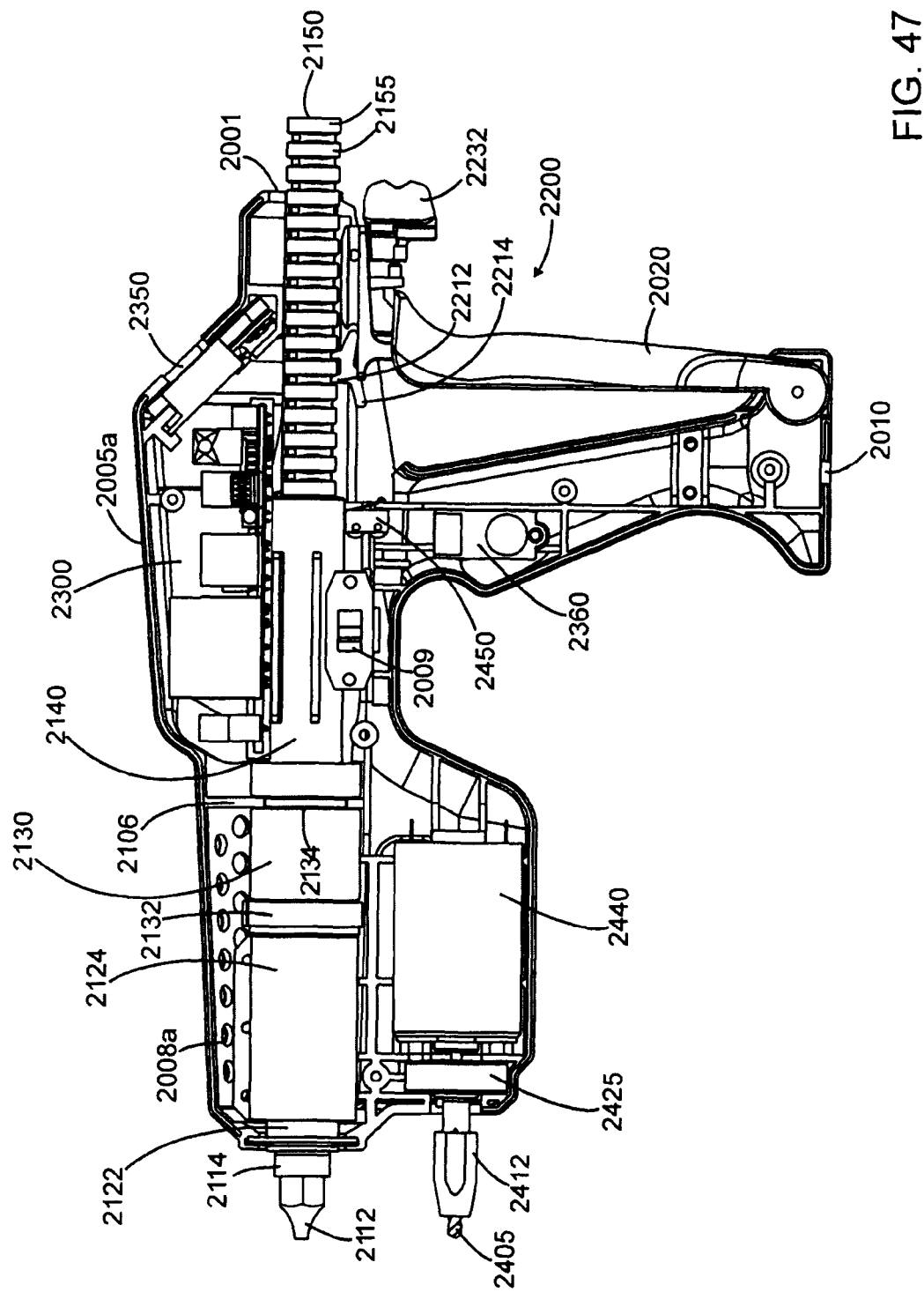
FIG. 47 is a side view of the pipe sealing tool of FIG. 44 with a side housing removed and with a lever of the pipe sealing tool in a different position.
Figure 48:
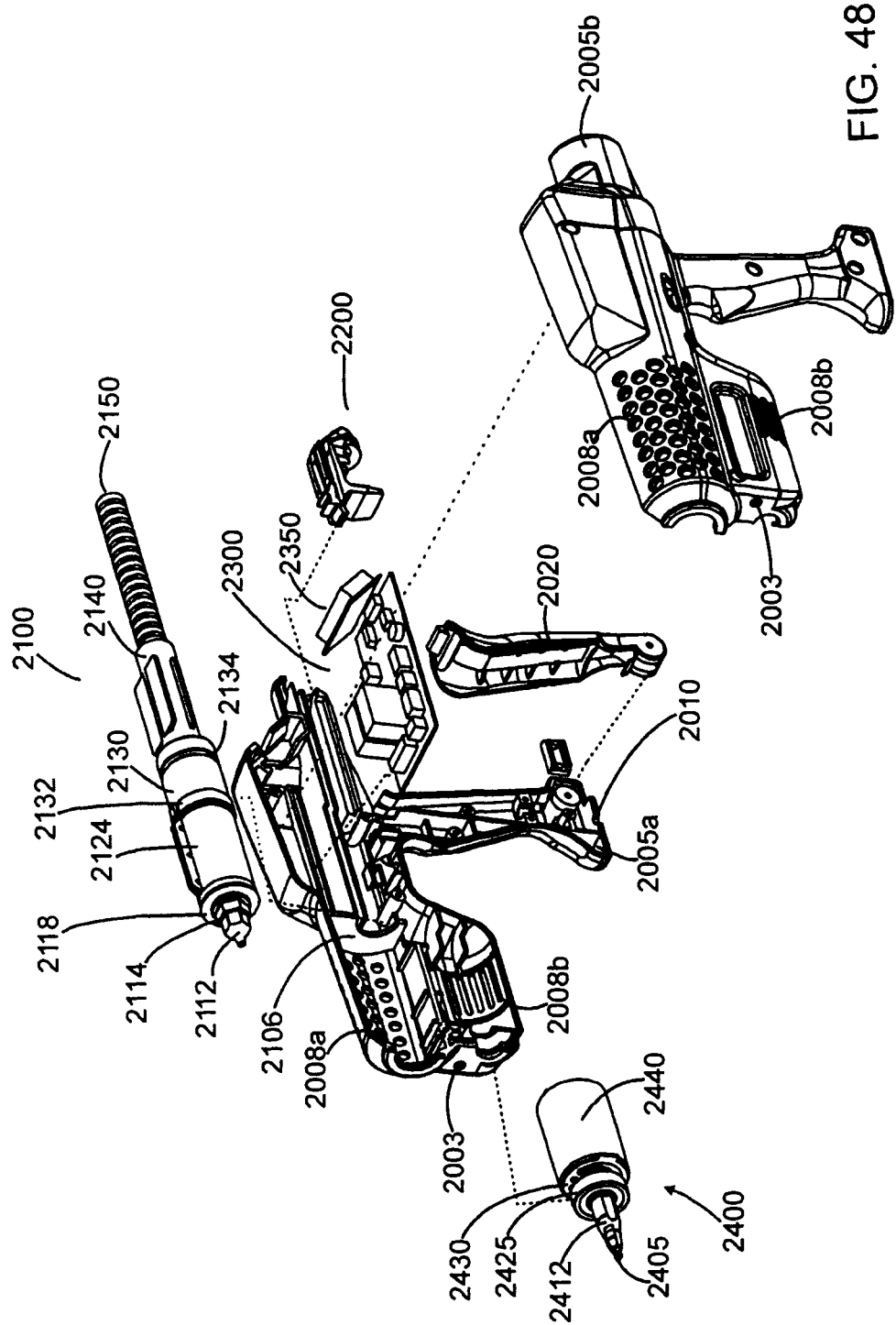
FIG. 48 is a partially exploded front perspective view of the pipe sealing tool of FIG. 44.
Figure 49:
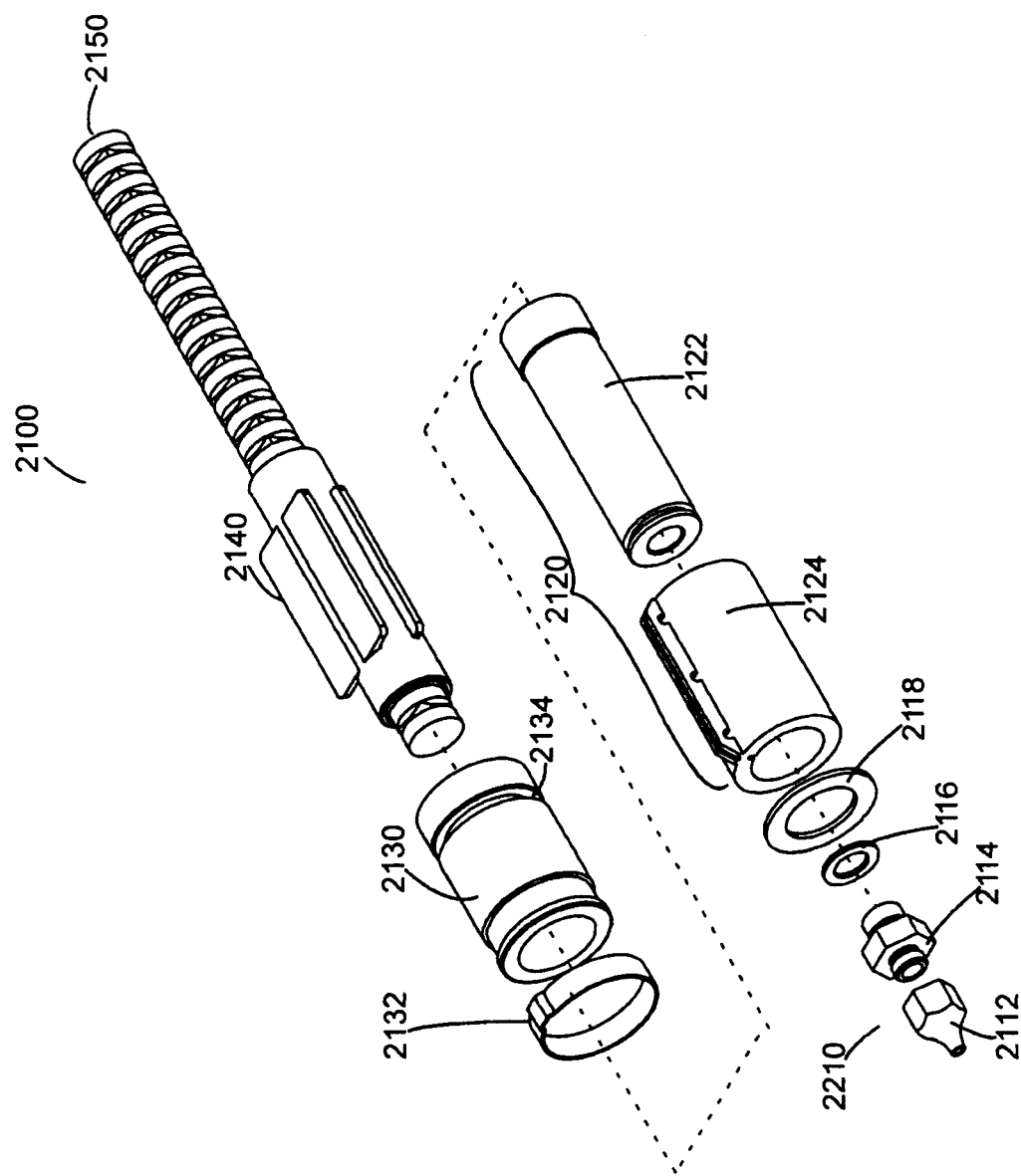
FIG. 49 is an exploded view of a pipe joining material section of the pipe sealing tool of FIG. 44.

Optionally, as exemplified in FIG. 44, a drill guide 2460 may be provided to engage a surface to be drilled (such as the surface of a pipe fitting) to ensure drill bit 2405 only penetrates the object being drilled by a predetermined distance. For example, when drilling into a hollow fitting mounted on an end of a pipe, drill guide 2460 may allow drill bit 2405 to penetrate the hollow fitting 600, but not penetrate or substantially penetrate the end of the pipe. It will be appreciated that different sized drill guides and/or drill bits may be provided with tool 2000, depending on an expected thickness and/or outer curvature of the object (such as a hollow fitting) being drilled. Drill guide 2460 may be depth adjustable if fittings 600 or pipes of differing thicknesses are used.

Figure 54:
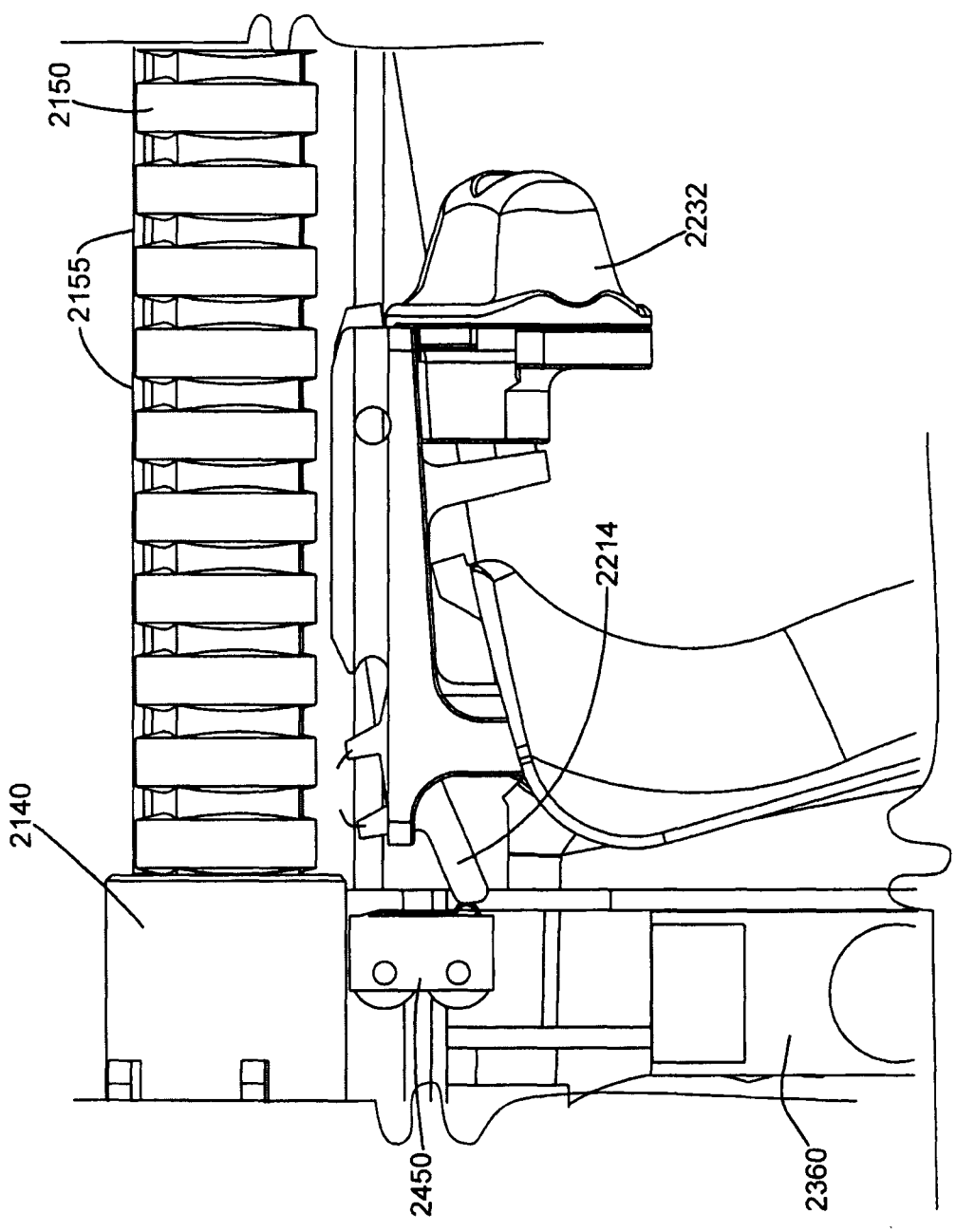
FIG. 54 is a side view of the end of the actuator of FIG. 52 with a side housing removed and with the actuator in a different position.
Figure 55:
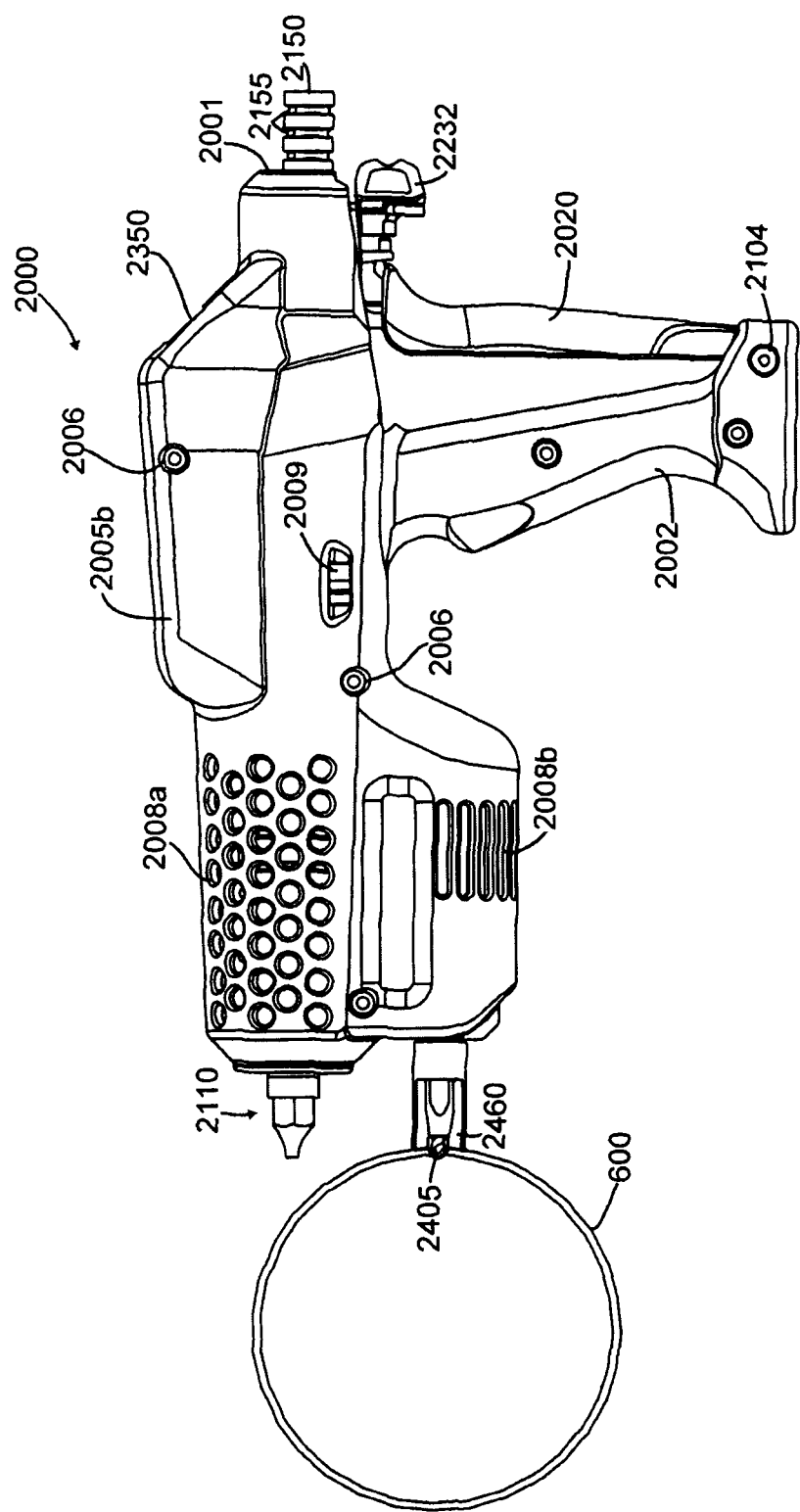
FIG. 55 a side view of the pipe sealing tool of FIG. 44 shown with an optional drilling guide abutting a pipe section.

Motor 2440 may be selectively actuated by bringing lever 2020 towards handle 2002 so that motor switch 2450 (see FIG. 46) is engaged by a motor actuation flange 2214 of pipe joining material engaging member 2210 (as shown in FIG. 54).

As noted previously, optional interlock 2230 may allow actuator 2200 to be selectively engaged with pipe joining material stick 2150 to advance the pipe joining material through pipe joining material section 2100, for ejection from delivery nozzle 2110. In some embodiments, interlock 2230 may be operable to alternately drivingly connect lever 2020 to actuate or cause the advancement of pipe joining material 400 and to actuate motor 2440.

For example, when pipe joining material engaging member 2210 is in the engaging position, motor actuation flange 2214 may be positioned so that it will not actuate motor switch 2450 when lever 2020 is brought towards handle 2002, and when pipe joining material engaging member 2210 is in the non-engaging position, motor actuation flange 2214 may be positioned so that it will actuate motor switch 2450 when lever 2020 is brought towards handle 2002. In this way, interlock 2230 may be operable to select whether bringing lever 2020 towards handle 2002 will activate the drill motor or advance pipe joining material stick 2150 through pipe joining material section 2100, for ejection from delivery nozzle 2110.

It will be appreciated that interlock 2230 may also be configured to selectively position pipe joining material engaging member 2210 relative to actuator sled 2220 in a neutral position wherein neither motor switch 2450, nor actuator 2200, is engaged when lever 2020 is brought towards handle 2002.

Returning to FIG. 44, pipe joining material section 2100, control electronics 2300, and drilling assembly 2400 are preferably contained within a housing 2005. In the illustrated embodiment, housing 2005 primarily comprises complimentary housing portions 2005a and 2005b. As exemplified in FIG. 45, housing portions 2005a, 2005b may be secured to each other using screws or other mechanical fasteners inserted through fastener ports 2006 in housing portion 2005b to engage housing portion 2005b. It will be appreciated that, in variant embodiments, housing 2005 may comprise more or fewer housing portions, and that the housing portions may be secured in any suitable fashion.

Housing 2005 may also be provided with a plurality of ventilation holes 2008a in proximity to the heating section 2120. Also, one or more ventilation holes or slots 2008b may be provided in proximity to motor 2440.

Housing 2005 may also be provided with apertures for one or more auxiliary switches, such as a main power switch 2009 (see FIG. 45) for selectively connecting a power supply such as an external battery (not shown) or a main power supply, and/or a mute switch 2007 (see FIG. 44) for selectively enabling or disabling speaker 2360 and/or other signalling member(s).

Housing 2005 may also be configured to accommodate one or more light sources (such as LEDs) on a front facing surface of gun 2000 (e.g. in an aperture 2003), for illuminating a surface of an object to be drilled and/or into which pipe joining material is to be ejected.

Figure 56:
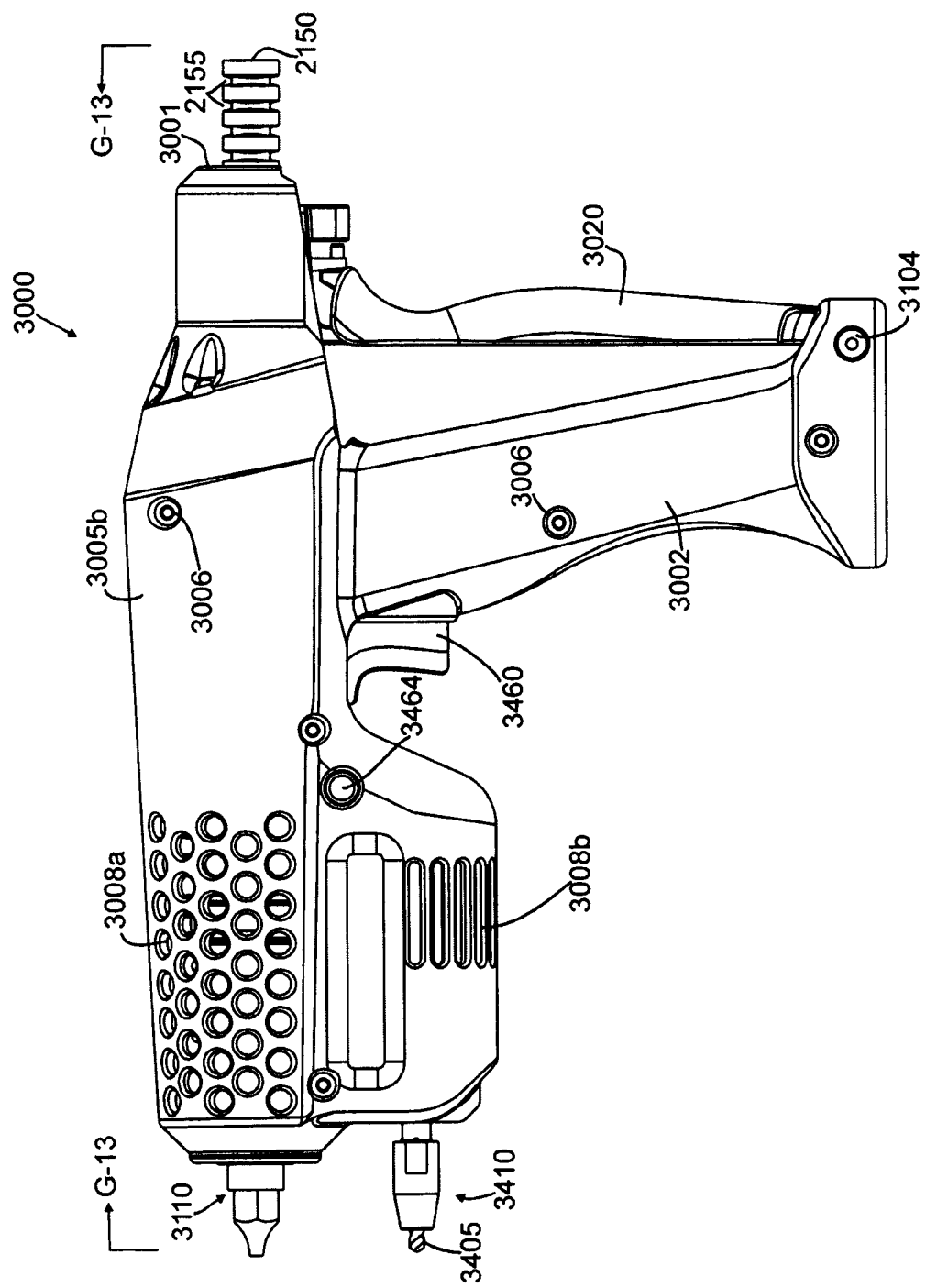
FIG. 56 is side view of an alternate pipe sealing tool in accordance with another embodiment; and, FIG. 57 is a cross section view along the line G-13-G-13 of the alternate pipe sealing tool of FIG. 56.
Figure 57:
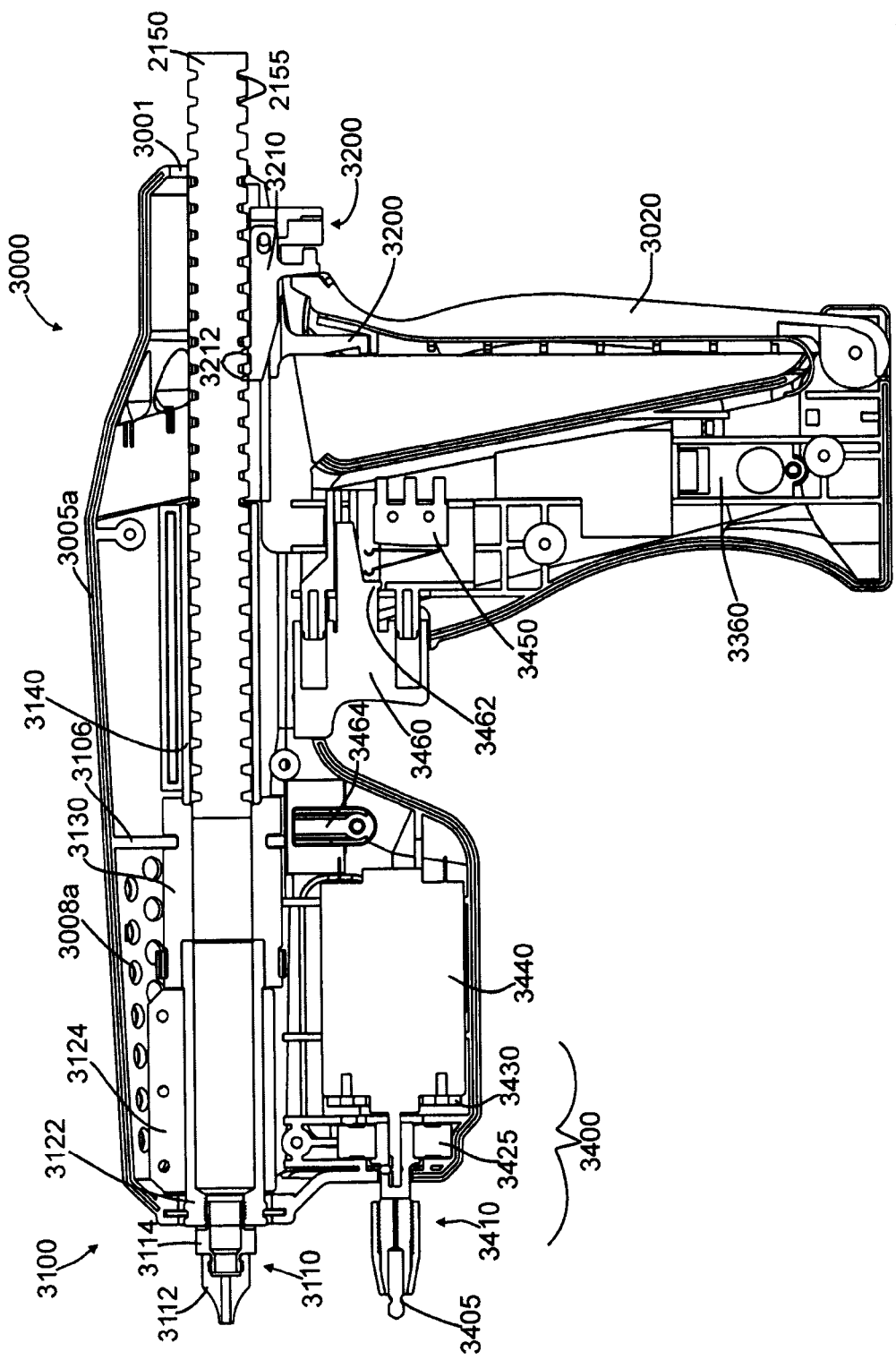

Reference is now made to FIGS. 56 and 57, which exemplify another example embodiment of a pipe sealing tool 3000, which may also be referred to as a pipe sealing gun 3000. Similar to tool 2000, tool 3000 includes a pipe joining material section 3100, an actuator 3200, and a drill assembly 3400. Components similar to those in tool 2000 have been similarly numbered, and will not be described further.

Tool 3000 comprises a separate trigger 3460 for activating drill assembly 3400. As trigger 3460 is brought towards handle 3002, trigger flange 3462 engages motor switch 3450 to selectively actuate drill motor 3440. A master drill motor on/off switch 3464 may be provided to control whether squeezing trigger 3460 will actuate drill motor 3440. For example, switch 3464 may be positioned or toggled so that switch 3450 is electrically coupled or decoupled from motor 3440 and/or a power supply supplying power to motor 3440 (not shown).

Actuator 3200 is similar to actuator 2200, but pipe joining material engaging member 3210 is not configured to actuate motor 3440. Interlock 3230 may be configured to reposition pipe joining material engaging member 3210 relative to actuator sled 3220 between an engaging position where the one or more pipe joining material engaging pawls 3212 can engage with one or more teeth provided on pipe joining material stick 2150, and a non-engaging position where the one or more pipe joining material engaging pawls 3212 do not engage with one or more teeth provided on pipe joining material stick 2150.

Pipe Joining Material

Various pipe joining materials are disclosed herein. These pipe joining materials may be used with the any of apparatuses and methods described herein. For example, the compositions may be used with any embodiment of the pipe sealing tool disclosed herein and/or with any method or apparatus for joining parts of parts of a piping system and/or for connecting parts of a piping system wherein a part has been prepared using any embodiment of the pipe cutting tool disclosed herein.

Preferably, the pipe joining material comprises a thermoplastic material and a bonding agent for the thermoplastic material. A thermoplastic material is any material that has a hard plastic form when cool and a liquid form when heated. PVC and CPVC are thermoplastic materials. Other thermoplastic materials, include, but are not limited to, acrylonitrile butadiene styrene (ABS), ethylene vinyl acetate (EVA) and polyethylene (PE). The thermoplastic material may be selected based on the composition of the parts of a piping system that are to be joined, such as a pipe and a hollow fitting. For example, the pipe joining material may be made of a similar thermoplastic material to that of the pipe and the hollow fitting. Accordingly, if the pipe and hollow fitting are made of PVC or CPVC, then the pipe joining material preferably comprises PVC and/or CPVC.

The thermoplastic material may comprise 1-95% of the pipe joining material by weight, 15-95% of the pipe joining material by weight, 35-85% of the pipe joining material by weight, 50-75% of the pipe joining material by weight or 55-70% of the pipe joining material by weight. Optionally, the thermoplastic material may comprise over 50% or over 75% of the pipe joining material by weight.

The "bonding agent for the thermoplastic material" is any agent that functions to bond the thermoplastic material together. For example, the bonding agent may encapsulate the thermoplastic material thereby allowing bonding or cross-linking amongst the molecules of the bonding agent. In one embodiment, the bonding or cross-linking of the molecules of the bonding agent only occurs above a specific temperature. Preferably, bonding or cross-linking occurs at the temperature at which the pipe joining material is injected. The temperature at which the pipe joining material is injected is also referred to as the application temperature and is preferably 60 to 200° C. or 100 to 150° C.

The bonding agent for the thermoplastic material may be selected from the following group: polyamide, ethylene acrylate, EVA, polyurethane, polyester, polyolephin, polycaprolacone, soy protein and styrene block co-polymer. Preferably, the bonding agent is polyamide.

The bonding agent may comprise the rest of the pipe joining material. Accordingly, if no fillers or additives are provided, then the bonding agent may comprise 5-99% of the pipe joining material by weight, 5-85% of the pipe joining material by weight, 15-65% of the pipe joining material by weight, 25-50% of the pipe joining material by weight or 30-45% of the pipe joining material by weight . . . .

The pipe joining material may further comprise a material that increases the flowability (e.g., reduce the viscosity at application temperature) of the material. For example, the pipe joining material may comprise a plasticizer such as alumisol or a wax such as a microcrystalline wax. Optionally, the pipe joining material includes 0-15%, 2-10%, 3-7% or 4-5% of a plasticizer by weight. It will be appreciated that a greater amount of plasticizer may be used when the pipe joining material is to be used for a larger diameter pipe so as to reduce the viscosity of the pipe joining material at application temperature.

The pipe joining material may further comprise an anti-oxidant. Examples of antioxidants include, but are not limited to, hindered phenols, phosphites, phosphates and hindered aromatic amines. Optionally, the pipe joining material includes 0-4% (i.e. up to 4%), preferably 0-2% of anti-oxidant by weight.

The pipe joining material may further comprise a conductive powder. Examples of conductive powders include, but are not limited to, carbon black, aluminum and silver. Optionally, the pipe joining material includes 0-10% (i.e., up to 10%), preferably 0-5% of conductive powder by weight.

At an ambient temperature, the pipe joining material may be in the form of a solid cylindrical tube or stick such that it can be received by pipe joining material section 2100. Further, as described previously, the pipe joining material is preferably in the form of an elongated cylinder, and may be provided with engagement members, preferably female engagement members, such as a plurality of teeth or grooves or recesses 2155 for engagement with mating engagement members of actuator 2200. Upon heating the pipe joining material to a specified temperature (also referred to as the application temperature), the cylindrical tube or stick becomes fluid such that it can be injected into the interstitial space between parts of a piping system that are to be secured together. Preferably, the application temperature is 60 to 200° C. or 100 to 150° C. Ambient temperature (also described as room temperature) is optionally 15 to 25° C.

Various methods may be used to make the pipe joining material. For example, the pipe joining material can be formed by:
 (a) providing a thermoplastic material;
 (b) providing a bonding agent for the thermoplastic material;
 (c) mixing the thermoplastic material with the bonding agent to obtain a mixture;

(d) optionally heating the mixture to a forming temperature and shaping the mixture at the forming temperature; and (e) optionally cooling the shaped mixture to a temperature below the forming temperature to obtain the pipe joining material.

The mixture of the thermoplastic material with the bonding agent is preferably a mechanical mixture. As used herein, the term "mechanical mixture" refers to a mixture where the chemical components are not chemically bound to each other. The mixture of the thermoplastic material with the bonding agent is preferably a mechanical mixture at an ambient temperature. It will be appreciated that the mechanical mixture may be obtained without heating (e.g., at ambient temperature). Alternately, the temperature may be increased to permit the thermoplastic material and the bonding agent, with any additional components, to be mixed. For example, one or both of the thermoplastic material and the bonding agent may be provided as a loose aggregate material (e.g. a powder) and mechanically mixed and subjected to pressure to provide a solid which may have a generally uniform distribution of the thermoplastic material and the bonding agent. In some embodiments, one of the thermoplastic material and the bonding agent may be encapsulated in the other. For example, the thermoplastic material may be encapsulated in the bonding agent.

After the mechanical mixture is obtained, or as part of forming the mechanical mixture, the mixture may be formed into any desired shape. The forming is preferable conducted at ambient temperatures. Example processes are as follows.

In one embodiment, a stick of pipe joining material may be formed by providing a thin film of one of the materials, preferably the bonding agent. The other ingredients, e.g., the thermoplastic, may be provided on an upper surface of the thin film. For example, the PVC may be provided or distributed on the upper surface of the bonding agent as an aggregate such as a powder. The thin film may then be rolled and optionally compressed to form a stick.

In another embodiment, isostatic pressing may be used. For example, the ingredients, which may be in the form of aggregate such as a powder, may be introduced into a mold. Preferably, the aggregates or powders are mixed before being introduced into the mold so as to form, e.g., a relatively uniform dispersion. The material may then be subjected to compression while in the mold so as to form a solid block, e.g., a stick, of pipe joining material.

Optionally, the forming may be conducted at elevated temperatures. The forming temperature is a temperature at which the pipe joining material may be formed into a specific shape, such as a cylindrical tube or stick that can be received by pipe joining material section 2100. An advantage of using an elevated forming temperature is that the ingredients may be more malleable and easier to form into a desired shape. Optionally, the elevated temperature will be selected such that the bonding agent and the thermoplastic material remain in solid form (e.g., they remain in a plastic state). A forming temperature may be used in which the bonding agent and the thermoplastic material partially or fully liquefy. However, the temperature is preferably sufficiently low such that a fully miscible liquid is not formed If the pipe joining material is formed at an elevated temperature, the pipe forming material may then be cooled to a temperature below the forming temperature (for example, ambient temperature) where it may retain the shape in solid form. Preferably, the mixture is shaped into the form of a cylindrical tube or stick. Preferably, the mixture has sufficient mechanical strength at ambient temperature that engagement members that are optionally provided will be useable to drive the formed mixture into a heating chamber of a pipe sealing tool.

As described above, the pipe joining material is preferably solid at an ambient temperature and fluid at an application temperature. Upon heating the pipe joining material to a specified temperature (also referred to as the application temperature), the cylindrical tube or stick becomes fluid such that it may be injected into the interstitial space. Preferably, the application temperature is higher than the forming temperature, optionally 60 to 200° C. or 100 to 150° C.

In one embodiment, the thermoplastic material and the bonding agent of the pipe joining material are at least partially miscible at the application temperature. Accordingly, when liquefied for application, at least a portion of the thermoplastic material may mix with the bonding agent.

The pipe joining material may also be formed by further providing, in addition to the thermoplastic material and the bonding agent, a material that increases the flowability of the pipe joining material, an antioxidant and/or a conductive powder. Materials that increase the flowability of the pipe joining material, antioxidants and conductive powders useful in pipe joining materials have been described herein.

Table I shows the composition of various pipe joining materials tested and the lap shear strength that was obtained.

TABLE 1

Bonding Agent Lap Shear Test Data and Analysis

| | | 0.5C | | | 20C | | | 40C | | | 60C | | |
|---|---|---|---|---|---|---|---|---|---|---|---|---|---|
| | | Raw Pull Force Kg | Mpa/mm2 | PSI | Raw Pull Force Kg | Mpa/mm2 | PSI | Raw Pull Force Kg | Mpa/mm2 | PSI | Raw Pull Force Kg | Mpa/mm2 | PSI |
| Sample F | Test 1 | 49.3 | 3.0 | 434.9 | 92.0 | 5.6 | 811.6 | 53.5 | 3.3 | 472.0 | 31.0 | 1.9 | 273.5 |
| 42.5% polyamide | Test 2 | 76* | 4.6 | 670.4 | 89.0 | 5.4 | 785.1 | 71.0 | 4.3 | 626.3 | 27.4 | 1.7 | 241.3 |
| 5% Alumisol | Test 3 | 59 | 3.6 | 520.5 | 98.0 | 6.0 | 864.5 | 68.5 | 4.2 | 604.3 | 28.9 | 1.8 | 254.5 |
| 42.5% PVC grey dust | AVG | 61.4 | 3.7 | 541.9 | 93.0 | 5.7 | 820.4 | 64.3 | 3.9 | 567.5 | 29.1 | 1.8 | 256.4 |
| Sample A | Test 1 | 94.5* | 5.7 | 833.6 | 95.5 | 5.8 | 842.5 | 38.0 | 2.3 | 335.2 | 31.5 | 1.9 | 277.9 |
| 50% polyamide | Test 2 | 38 | 2.3 | 335.2 | 106.0 | 6.4 | 935.1 | 41.0 | 2.5 | 361.7 | 34.7 | 2.1 | 305.7 |
| 50% PVC grey dust | Test 3 | 44.3 | 2.7 | 390.8 | 110.0 | 6.7 | 970.4 | 54.0 | 3.3 | 476.4 | 23.4 | 1.4 | 206.4 |
| | AVG | 58.9 | 3.6 | 519.9 | 103.8 | 6.3 | 916.0 | 44.3 | 2.7 | 391.1 | 29.9 | 1.8 | 263.3 |
| Sample Z | Test 1 | 45.2 | 2.7 | 398.7 | 96.0 | 5.8 | 846.9 | 40.0 | 2.4 | 352.9 | 21.1 | 1.3 | 185.7 |
| 50% polyamide | Test 2 | 37.5 | 2.3 | 330.8 | 107.0 | 6.5 | 943.9 | 66.5 | 4.0 | 586.6 | 29.1 | 1.8 | 256.3 |
| 50% PVC white | Test 3 | 42.8 | 2.6 | 377.6 | 106.0 | 6.4 | 935.1 | 46.0 | 2.8 | 405.3 | 24.4 | 1.5 | 215.2 |
| | AVG | 41.8 | 2.5 | 369.0 | 103.0 | 6.3 | 908.6 | 50.8 | 3.1 | 448.3 | 24.8 | 1.5 | 219.1 |

TABLE 1-continued

Bonding Agent Lap Shear Test Data and Analysis

|  |  | 0.5C | | | 20C | | | 40C | | | 60C | | |
|---|---|---|---|---|---|---|---|---|---|---|---|---|---|
|  |  | Raw Pull Force Kg | Mpa/ mm2 | PSI | Raw Pull Force Kg | Mpa/ mm2 | PSI | Raw Pull Force Kg | Mpa/ mm2 | PSI | Raw Pull Force Kg | Mpa/ mm2 | PSI |
| Sample 3789 | Test 1 | 108.5 | 6.6 | 957.1 | 135.0 | 8.2 | 1190.9 | 69.0 | 4.2 | 608.7 | 40.3 | 2.5 | 355.5 |
| 100% polyamide | Test 2 | 105 | 6.4 | 926.3 | 133.0 | 8.1 | 1173.3 | 60.5 | 3.7 | 533.7 | 44.8 | 2.7 | 395.2 |
|  | Test 3 | 111 | 6.8 | 979.2 | 135.0 | 8.2 | 1190.9 | 69.5 | 4.2 | 613.1 | 39.5 | 2.4 | 348.0 |
|  | AVG | 108.2 | 6.6 | 954.2 | 134.3 | 8.2 | 1185.0 | 66.3 | 4.0 | 585.2 | 41.5 | 2.5 | 366.2 |
| Sample J | Test 1 | 49.5 | 3.0 | 436.7 | 82.0 | 5.0 | 723.4 | 51.0 | 3.1 | 449.9 | 42.8 | 2.6 | 377.6 |
| 35% polyamide | Test 2 | 59 | 3.6 | 520.5 | 70.0 | 4.3 | 617.5 | 50.0 | 3.0 | 441.1 | 19.8 | 1.2 | 174.2 |
| 7% Alumisol | Test 3 | 52.5 | 3.2 | 463.1 | 70.0 | 4.3 | 617.5 | 50.0 | 3.0 | 441.1 | 18.9 | 1.1 | 166.7 |
| 58% PVC grey dust | AVG | 53.7 | 3.3 | 473.4 | 74.0 | 4.5 | 652.8 | 50.3 | 3.1 | 444.0 | 27.2 | 1.7 | 239.5 |
| Sample L | Test 1 | 56.5 | 3.4 | 498.4 | 42.8 | 2.6 | 377.6 | 24.1 | 1.5 | 212.2 | 7.5 | 0.5 | 65.7 |
| 25% polyamide | Test 2 | 69 | 4.2 | 608.7 | 55.5 | 3.4 | 489.6 | 27.4 | 1.7 | 241.3 | 10.0 | 0.6 | 87.8 |
| 10% polyamide | Test 3 | 56.5 | 3.4 | 498.4 | 47.6 | 2.9 | 419.9 | 24.9 | 1.5 | 219.7 | 11.8 | 0.7 | 103.7 |
| 65% PVC grey dust | AVG | 60.7 | 3.7 | 535.2 | 48.6 | 3.0 | 429.0 | 25.4 | 1.5 | 224.4 | 9.7 | 0.6 | 85.7 |
| Sample O | Test 1 | 67.5 | 4.1 | 595.5 | 38.2 | 2.3 | 336.5 | 31.6 | 1.9 | 278.8 | 11.0 | 0.7 | 96.6 |
| 35% polyamide | Test 2 | 56.5 | 3.4 | 498.4 | 39.5 | 2.4 | 348.4 | 34.0 | 2.1 | 299.9 | 14.9 | 0.9 | 131.4 |
| 5% heat stabilizer | Test 3 | 64 | 3.9 | 564.6 | 71.5 | 4.3 | 630.7 | 23.1 | 1.4 | 203.3 | 14.4 | 0.9 | 127.0 |
| 60% PVC grey dust | AVG | 62.7 | 3.8 | 552.8 | 49.7 | 3.0 | 438.6 | 29.6 | 1.8 | 260.7 | 13.4 | 0.8 | 118.4 |
| Sample K | Test 1 | 0 | 0.0 | 0.0 | 0.0 | 0.0 | 0.0 | 0.0 | 0.0 | 0.0 | 0.0 | 0.0 | 0.0 |
| 25% polyamide | Test 2 | 0 | 0.0 | 0.0 | 0.0 | 0.0 | 0.0 | 0.0 | 0.0 | 0.0 | 0.0 | 0.0 | 0.0 |
| 7% Alumisol | Test 3 | 0 | 0.0 | 0.0 | 0.0 | 0.0 | 0.0 | 0.0 | 0.0 | 0.0 | 0.0 | 0.0 | 0.0 |
| 68% PVC grey dust | AVG | 0.0 | 0.0 | 0.0 | 0.0 | 0.0 | 0.0 | 0.0 | 0.0 | 0.0 | 0.0 | 0.0 | 0.0 |
| Sample P | Test 1 | 37.3 | 2.3 | 329.0 | 80.6 | 4.9 | 711.0 | 37.5 | 2.3 | 330.8 | 23.1 | 1.4 | 203.8 |
| 40% polyamide | Test 2 | 40.8 | 2.5 | 359.9 | 91.2 | 5.5 | 804.5 | 46.2 | 2.8 | 407.6 | 24.3 | 1.5 | 214.4 |
| 60% PVC grey dust | Test 3 | 47 | 2.9 | 414.6 | 82.3 | 5.0 | 726.0 | 42.0 | 2.6 | 370.5 | 22.6 | 1.4 | 199.4 |
|  | AVG | 41.7 | 2.5 | 367.9 | 84.7 | 5.2 | 747.2 | 41.9 | 2.5 | 369.6 | 23.3 | 1.4 | 205.8 |
| Sample N | Test 1 | 51.5 | 3.1 | 454.3 | 58.5* | 3.6 | 516.1 | 78.5 | 4.8 | 692.5 | 54.6 | 3.3 | 481.7 |
| 40% polyamide | Test 2 | 57 | 3.5 | 502.8 | 80.5 | 4.9 | 710.1 | 106.0 | 6.4 | 935.1 | 49.4 | 3.0 | 435.8 |
| 60% Grey PVC dust | Test 3 | 75.5 | 4.6 | 666.0 | 81.5 | 5.0 | 719.0 | 88.5 | 5.4 | 780.7 | 49.6 | 3.0 | 437.5 |
|  | Test 4 | 89.5* | 5.4 | 789.5 | 86.0 | 5.2 | 758.6 | 73.0 | 4.4 | 644.0 | 40.2 | 2.4 | 354.6 |
|  | Test 5 | 56 | 3.4 | 494.0 | 96.5 | 5.9 | 851.3 | 77.0 | 4.7 | 679.3 | 47.8 | 2.9 | 421.7 |
|  | Test 6 | 62 | 3.8 | 546.9 | 82.0 | 5.0 | 723.4 | 92.0 | 5.6 | 811.6 | 54.5 | 3.3 | 480.8 |
|  | AVG | 65.3 | 4.0 | 575.6 | 85.3 | 4.9 | 752.5 | 85.8 | 5.2 | 757.2 | 49.4 | 3.0 | 435.3 |

*The bonding agent broke.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method of joining an end of a first pipe and an end of a second pipe, the end of the first pipe having an outer annular end surface, the end of the second pipe having a pipe receiving opening, an interior abutment surface positioned spaced inwardly from the pipe receiving opening, and an interior end surface between the interior abutment surface and the pipe receiving opening, the method comprising:

(a) inserting the end of the first pipe into the end of the second pipe such that the outer annular end surface abuts the interior abutment surface, wherein a groove is positioned between the interior abutment surface and the pipe receiving opening, the groove comprising an open annular region between an outer surface of the first pipe and the interior end surface;

(b) utilizing an injection passage that extends from an outer surface of the second pipe to an inner surface of the second pipe wherein the groove is in flow communication with an outlet end of injection passage to inject heated thermoplastic joining material into the groove; and (c) providing a blocking material that will become flowable when heated by the thermoplastic joining material that is infected into the groove and will flow out of the groove to the ambient as the heated pipe joining material is injected into the interstitial space.

2. The method of claim 1 wherein the groove is provided in the outer surface of the first pipe.

3. The method of claim 2 further comprising reaming the interior end surface so that a diameter of the interior end surface is greater than a diameter of the outer surface of the first pipe.

4. The method of claim 3, further comprising roughening the at least one surface of the groove.

5. The method of claim 2 wherein at least one surface of the groove has been roughened.

6. The method of claim 2 further comprising drilling the injection passage in the second pipe.

7. The method of claim 6, wherein the injection passage is drilled while the end of the first pipe is been positioned inside the end of the second pipe.

8. The method of claim 1 wherein the groove is provided in the interior end surface of the second pipe.

9. The method of claim 1 wherein the groove comprises a first recess in the outer surface of the first pipe and a second recess in the interior end surface of the second pipe, and wherein the first recess is aligned with the second recess when the annular end surface abuts the interior abutment surface.

10. The method of claim 1 further comprising providing the end of the first pipe with a chamfer so that a diameter of the outer annular end surface is less than a diameter of the interior surface of the second pipe.

11. The method of claim 10, wherein the chamfer is between 0.5° to 10°.

12. The method of claim 11, further comprising chamfering the end of the first pipe to provide the chamfer.

13. The method of claim 10, wherein the chamfer is between 1° to 5°.

14. The method of claim 1 further comprising providing two or more axially spaced apart grooves.

15. A method of joining an end of a first pipe and an end of a second pipe, the end of the first pipe having an outer annular end surface, the end of the second pipe having a pipe receiving opening, an interior abutment surface positioned spaced inwardly from the pipe receiving opening, and an interior end surface between the interior abutment surface and the pipe receiving opening, the method comprising;
(a) inserting the end of the first pipe into the end of the second pipe such that the outer annular end surface abuts the interior abutment surface, wherein a groove is positioned between the interior abutment surface and the pipe receiving opening, the groove comprising an open annular region between an outer surface of the first pipe and the interior end surface;
(b) utilizing an injection passage that extends from an outer surface of the second pipe to an inner surface of the second pipe wherein the groove is in flow communication with an outlet end of injection passage to inject joining material into the groove; and,
(c) using a single multi-function tool to drill the injection passage and to inject the joining material.

16. A method of connecting first and second parts of a piping system utilizing an injection tool having an actuator, the method comprising:
(a) inserting an end of the first part into an open end of the second part wherein an interstitial space is provided between an inner surface of the second part and an outer surface of the first part;
(b) providing an injection tool having an actuator and pipe joining material that is provided as a solid;
(c) positioning the injection tool in flow communication with the interstitial space;
(d) actuating the actuator to advance the solid pipe joining material into a heating section of the injection tool and ejecting liquefied pipe joining material into the interstitial space to fill the interstitial space with pipe joining material; and
(e) providing a blocking material which becomes flowable when heated by the heated pipe joining material that is injected into the interstitial space and will flow out of a vent hole of the interstitial space as the heated pipe joining material is injected into the interstitial space.

17. The method of claim 16 wherein the actuator comprises a squeeze trigger and the method further comprises squeezing the actuator more than once to fill the interstitial space with pipe joining material.

18. The method of claim 16 wherein the actuator is calibrated such that each actuation of the actuator ejects a volume of pipe joining material that is equal in volume to at least half of but not the entire volume of the interstitial space, and wherein the actuating comprises actuating the actuator up to two times.

19. The method of claim 16 further comprising providing an injection passage to the interstitial space, and a barrier between the vent hole and the injection passage.

* * * * *